US007082371B2

(12) United States Patent  
Griffin et al.

(10) Patent No.: US 7,082,371 B2  
(45) Date of Patent: Jul. 25, 2006

(54) FUNDAMENTAL MISTUNING MODEL FOR DETERMINING SYSTEM PROPERTIES AND PREDICTING VIBRATORY RESPONSE OF BLADED DISKS

(75) Inventors: Jerry H. Griffin, Pittsburgh, PA (US); Drew M. Feiner, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 10/836,422

(22) Filed: Apr. 30, 2004

(65) Prior Publication Data

US 2004/0243310 A1     Dec. 2, 2004

Related U.S. Application Data

(60) Provisional application No. 60/474,083, filed on May 29, 2003.

(51) Int. Cl.
*G06F 17/50* (2006.01)
*G01L 7/00* (2006.01)

(52) U.S. Cl. ............................ 702/56; 702/54; 702/10; 703/1.14

(58) Field of Classification Search .................. 702/54, 702/56, 10; 73/1.14, 457, 459–460, 66
See application file for complete search history.

(56) References Cited

U.S. PATENT DOCUMENTS 4,061,017 A * 12/1977 Sloane et al. ................. 73/579

| 5,111,704 | A | * | 5/1992 | Hill ............................ 73/866.4 |
| 5,471,880 | A | * | 12/1995 | Lang et al. ................... 73/660 |
| 2002/0162394 | A1 | * | 11/2002 | Loftus et al. ................. 73/593 |

OTHER PUBLICATIONS

Seig, S., 2000, "High Cycle Fatigue and the War Fighter," Proceedings of the 5th National Turbine Engine High Cycle Fatigue Conference, Chandler, Arizona.
Srinivansan, A. V., 1997, "Flutter and Resonant Vibration Characteristics of Engine Blades," Journal of Engineering for Gas Turbines and Power, 119, 4, pp. 742-775.

(Continued)

*Primary Examiner*—John Barlow
*Assistant Examiner*—Jonathan Moffat
(74) *Attorney, Agent, or Firm*—Edward L. Pencoske

(57) ABSTRACT

A reduced order model called the Fundamental Mistuning Model (FMM) accurately predicts vibratory response of a bladed disk system. The FMM software may describe the normal modes and natural frequencies of a mistuned bladed disk using only its tuned system frequencies and the frequency mistuning of each blade/disk sector (i.e., the sector frequencies). The FMM system identification methods—basic and advanced FMM ID methods—use the normal (i.e., mistuned) modes and natural frequencies of the mistuned bladed disk to determine sector frequencies as well as tuned system frequencies. FMM may predict how much the bladed disk will vibrate under the operating (rotating) conditions. Field calibration and testing of the blades may be performed using traveling wave analysis and FMM ID methods. The FMM model can be generated completely from experimental data. Because of FMM's simplicity, no special interfaces are required for FMM to be compatible with a finite element model. Because of the rules governing abstracts, this abstract should not be used to construe the claims.

23 Claims, 17 Drawing Sheets

OTHER PUBLICATIONS

Dye, et al., T. A., 1969, "Vibration Amplitudes of Compressor Blades Resulting From Scatter in Blade Natural Frequencies," ASME Journal of Engineering for Power, 91, 3, pp. 1.

Ewins, D. J., 1969, "The Effects of Detuning Upon the Forced Vibrations of Bladed Disks," Journal of Sound and Vibration, 9, 1, pp. 65-79.

Yang, M.T. et al, 1997, "A Reduced Order Approach for the Vibration of Mistuned Bladed Disk Assemblies," Journal of Engineering for Gas Turbines and Power, 119, 1, pp. 161-167.

Castanier, M.P. et al, 1997, "A Reduced Order Modeling Technique for Mistuned Bladed Disks," Journal of Vibration and Acoustics, 119, 3, pp. 439-447.

Yang, M.T. et al, 2001, "A Reduced-Order Model of Mistuning a Subset of Nominal Modes," Journal of Engineering for Gas Turbines and Power, 123(4), pp. 893-900.

Judge, J.A. et al, 2002, "Mistuning Identification in Bladed Disks," Proceedings of the International Conference on Structural Dynamics Modeling, Madeira Island, Portugal.

Ewins, D.J., 2000, "Modal Testing: Theory, Practice, and Application," Research Studies Press LTD., Baldock, UK, Chap. 1.

Bendat, J.S., 1976, "Solutions for the Multiple Input/Output Problem," Journal of Sound and Vibration, 44(3), pp. 311-325.

Leuridan, J., 1985, "The Use of Principal Inputs in Multiple-Input Multiple-Output Data Analysis," International Journal of Modal Analysis, 1 pp. 1-8.

To, W.M. et al, 1991, "A Closed-Loop Model for Single/Multi-Shaker Modal Testing," Mechanical Systems and Signal Processing, 5(4), pp. 305-316.

Imregun, M., et al, 2002, "MODENT 2002," ICATS, London, UK, http://www.icats.co.uk.

Jones, K.W. et al, 2003, "Traveling Wave Excitation System for Bladed Disks," Journal of Propulsion and Power, 19(1), pp. 135-141.

D.M. Feiner et al, "A Fundamental Model of Mistuning For A Single Family Of Modes," 2002, Proceedings of IGTI, GT-2002-30425, pp. 1-12.

D.M. Feiner et al, "Mistuning Identification of Bladed Disks Using A Fundamental Mistuning Model-Part I: Theory," 2003, Proceedings of IGTI, GT-2003-38952, pp. 1-11.

D.M. Feiner et al, "Mistuning Identification of Bladed Disks Using A Fundamental Mistuning Model-Part 2: Application," 2003, Proceedings of IGTI, GT-2003-38953, pp. 1-8.

D.M. Feiner et al, "System Identification Of Mistuned Bladed Disks From Traveling Wave Response Measurements," 2003, Proceedings of DETC'03, DETC2003/VIB-48448, pp. 1-10.

Kielb, R.E. et al, 2004, "Probabilistic Analysis of Mistuned Bladed Disks and Blisks with Aerodynamic and FMM Structural Coupling," High Cycle Fatigue Conference, Pinehurst, NC.

Ayers, J.P. et al, 2004, "A Reduced Order Model for Transient Analysis of Bladed Disk Forced Response," High Cycle Fatigue Conference, Pinehurst, NC.

Wei,, et al, 1988, "Localization Phenomena in Mistuned Assemblies with Cyclic Symmetry, Part II: Forced Vibrations," *ASME Journal of Vibration, Acoustics, Stress, and Reliability in Design*, 110, 4, pp. 429-438.

Griffin, et al, 1984, "Model Development and Statistical Investigation of Turbine Blade Mistuning," *ASME Journal of Vibration, Acoustics, Stress, and Reliability in Design*, 109, pp. 204-210.

Rivas-Guerra, et al, 2001, "Local/Global Effects of Mistuning on the Forced Response of Bladed Disks," ASME Paper 2001-GT-0289, *International Gas Turbine Institute Turbo Expo*, New Orleans, Louisiana.

Irretier, H., 1983, "Spectral Analysis of Mistuned Bladed Disk Assemblies by Component Mode Synthesis," *Vibrations of Bladed Disk Assemblies, Proceeding of the ASME 9th Biennial Conference on Mechanical Vibration and Noise*, Dearborn, Michigan, pp. 115-125.

Kruse, et al, 1996, "Forced Response of Mistuned Bladed Disks Using Reduced-Order Modeling," *Proceeding of the 37th AIAA/ASME/ASCE/AHS/ASC Structures, Structural Dynamics, and Materials Conference*, Salt Lake City, Utah, 4, pp. 1938-1950.

Petrov, E. et al, 2000, "Quantitative Prediction of the Effects of Mistuning Arrangement on Resonant Response of a Practical Turbine Bladed Disk," *5th National Turbine Engine High Cycle Fatigue Conference*, Chandler, Arizona.

Mignolet, M.P. et al, 2001, "Identification of Mistuning Characteristics of Bladed Disks from Free Response Data—Part I," *Journal of Engineering for Gas Turbines and Power*, vol. 123(2), pp. 395-403.

Rivas-Guerra, A.J. et al, 2001, "Identification of Mistuning Characteristics of Bladed Disks from Free Response Data—Part II," *Journal of Engineering for Gas Turbines and Power*, vol. 123(2), pp. 404-411.

Jones, K. W. et al, 2002, "Reducing Mistuned Bladed Disk Forced Response Below Tuned Resonant Amplitudes," *Proceedings of the 7th National Turbine Engine High Cycle Fatigue Conference*, Palm Beach Gardens, Florida, USA.

Petrov, E. et al, 2002, "Search for the Best Blade Arrangement in a Mistuned Bladed Disc Assembly," *Proceedings of the 7Ih National Turbine Engine High Cycle Fatigue Conference*, Palm Beach Gardens, Florida, USA.

Rossi, M.R. et al, 2004, "Experimental Study of the Fundamental Mistuning Model (FMM) for Probabilistic Analysis," High Cycle Fatigue Conference, Pinehurst, NC.

Bartsch, T.M. (Ed.), 2002, "Fatigue Science and Technology Program 2001 Annual Report," AFRL-PR-WP-TR-2002-2060, http://www.hcf.utcdayton.com.

* cited by examiner

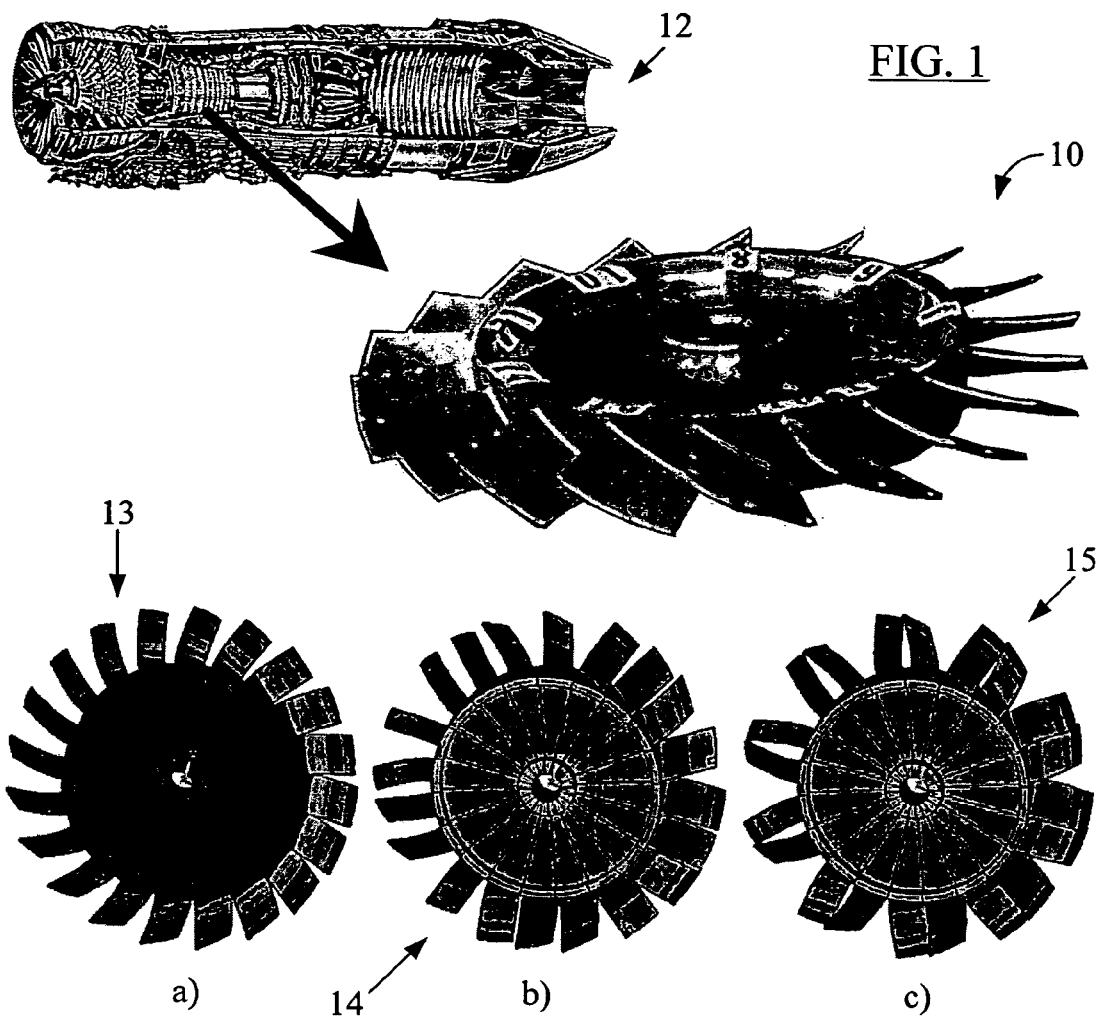
FIG. 1
FIG. 2
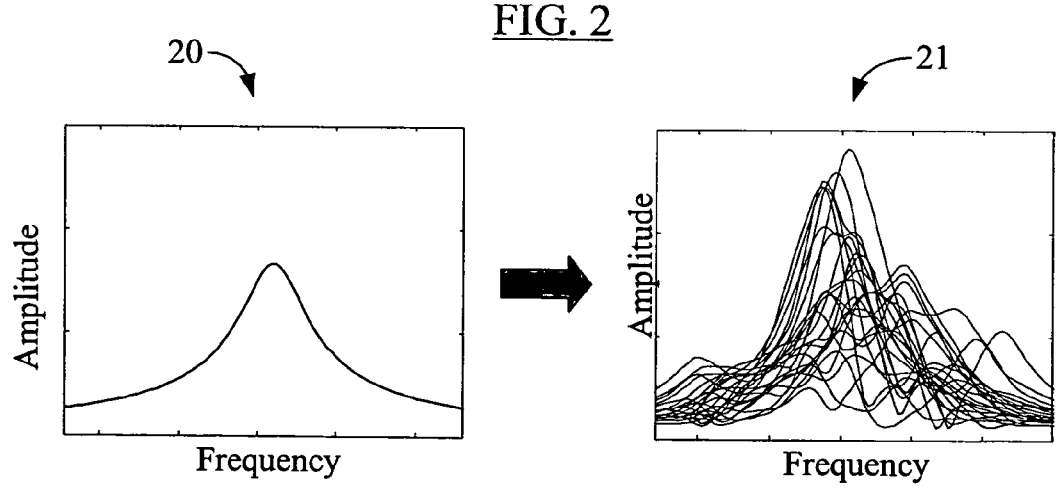
FIG. 4

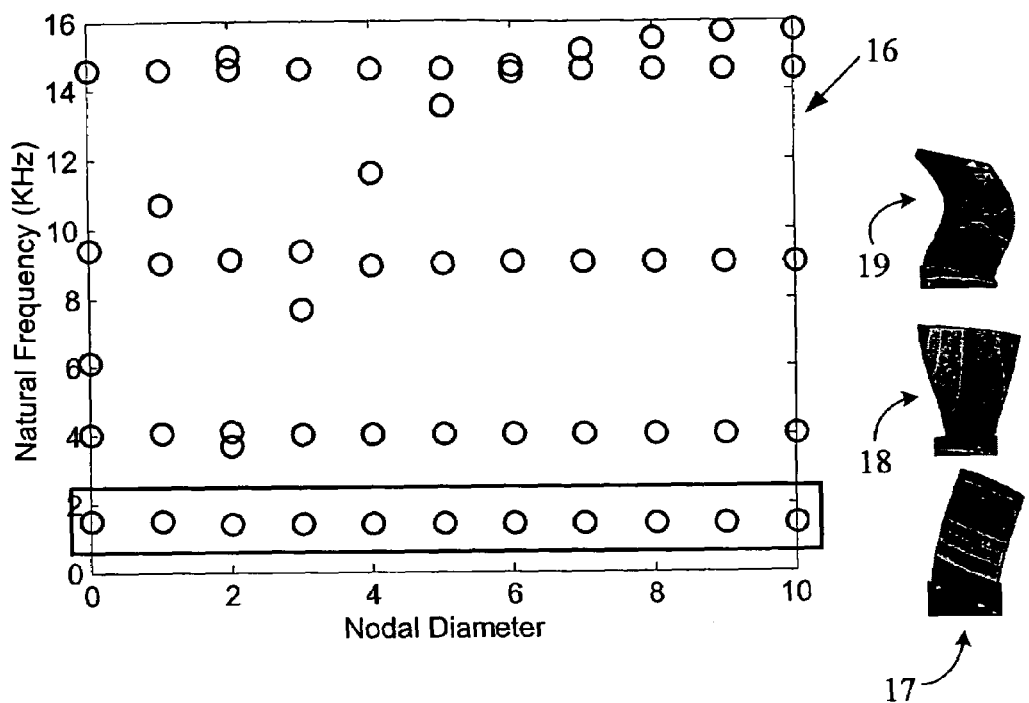
FIG. 3
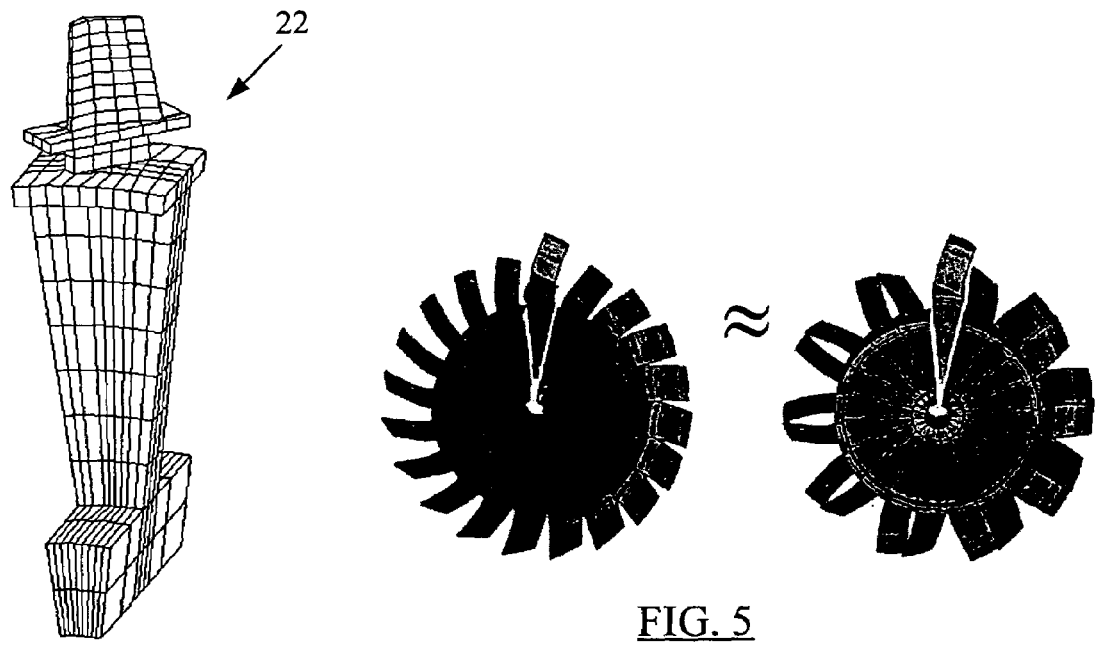
FIG. 5
FIG. 6

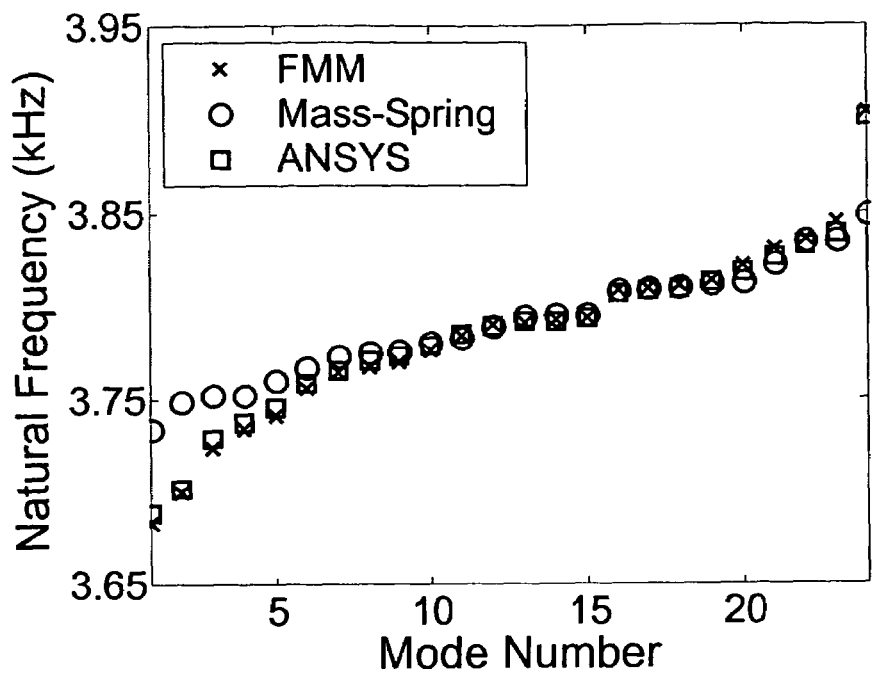
a) Mistuned Frequencies
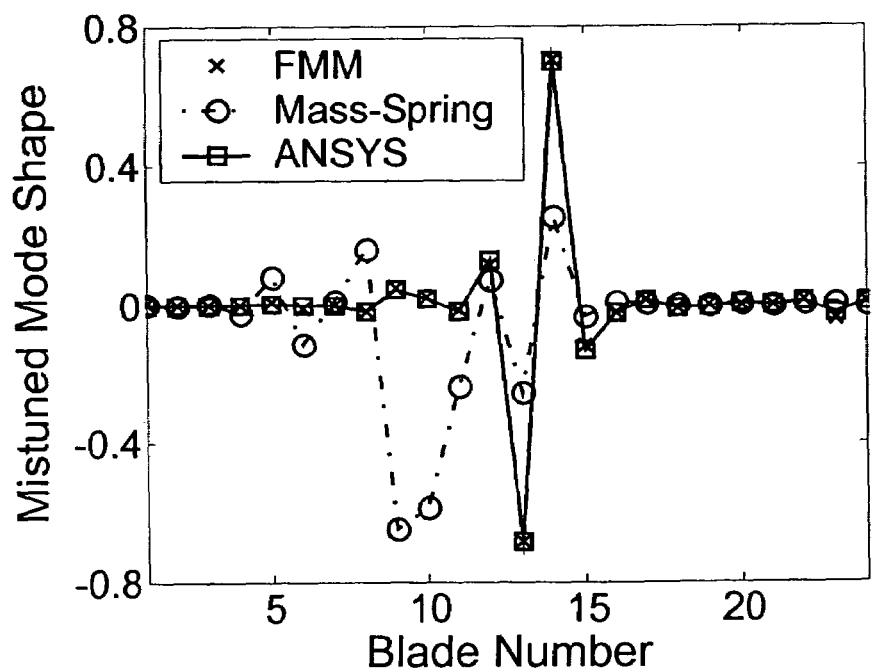
b) Mode shape of 18th mode
FIG. 9

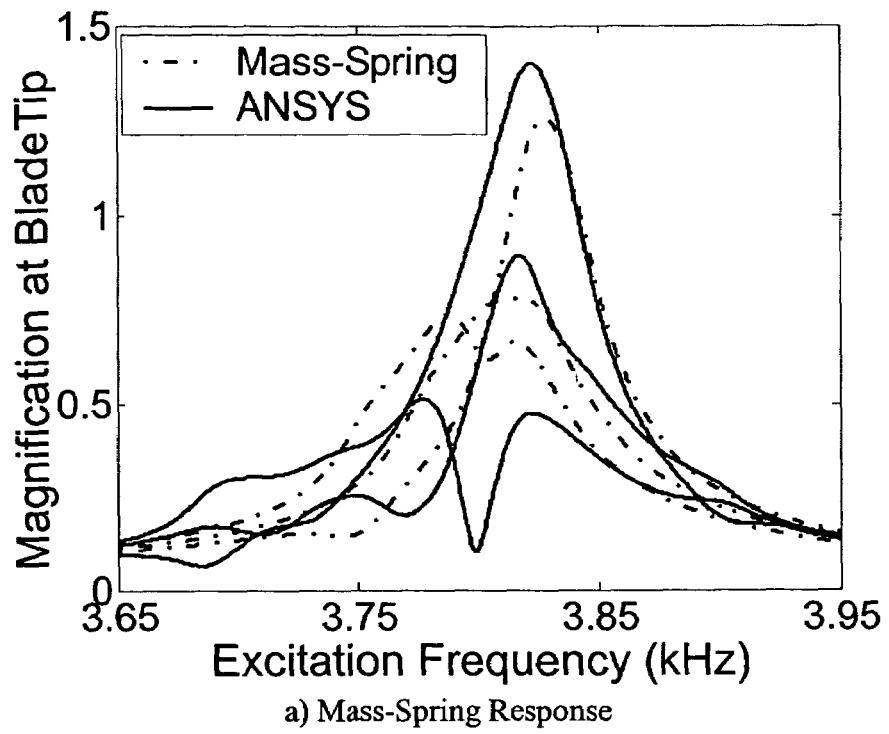
a) Mass-Spring Response
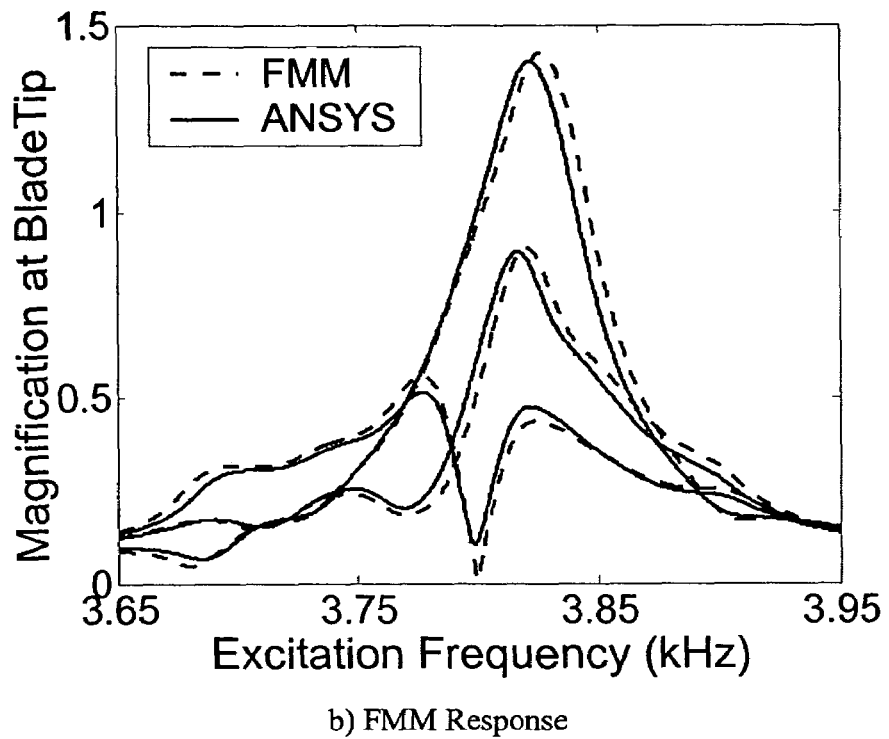
b) FMM Response
FIG. 10

FIG. 13
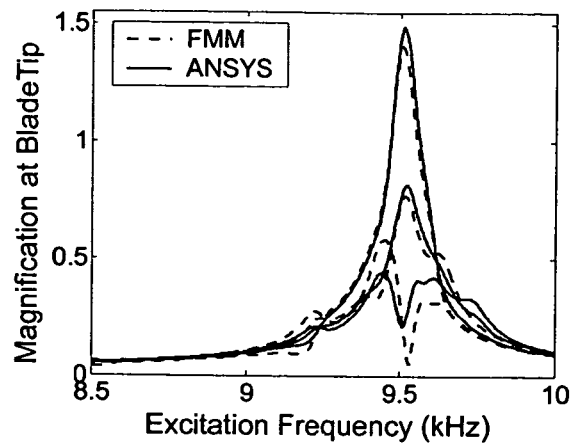
a) Family 2
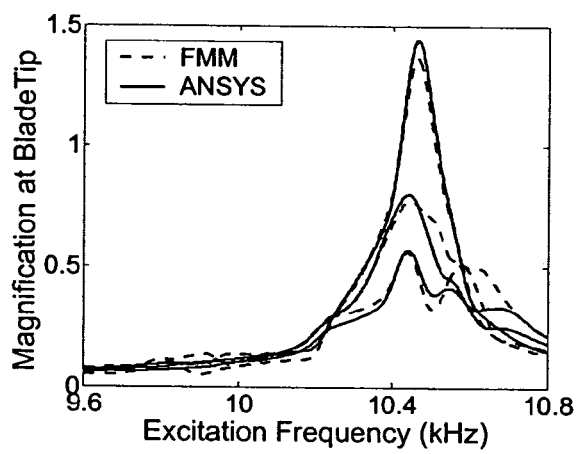
b) Family 3
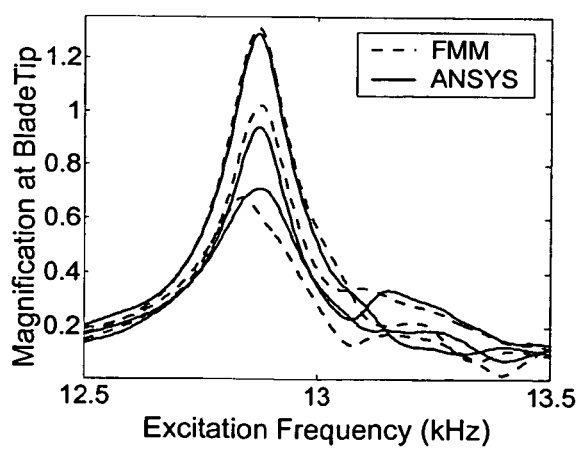
c) Family 4

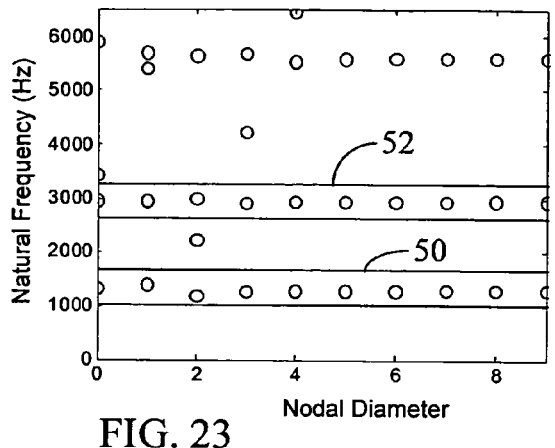
FIG. 23
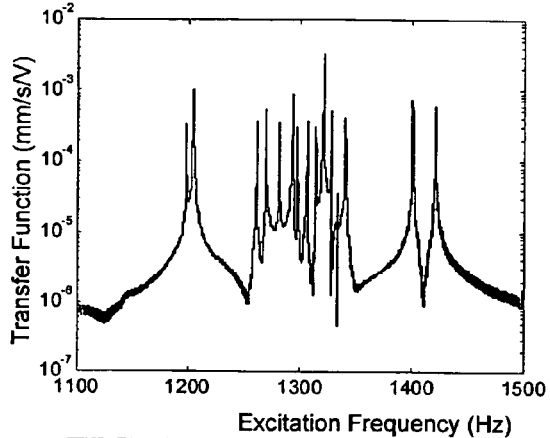
FIG. 24
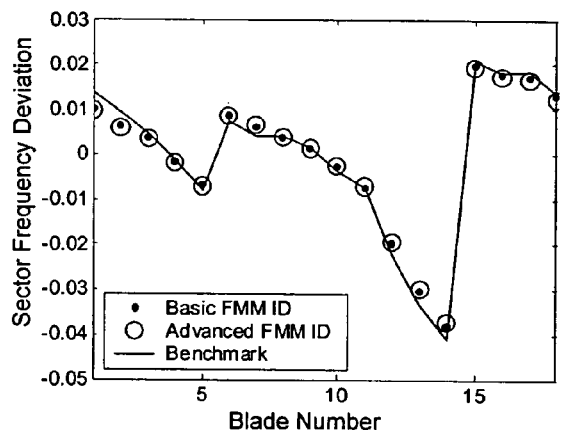
FIG. 25
FIG. 26
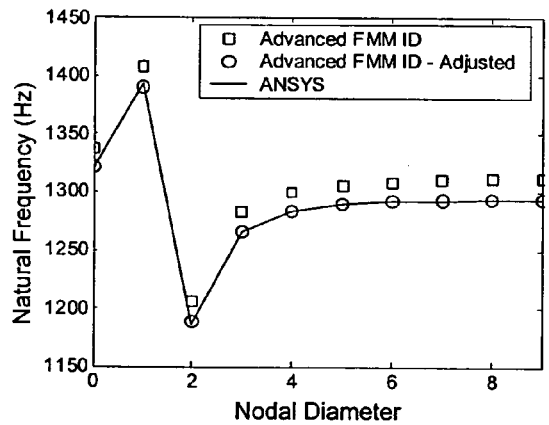
FIG. 27
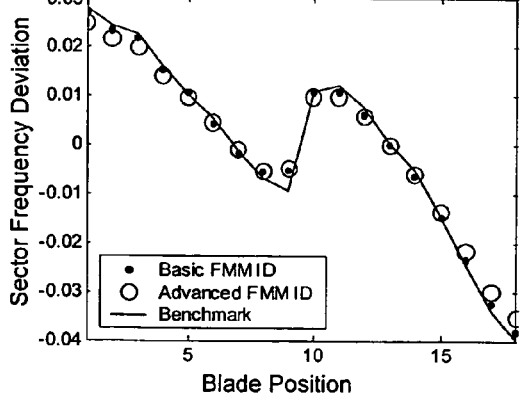

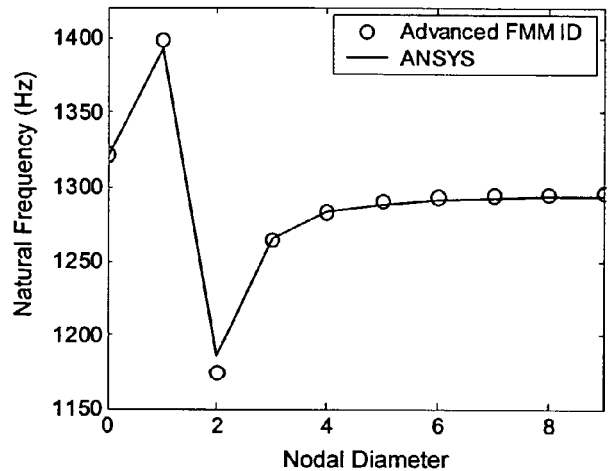
FIG. 28
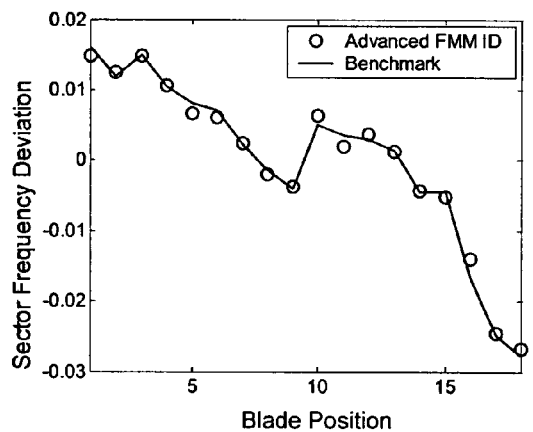
a) SN-1  FIG. 29  b) SN-3
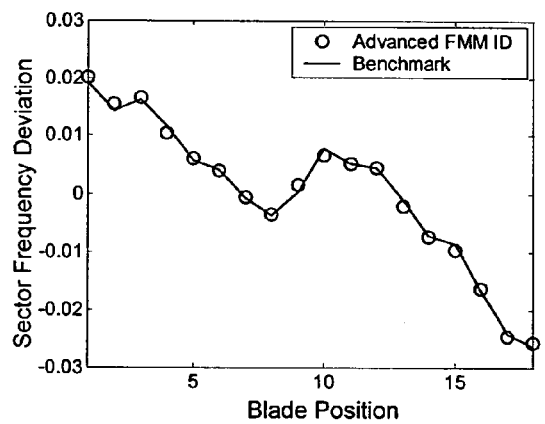
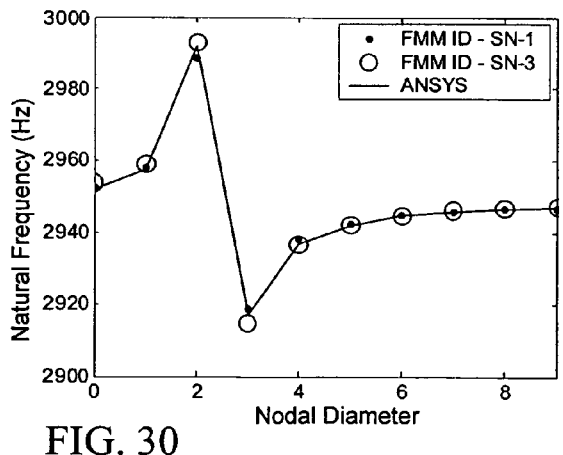
FIG. 30
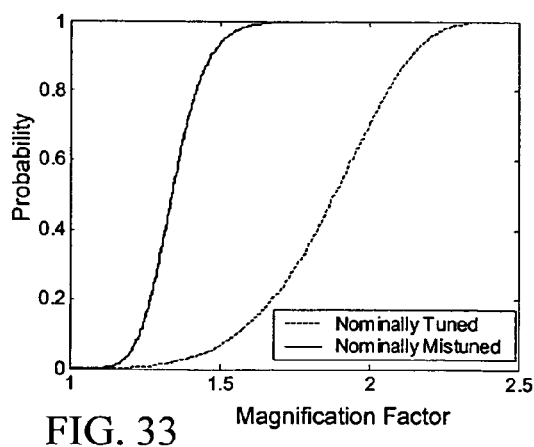
FIG. 33

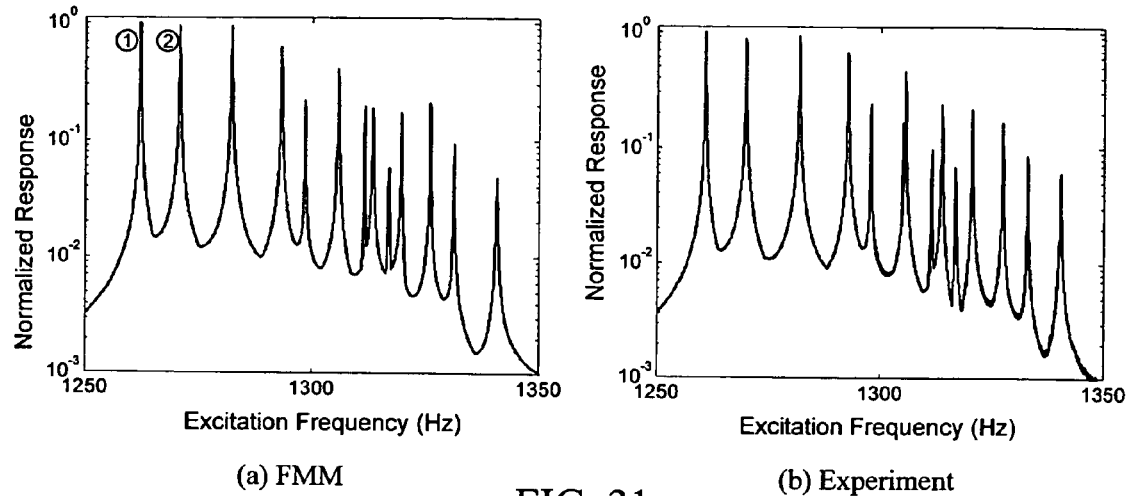
(a) FMM  FIG. 31  (b) Experiment
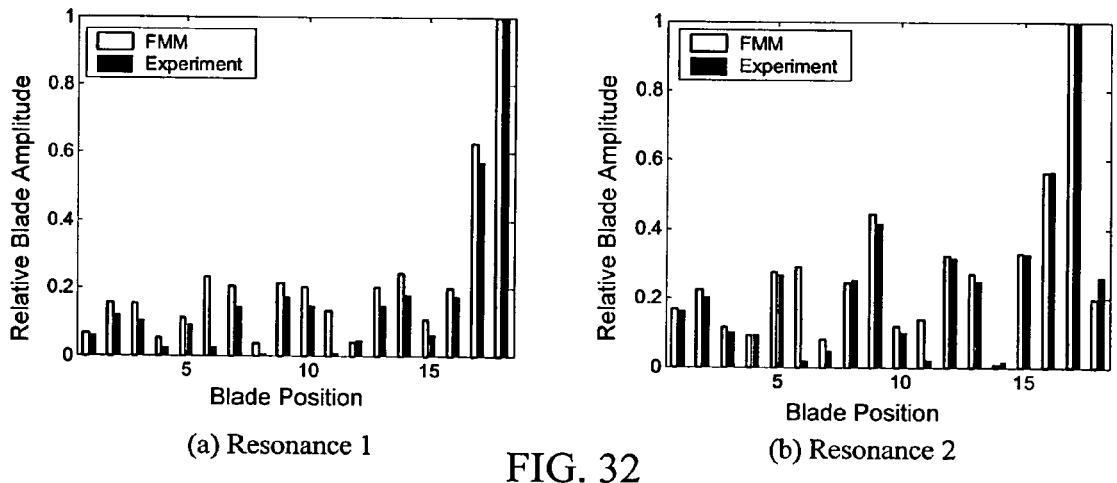
(a) Resonance 1  FIG. 32  (b) Resonance 2
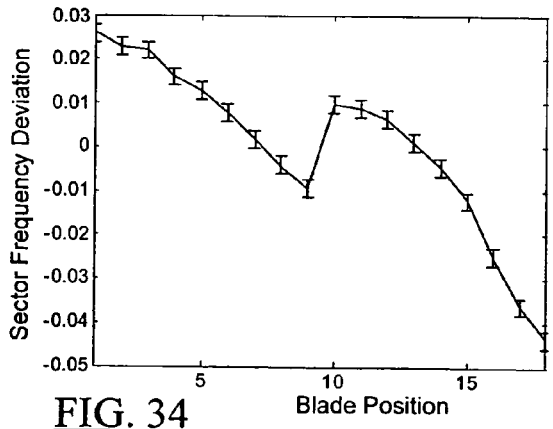
FIG. 34
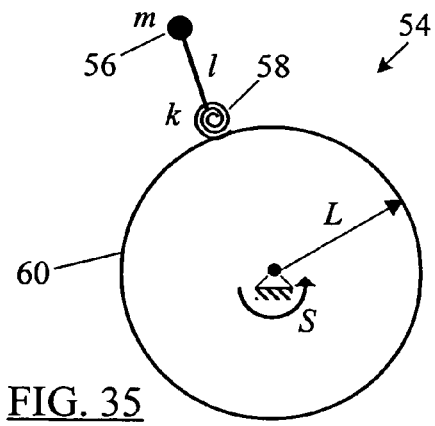
FIG. 35

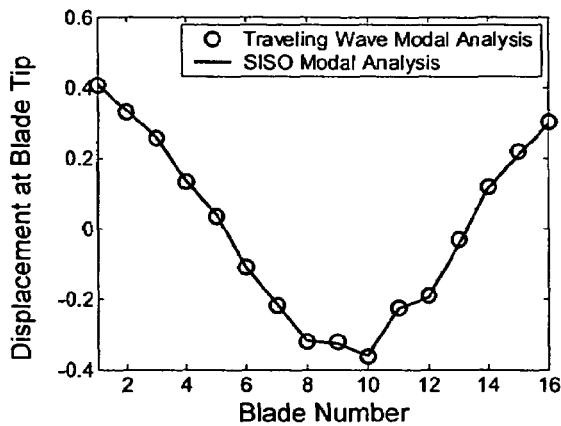
a) Extended Mode
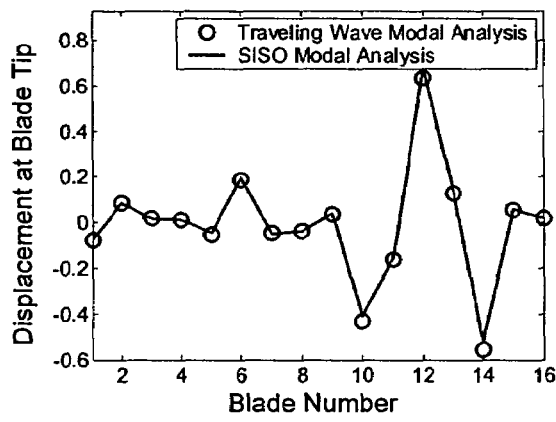
b) Distorted Mode
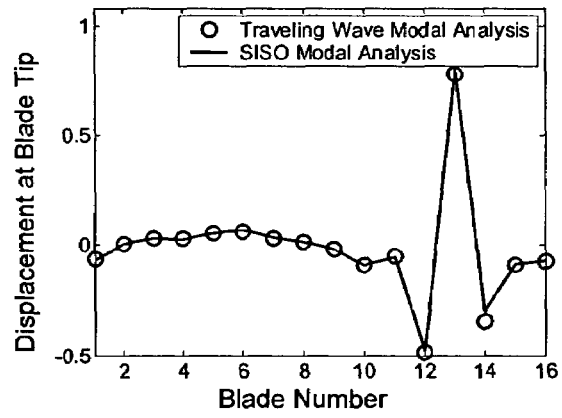
c) Localized Mode
FIG. 40

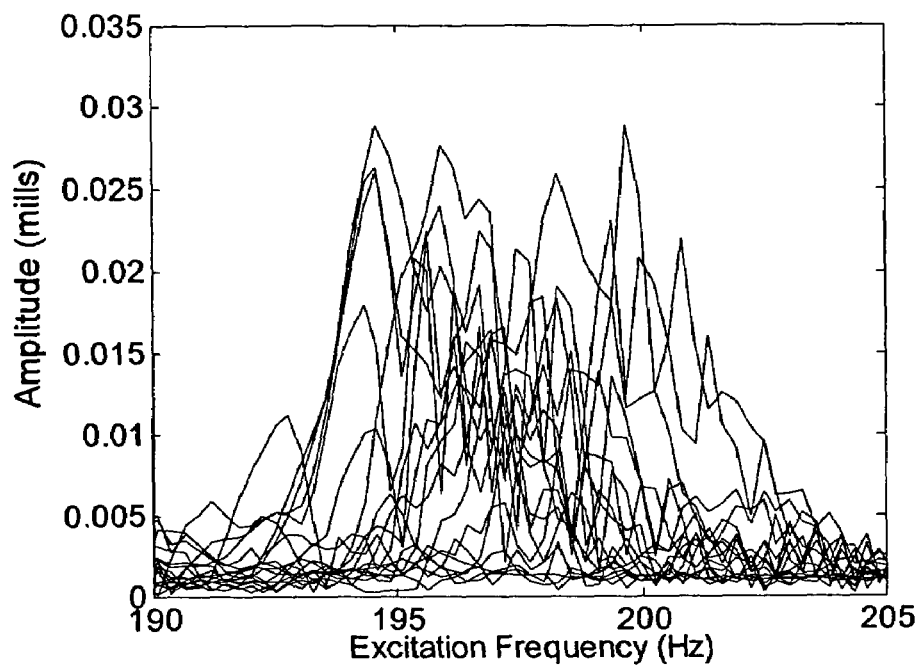
a) Fast Acceleration
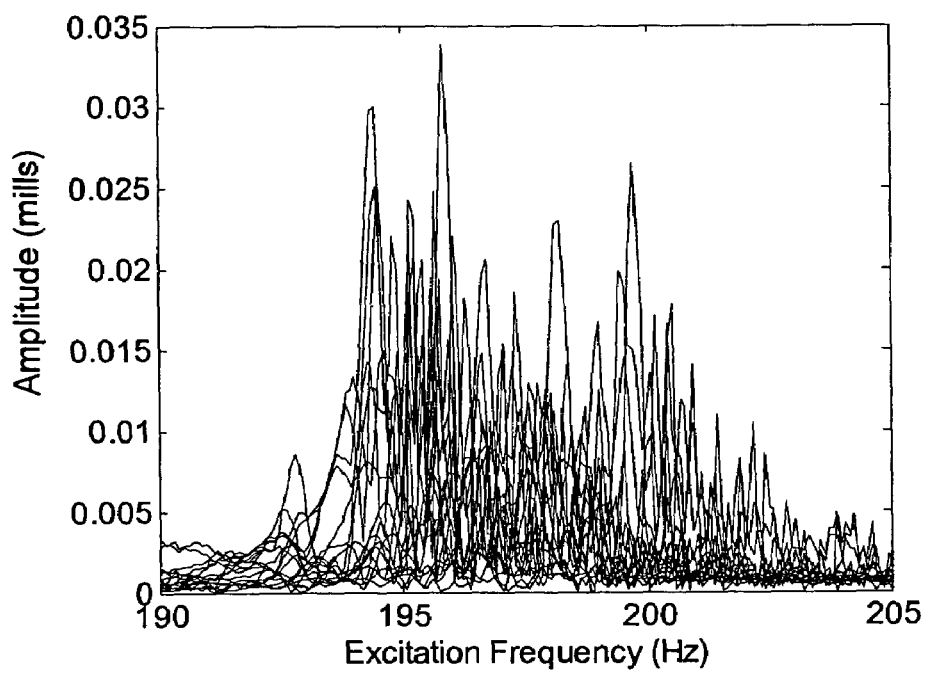
b) Slow Acceleration
FIG. 44 a) Fast Acceleration        b) Slow Acceleration

FUNDAMENTAL MISTUNING MODEL FOR DETERMINING SYSTEM PROPERTIES AND PREDICTING VIBRATORY RESPONSE OF BLADED DISKS

REFERENCE TO RELATED APPLICATION

The disclosure in the present application claims priority benefits of the earlier filed U.S. provisional patent application Ser. No. 60/474,083, titled "Fundamental Mistuning Model for Determining System Properties and Predicting Vibratory Response of Bladed Disks," filed on May 29, 2003, the entirety of which is hereby incorporated by reference.

STATEMENT REGARDING FEDERALLY SPONSORED RESEARCH

The invention in the present application was made under a grant from the United States Air Force Research Laboratory, Contract No. F33615-01-C-2186. The United States federal government may have certain rights in the invention.

BACKGROUND

The present disclosure generally relates to identification of mistuning in rotating, bladed structures, and, more particularly, to the development and use of reduced order models as an aid to the identification of mistuning.

It is noted at the outset that the term "bladed disk" is commonly used to refer to any (blade-containing) rotating or non-rotating part of an engine or rotating apparatus without necessarily restricting the term to refer to just a disk-shaped rotating part. Thus, a bladed disk can have externally-attached or integrally-formed blades or any other suitable rotating protrusions. Also, this rotating mechanism may have any suitable shape, whether in a disk form or not. Further, the term "bladed disk" may include stators or vanes, which are non-rotating bladed disks used in gas turbines. Various types of devices such as fans, pumps, turbochargers, compressors, engines, turbines, and the like, may be commonly referred to as "rotating apparatus."

FIG. 1 illustrates a bladed disk 10 which is representative of those used in gas turbine engines. One such exemplary gas turbine 12 is illustrated in FIG. 1. Bladed disks used in turbine engines are nominally designed to be cyclically symmetric. If this were the case, then all blades would respond with the same amplitude when excited by a traveling wave. However, in practice, the resonant amplitudes of the blades are very sensitive to small changes in their properties. The small variations that result from the manufacturing process and wear cause some blades to have a significantly higher response and may cause them to fail from high cycle fatigue (HCF). This phenomenon is referred to as the mistuning problem, and has been studied extensively.

FIG. 2 represents an exemplary selection of nodal diameter modes 13–15 in a bladed disk. In the zero nodal diameter mode 13 (part (a) in FIG. 2), all the blades move in phase with one another, while in the higher nodal diameter modes 14–15, the blades move out of phase. FIG. 2(b) illustrates a mode 14 with five (5) nodal diameters, whereas FIG. 2(c) illustrates a mode 15 with ten (10) nodal diameters. The displacement of the blades as a function of angular position is given in these modes by functions $\sin(n\theta)$ and $\cos(n\theta)$, where "n" defines the number of nodal diameters. For a given value of "n", the corresponding sine and cosine modes both have the same natural frequency. The only nodal diameter modes which do not have repeated frequencies are the cases of n=0 and n=N/2, where N is the number of blades on the disk.

FIG. 3 is an exemplary nodal diameter map 16 of a bladed disk's natural frequencies. Thus, the natural frequencies of a bladed disk are plotted as a function of the number of nodal diameters in their corresponding mode. When plotted in this fashion, the frequencies cluster into families of modes. Each family consists of a set of N nodal diameter modes. Each mode 17–19 at the right in FIG. 3 represents the blade deformation in the corresponding family. Although the relative amplitudes of the blades varies from one nodal diameter to the next, the deformation within a given blade remains uniform throughout all modes within a given family, at least for families which are isolated in frequency from their neighbors. The blade deformation in the first few families generally resembles the simple bending and torsion modes of a cantilevered plate. Many families of modes have most of their strain energy stored in the blades. These families appear relatively flat in FIG. 3, because the added strain energy introduced with additional nodal diameters has a minimal effect on their natural frequency. In contrast, mode families with large strain energy in the disk increase their frequency rapidly from one nodal diameter to the next.

Mistuning can significantly affect the vibratory response of a bladed disk. This sensitivity stems from the nature of the eigenvalue problem that describes a disk's modes and natural frequencies. An eigenvalue is equal to the square of the natural frequency of a mode. The eigenvalues of a bladed disk are inherently closely spaced due to the system's rotationally periodic design, as can be seen from the plot in FIG. 3. Therefore, the eigenvectors (mode shapes) of a bladed disk are very sensitive to the small perturbations caused by mistuning. In the case of very small mistuning, the blade displacements in the modes are given by distorted sine and cosine waves, while large mistuning can alter the modes to such an extent that the majority of the motion will be localized to just one or two blades. FIG. 4 illustrates exemplary forced response tracking plots 20–21 of a tuned bladed disk system (plot 20) and the mistuned disk system (plot 21). The plot 21 illustrates blade amplitude magnification caused by mistuning.

To address the mistuning problem, researchers have developed reduced order models (ROMs) of the bladed disk. These ROMs have the structural fidelity of a finite element model of the full rotor, while incurring computational costs that are comparable to that of a mass-spring model. In numerical simulations, most published ROMs have correlated extremely well with numerical benchmarks. However, some models have at times had difficulty correlating with experimental data. These results suggest that the source of the error may lie in the inability to determine the correct input parameters to the ROMs.

The standard method of measuring mistuning in rotors with attachable blades is to mount each blade in a broach block and measure its natural frequency. The difference of each blade's natural frequency from the mean value is then taken as a measure of the mistuning. However, the mistuning measured through this method may be significantly different from the mistuning present once the blades are mounted on the disk. This variation in mistuning can arise because each blade's frequency is dependent on the contact conditions at the attachment. Not only may the blade-broach contact differ from the blade-disk contact, but the contact conditions can also vary from slot-to-slot around the wheel or disk. Therefore, to accurately measure mistuning, it is desirable to develop methods that can infer the mistuning from the vibratory response of the blade-disk assembly as a whole. In addition, many blade-disk structural systems are now manufactured as a single piece in which the blades cannot be physically separated from the disk. In the gas turbine industry they are referred to as blisks (for bladed disks) or IBRs (for integrally bladed rotors). Thus, in the case of IBRs, the conventional testing methods of separately measuring individual blade frequencies cannot be applied and, therefore, it is desirable to develop methods that can infer the properties of the individual blades from the behavior of the blade-disk assembly as a whole.

Therefore, to accurately measure mistuning, it is desirable to develop methods or reduced order models that apply to individual blades or the blade-disk assembly as a whole. It is further desirable to use the mistuning values obtained from the newly-devised reduced order models to verify finite element models of the system and also to monitor the frequencies of individual blades to determine if they have changed because of cracking, erosion or other structural changes. It is also desirable that the obtained mistuning values can be analytically adjusted and used with the reduced order model to predict the vibratory response of the structure (or bladed disk) when it is in use, e.g., when it is rotating in a gas turbine engine, an industrial turbine, a fan, or any other rotating apparatus.

SUMMARY

In one embodiment, the present disclosure contemplates a method that comprises obtaining a set of vibration measurements that provides frequency deviation of each blade of a bladed disk system from the tuned frequency value of the blade and nominal frequencies of the bladed disk system when tuned; and calculating the mistuned modes and natural frequencies of the bladed disk system from the blade frequency deviations and the nominal frequencies.

In another embodiment, the present disclosure contemplates a method that comprises obtaining nominal frequencies of a bladed disk system when tuned; measuring at least one mistuned mode and natural frequency of the bladed disk system; and calculating mistuning of at least one blade (or blade-disk sector) in the bladed disk system from only the nominal frequencies and the at least one mistuned mode and natural frequency.

In a further embodiment, the present disclosure contemplates a method that comprises measuring a set of mistuned modes and natural frequencies of a bladed disk system; and calculating mistuning of at least one blade in the bladed disk system and nominal frequencies of the bladed disk system when tuned by using only the set of mistuned modes and natural frequencies.

In a still further embodiment, the present disclosure contemplates a method that comprises obtaining frequency response data of each blade in a bladed disk system to a traveling wave excitation; transforming data related to spatial distribution of the traveling wave excitation and the frequency response data; and determining a set of mistuned modes and natural frequencies of the bladed disk system using data obtained from the transformation.

According to the methodology of the present disclosure, a reduced order model called the Fundamental Mistuning Model (FMM) is developed to accurately predict vibratory response of a bladed disk system. FMM may describe the normal modes and natural frequencies of a mistuned bladed disk using only its tuned system frequencies and the frequency mistuning of each blade/disk sector (i.e., the sector frequencies). If the modal damping and the order of the engine excitation are known, then FMM can be used to calculate how much the vibratory response of the bladed disk will increase because of mistuning when it is in use. The tuned system frequencies are the frequencies that each blade-disk and blade would have were they manufactured exactly the same as the nominal design specified in the engineering drawings. The sector frequencies distinguish blade-disks with high vibratory response from those with a low response. The FMM identification methods—basic and advanced FMM ID methods—use the normal (i.e., mistuned) modes and natural frequencies of the mistuned bladed disk measured in the laboratory to determine sector frequencies as well as tuned system frequencies. Thus, one use of the FMM methodology is to: identify the mistuning when the bladed disk is at rest, to extrapolate the mistuning to engine operating conditions, and to predict how much the bladed disk will vibrate under the operating (rotating) conditions.

In one embodiment, the normal modes and natural frequencies of the mistuned bladed disk are directly determined from the disk's vibratory response to a traveling wave excitation in the engine. These modes and natural frequency may then be input to the FMM ID methodology to monitor the sector frequencies when the bladed disk is actually rotating in the engine. The frequency of a disk sector may change if the blade's geometry changes because of cracking, erosion, or impact with a foreign object (e.g., a bird). Thus, field calibration and testing of the blades (e.g., to assess damage from vibrations in the engine) may be performed using traveling wave analysis and FMM ID methods together.

The FMM software (containing FMM ID methods) may receive the requisite input data and, in turn, predict bladed disk system's mistuning and vibratory response. Because the FMM model can be generated completely from experimental data (e.g., using the advanced FMM ID method), the tuned system frequencies from advanced FMM ID may be used to validate the tuned system finite element model used by industry. Further, FMM and FMM ID methods are simple, i.e., no finite element mass or stiffness matrices are required. Consequently, no special interfaces are required for FMM to be compatible with a finite element model.

BRIEF DESCRIPTION OF THE DRAWINGS

For the present disclosure to be easily understood and readily practiced, the present disclosure will now be described for purposes of illustration and not limitation, in connection with the following figures, wherein:

FIG. 1 illustrates a bladed disk which is representative of those used in gas turbine engines;

FIG. 2 represents an exemplary selection of nodal diameter modes in a bladed disk;

FIG. 3 is an exemplary nodal diameter map of a bladed disk's natural frequencies;

FIG. 4 illustrates exemplary forced response tracking plots of a tuned bladed disk system and the mistuned disk system;

FIG. 5 illustrates near equivalence of sector modes from various nodal diameters;

FIG. 6 illustrates an exemplary three dimensional (3D) finite element model of a high pressure turbine (HPT) blade-disk sector;

FIGS. 9(a) and (b) depict representative results of using FMM with a realistic mistuned bladed disk modeled in FIG. 6;

FIGS. 10(a) and (b) show a representative case of the blade amplitudes as a function of excitation frequency for a $7^{th}$ engine order excitation predicted by the mass-spring model, ANSYS® software, and FMM;

FIGS. 13(a)–(c) illustrate FMM and ANSYS® software predictions of blade amplitude as a function of excitation frequency for a $7^{th}$ engine order excitation of $2^{nd}$, $3^{rd}$, and $4^{th}$ families respectively;

FIG. 23 illustrates natural frequencies of a test compressor with no mistuning;

FIG. 24 illustrates a typical transfer function from a test compressor obtained using the test setup shown in FIG. 22;

FIG. 25 illustrates a comparison of mistuning from each FMM ID method with benchmark results for a test rotor SN-1;

FIG. 26 shows a comparison of tuned system frequencies for the test rotor SN-1 from advanced FMM ID and the finite element model (FMM) using ANSYS® software;

FIGS. 27 and 28 are similar to FIGS. 25 and 26, respectively, but illustrate the identified mistuning and tuned system frequencies for a different test rotor SN-3;

FIGS. 29(a) and (b) show a comparison, for rotors SN-1 and SN-3 respectively, of the mistuning identified by FMM ID with the values from benchmark results from geometric measurements;

FIG. 30 illustrates a comparison of tuned system frequencies from advanced FMM ID and ANSYS® software for torsion modes of rotors SN-1 and SN-3;

FIG. 31(a) depicts FMM-based forced response data, whereas FIG. 31(b) depicts the experimental forced response data;

FIGS. 32(a) and (b) respectively show relative blade amplitudes at forced response resonance for the resonant peaks labeled ① and ② in FIG. 31(a);

FIG. 33 depicts cumulative probability function plots of peak blade amplitude for a nominally tuned and nominally mistuned compressor;

FIG. 34 shows mean and standard deviations of each sector's mistuning for a nominally mistuned compressor;

FIG. 35 illustrates a lumped parameter model of a rotating blade;

FIGS. 40(a), (b) and (c) show a comparison of the representative mode shape extracted from the traveling wave response data with benchmark results for a stationary benchmark;

FIGS. 44(a) and (b) show tracking plots of blade amplitudes as a function of excitation frequency for two different acceleration rates;

DETAILED DESCRIPTION

Figure 7:
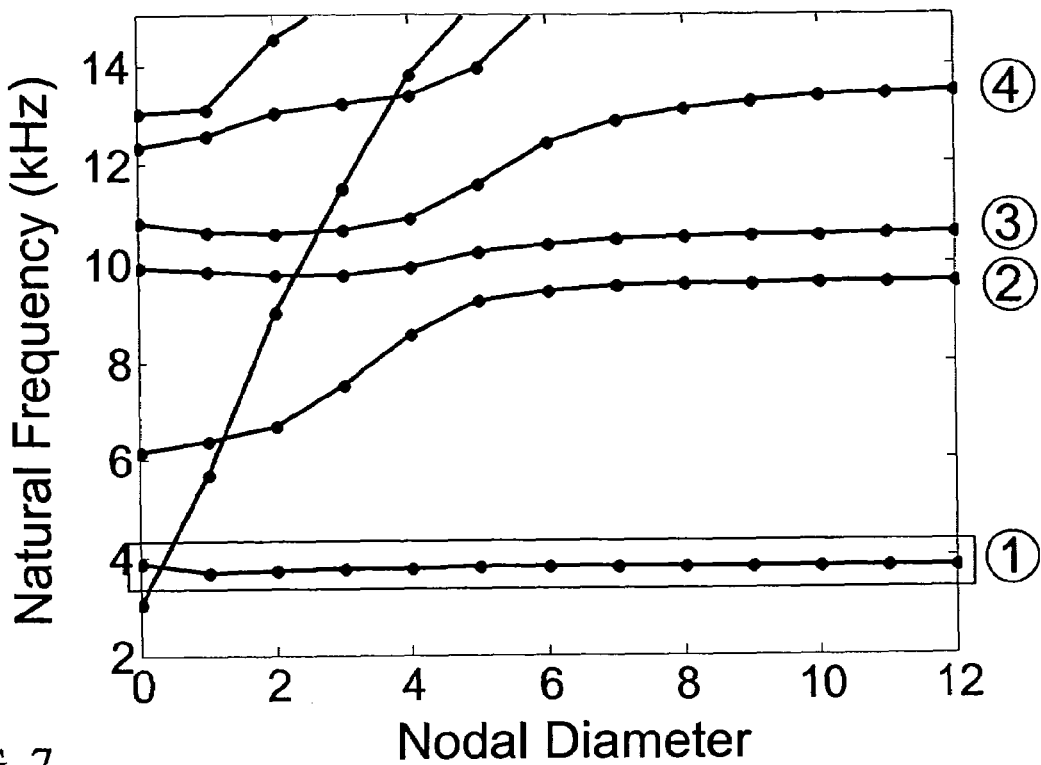
FIG. 7 shows tuned system frequencies of the first families of modes of the blade-disk sector modeled in FIG. 6.

Reference will now be made in detail to some embodiments of the present disclosure, examples of which are illustrated in the accompanying drawings. It is to be understood that the figures and descriptions of the present disclosure included herein illustrate and describe elements that are of particular relevance to the present disclosure, while eliminating, for the sake of clarity, other elements found in typical bladed disk systems, engines, or rotating devices. It is noted here that the although the discussion given below is primarily with reference to a blade-disk sector, the principles given below can be equally applied to just the blade portion of the blade-disk sector as can be appreciated by one skilled in the art. Therefore, the terms "blade" and "blade-disk sector" have been used interchangeably in the discussion below, and no additional discussion of the blade-only application is presented herein.

[1] Deriving the Fundamental Mistuning Model (FMM)

The more general form of the modal equation for the Fundamental Mistuning Model (FMM), derived below, is applicable to rotating, bladed apparatus. The generalized FMM formulation differs in two ways from the original FMM derivation described in the paper by D. M. Feiner and J. H. Griffin titled "A Fundamental Model of Mistuning for a Single Family of Modes," appearing in the Proceedings of IGTI, ASME Turbo Expo 2002 (Jun. 3–6, 2002), Amsterdam, The Netherlands. This paper is incorporated herein by reference in its entirety. First, the following derivation no longer approximates the tuned system frequencies by their average value. This allows for a much larger variation among the tuned frequencies. Second, rather than using the blade-alone mode as an approximation of the various nodal diameter sector modes, a representative mode of a single blade-disk sector is used below. Consequently, the approach now includes the disk portion of the mode shape, and thus allows for more strain energy in the disk. Although mistuning may be measured as a percent deviation in the blade-alone frequency (as in the above mentioned paper), in the following discussion mistuning is measured as a percent deviation in the frequency of each blade-disk sector. The sector frequency deviations not only capture mistuning in the blade, but can also capture mistuning in the disk as well as variations in the ways the blades are attached to the disk.

In the discussion below, section 1.1 describes how the subset of nominal modes (SNM) approach is used to reduce the order of the mistuned free-response equations and formulates the problem in terms of reduced order sector matrices, section 1.2 relates the sector matrices to mistuned sector frequencies, and section 1.3 simplifies the resulting mathematical expressions.

1.1 Reduction of Order

Consider a mistuned, bladed disk in the absence of an excitation. The order of its equation of motion may be reduced through a subset of nominal modes (SNM) approach. The resulting reduced order equation can be written as (see, for example, the discussion in the above mentioned Feiner-Griffin paper):

$$[(\Omega^{\circ 2}+\Delta\hat{K})-\omega_j^2(I+\Delta\hat{M})]\vec{\beta}_j=0 \quad (1)$$

$\Omega^{\circ 2}$ is a diagonal matrix of the tuned system eigenvalues (an eigenvalue is equal to the square of the natural frequency of a mode), and I is the identity matrix. $\Delta\hat{K}$ and $\Delta\hat{M}$ are the variations in the modal stiffness and modal mass matrices caused by stiffness and mass mistuning. The vector $\vec{\beta}_j$ contains weighting factors that describe the $j^{th}$ mistuned mode as a limited sum of tuned modes, i.e., $$\vec{\phi}_j = \Phi^\circ \vec{\beta}_j \quad (2)$$

where $\Phi^\circ$ is a matrix whose columns are the tuned system modes.

Note that to first order, $(I+\Delta\hat{M})^{-1}\approx(I-\Delta\hat{M})$. Thus by pre-multiplying (1) by $(I+\Delta\hat{M})^-$ and keeping only first order terms, the expression becomes $$(\Lambda^\circ+\hat{A})\vec{\beta}_j=\omega_j^2\vec{\beta}_j \quad (3)$$

where $$\hat{A}=\Delta\hat{K}-\Delta\hat{M}\Omega^{\circ 2} \quad (4)$$

The next section relates the matrix $\hat{A}$ to the frequency deviations of the mistuned sectors.

1.2 Relating Mistuning to Sector Frequency Deviations

Relating $\hat{A}$ to frequency deviations of the sectors is a three-step process. First, the mistuning matrix is express in terms of the system mode shapes of an individual sector. Then, the system sector modes are related to the corresponding mode of a single, isolated sector. Finally, the resulting sector-mode terms in $\hat{A}$ are expressed in terms of the frequency deviations of the sectors.

1.2.1 Relating Mistuning to System Sector Modes

Consider the mistuning matrix, $\hat{A}$, in equation (4). This matrix can be expressed as a sum of the contributions from each mistuned sector.

$$\hat{A} = \sum_{s=0}^{N-1} \hat{A}^{(s)} \quad (5)$$

where the superscript denotes that the mistuning corresponds to the $s^{th}$ sector. The expression for a single element of $\hat{A}^{(s)}$ is $$\hat{A}_{mn}^{(s)} = \vec{\phi}_m^{\circ(s)H}(\Delta K^{(s)} - \omega_n^{\circ 2}\Delta M^{(s)})\vec{\phi}_n^{\circ(s)} \quad (6)$$

where $\Delta K^{(s)}$ and $\Delta M^{(s)}$ are the physical stiffness and mass perturbations of the $s^{th}$ sector. The modes $\vec{\phi}_m^{\circ(s)}$ and $\vec{\phi}_n^{\circ(s)}$ are the portions of the $m^{th}$ and $n^{th}$ columns of $\Phi^\circ$ which describe the $s^{th}$ sector's motion. The term $\omega_n^{\circ 2}$ is the nth diagonal element of $\Omega^{\circ 2}$. Equation (6) relates the mistuning to the system sector modes. In the next section, these modes are related to the mode of a single isolated blade-disk sector.

1.2.2 Relating System Sector Modes to an Average Sector Mode

The tuned modes in equation (6) are expressed in a complex traveling wave form. Thus, the motion of the $s^{th}$ sector can be related to the motion of the $0^{th}$ sector by a phase shift. Thus, equation (6) can be restated as $$\hat{A}_{mn}^{(s)} = e^{is(n-m)\frac{2\pi}{N}}\vec{\phi}_m^{\circ(s)H}(\Delta K^{(s)} - \omega_n^{\circ 2}\Delta M^{(s)})\vec{\phi}_n^{\circ(0)} \quad (7)$$

Because the tuned modes used in the SNM formulation are an isolated family of modes, the sector modes of all nodal diameters look nearly identical as can be seen from FIG. 5, which illustrates near equivalence of sector modes from various nodal diameters. Therefore, one can approximate the various sector modes by an average sector mode. Applying the average sector mode approximation for the system sector modes in equation (7), $\hat{A}_{mn}^{(s)}$ can be written as $$\hat{A}_{mn}^{(s)} = \left(\frac{\omega_m^\circ \omega_n^\circ}{\omega_\psi^{\circ 2}}\right) e^{is(n-m)\frac{2\pi}{N}}\left[\vec{\psi}^{\circ(0)H}(\Delta K^{(s)} - \omega_n^{\circ 2}\Delta M^{(s)})\vec{\psi}^{\circ(0)}\right] \quad (8)$$

where $\vec{\psi}^{\circ(0)}$ is the average tuned system sector mode, and $\omega_\psi^\circ$ is its natural frequency. In practice, $\vec{\psi}^{\circ(0)}$ can be taken to be the median modal diameter mode. The factor $(\omega_m^\circ\omega_n^\circ)/(\omega_\psi^{\circ 2})$ scales the average sector mode terms so that they have approximately the same strain energy as the sector modes they replace.

1.2.3 Introduction of Sector Frequency Deviation

The deviation in a sector frequency quantity may be used to measure mistuning. To understand this concept, consider an imaginary "test" rotor. In the test rotor every sector is mistuned in the same fashion, so as to match the mistuning in the sector of interest. Since the test rotor's mistuning is cyclically symmetric, its mode shapes are virtually identical to those of the tuned system. However, there will be a shift in the tuned system frequencies. For small levels of mistuning, the frequency shift is nearly the same in all of the tuned system modes and can be approximated by the fractional change in the frequency of the median nodal diameter mode. This may typically be the case for an isolated family of modes in which the strain energy is primarily in the blades. If there is a significant amount of strain energy in the disk then the frequency of the modes may change significantly as a function of nodal diameter and the modes may not be isolated (i.e., the modes may cover such a broad frequency range that they may interact with other families of modes). However, in the following, the fractional shift in the median nodal diameter's frequency is taken as a measure of mistuning and is defined as the sector frequency deviation.

The bracketed terms of in equation (8) are related to these frequency deviations in the following manner. Consider a bladed disk that is mistuned in a cyclic symmetric fashion, i.e., each sector undergoes the same mistuning. Its free-response equation of motion is given by the expression $$[(K^\circ + \Delta K) - \omega_n^2(M^\circ + \Delta M)]\vec{\phi}_n = 0 \quad (9)$$

Take the mode $\vec{\phi}_n$ to be the mistuned version of the tuned median nodal diameter mode, $\vec{\psi}^\circ$. Here, $\vec{\psi}^\circ$ is the full system mode counterpart of the average sector mode $\vec{\psi}^{\circ(0)}$. Because mistuning is symmetric, the tuned and mistuned versions of the mode are nearly identical. Substituting $\vec{\psi}^\circ$ for $\vec{\phi}_n$ and pre-multiplying by $\vec{\psi}^{\circ H}$ yields, $$(\omega_\psi^{\circ 2} + \vec{\psi}^{\circ H}\Delta K\vec{\psi}^\circ) - \omega_n^2(1 + \vec{\psi}^{\circ H}\Delta M\vec{\psi}^\circ) = 0 \quad (10)$$

These terms may be rearranged to isolate the frequency terms, $$\vec{\psi}^{\circ H}(\Delta K - \omega_n^2\Delta M)\vec{\psi}^\circ = \omega_j^2 - \omega_\psi^{\circ 2} \quad (11)$$

Because the mistuning is symmetric, each sector contributes equally to equation (11). Thus, the contribution from the $0^{th}$ sector is, $$\vec{\psi}^{\circ(0)H}(\Delta K - \omega_n^2\Delta M)\vec{\psi}^{\circ(0)} = \frac{1}{N}(\omega_j^2 - \omega_\psi^{\circ 2}) \quad (12)$$

By factoring the frequency terms on the right-hand side of equation (12), it can be shown that $$\vec{\psi}^{\circ(0)H}(\Delta K - \omega_n^2\Delta M)\vec{\psi}^{\circ(0)} \approx \frac{2\omega_\psi^{\circ 2}\Delta\omega_\psi}{N} \quad (13)$$

where $\Delta\omega_\psi$ is the fractional change in $\vec{\psi}$'s natural frequency due to mistuning, given by $\Delta\omega_\psi = (\omega_\psi - \omega_\psi^\circ)/\omega_\psi^\circ$. Note that, by definition, $\Delta\omega_\psi$ is a sector frequency deviation. Equation (13) can be substituted for the bracketed terms of equation (8), resulting in an expression that relates the elements of the sector "s" mistuning matrix to that sector's frequency deviation, $$\hat{A}_{mn}^{(s)} = \frac{2\omega_m^\circ \omega_n^\circ}{N} e^{is(n-m)\frac{2\pi}{N}} \Delta\omega_\psi^{(s)} \quad (14)$$

where the superscript on $\Delta\omega_\psi$ is introduced to indicate that the frequency deviation corresponds to the $s^{th}$ sector. These sector contributions may be summed to obtain the elements of the mistuning matrix, $$\hat{A}_{mn} = 2\omega_m^\circ \omega_n^\circ \left[\frac{1}{N}\sum_{s=0}^{N-1} e^{isp\frac{2\pi}{N}}\Delta\omega_\psi^{(s)}\right] \quad (15)$$

1.3 The Simplified Form of the Fundamental Mistuning Model Modal Equation

The bracketed term in equation (15) is the discrete Fourier transform (DFT) of the sector frequency deviations. If one uses the dummy variable p to replace the quantity (n−m) in equation (15), then the $p^{th}$ DFT of the sector frequency deviations is given by $$\bar{\omega}_p = \left[\frac{1}{N}\sum_{s=0}^{N-1} e^{isp\frac{2\pi}{N}}\Delta\omega_\psi^{(s)}\right] \quad (16)$$

where $\bar{\omega}_p$ denotes the $p^{th}$ DFT. By substituting equation (16) into equation (15), $\hat{A}$ may be expressed in the simplified matrix form $$\hat{A} = 2\Omega^\circ \bar{\Omega} \Omega^\circ \quad (17)$$

where $$\bar{\Omega} = \begin{bmatrix} \bar{\omega}_0 & \bar{\omega}_1 & \cdots & \bar{\omega}_{N-1} \\ \bar{\omega}_{N-1} & \bar{\omega}_0 & \cdots & \bar{\omega}_{N-2} \\ \vdots & \vdots & & \vdots \\ \bar{\omega}_1 & \bar{\omega}_2 & \cdots & \bar{\omega}_0 \end{bmatrix} \quad (18)$$

$\bar{\Omega}$ is a matrix which contains the discrete Fourier transforms of the sector frequency deviations. Note that $\bar{\Omega}$ has a circulant form, and thus contains only N distinct elements. $\Omega^\circ$ is a diagonal matrix of the tuned system frequencies.

Substituting equation (17) into equation (3) produces the most basic form of the eigenvalue problem that may be solved to determine the modes and natural frequencies of the mistuned system.

$$(\Omega^{\circ 2} + 2\Omega^\circ \bar{\Omega} \Omega^\circ)\vec{\beta}_j = \omega_j^2 \vec{\beta}_j \quad (19)$$

Equations (18) and (19) represent the functional form of the Fundamental Mistuning Model. Here, $\Omega^{\circ 2}$ is a diagonal matrix of the nominal system eigenvalues, ordered in accordance with the following equation.

$$\left\{\begin{array}{cccccccc} \vec{\phi}_0^{\circ(s)} & \vec{\phi}_1^{\circ(s)} & \vec{\phi}_2^{\circ(s)} & \cdots & \vec{\phi}_{\frac{N}{2}}^{\circ(s)} & \vec{\phi}_{\frac{N}{2}+1}^{\circ(s)} & \cdots & \vec{\phi}_{N-1}^{\circ(s)} \\ (0) & (1B) & (2B) & \cdots & \left(\frac{N}{2}\right) & \left(\left(\frac{N}{2}-1\right)F\right) & \cdots & (1F) \end{array}\right\} \quad (20)$$

where the second row in equation (20) indicates the nodal diameter and direction of the corresponding mode that lies above it. "B" denotes a backward traveling wave, defined as a mode with a positive phase shift from one sector to the next, and "F" denotes a forward traveling wave, defined as a mode with a negative phase shift from one sector to the next. Note that the modes are numbered from 0 to N−1.

As mentioned before, the eigenvalues are equal to the squares of the natural frequencies of the tuned system. This $\Omega^{o2}$ matrix contains all the nominal system information required to calculate the mistuned modes. Note that the geometry of the system does not directly enter into this expression. The term representing mistuning in equation (1), $2\Omega^o\overline{\Omega}\Omega^o$, is a simple circulant matrix that contains the discrete Fourier transforms of the blade frequency deviations, pre- and post-multiplied by the tuned system frequencies.

The eigenvalues of equation (19) are the squares of the mistuned frequencies, and the eigenvectors define the mistuned mode shapes through equation (2). Because the tuned modes have been limited to a single family and appear in $\Phi^o$ in a certain order, one can approximately calculate the distortion in the mistuned mode shapes without knowing anything specific about $\Phi^o$. The reason for this is the assumption that all of the tuned system modes on the zero$^{th}$ sector look nearly the same, i.e. $\vec{\phi}_m^{o(0)} \approx \vec{\phi}_n^{o(0)}$. Further, when the tuned system modes are written in complex, traveling wave form, the amplitudes of every blade in a mode are the same, but each blade has a different phase. Therefore, the part of the mode corresponding to the s$^{th}$ sector can be written in terms of the same mode on the 0$^{th}$ sector, multiplied by an appropriate phase shift, i.e., $$\vec{\phi}_n^{o(s)} = e^{isn\frac{2\pi}{N}}\vec{\phi}_n^{o(0)} \quad (21)$$

where $i=\sqrt{-1}$. Equation (21) implies that if the j$^{th}$ mistune mode is given by $\vec{\beta}_j=[\beta_{j0}, \beta_{j1} \ldots \beta_{j,N-1}]^T$ then the physical displacements of the n$^{th}$ blade in this mode proportional to $$x_n = \sum_{m=0}^{N-1} \beta_{jm} e^{imn\frac{2\pi}{N}} \quad (22)$$

1.4 Numerical Results

A computer program was written to implement the theory presented in sections (1.1) through (1.3). The program also incorporated a simple modal summation algorithm to calculate the bladed disk's forced response. The modal summation assumed constant modal damping. The basic modal summation algorithm was chosen to benchmark the forced response because a similar algorithm may be used as an option in the commercial finite element analysis ANSYS® software, which was used as a benchmark. It is observed, however, that FMM may be used with more sophisticated methods for calculating the forced response, such as the state-space approach used in a subset of nominal modes (SNM) analysis discussed in Yang M.-T. and Griffin, J. H., 2001, "A Reduced Order Model of Mistuning Using a Subset of Nominal Modes," Journal of Engineering for Gas Turbines and Power, 123(4), pp. 893–900.

It is noted that when a beam-like blade model is used (to minimize the computational cost), FMM could accurately calculate a bladed disk's mistuned response based on only sector frequency deviations, without regard for the physical cause of the mistuning. However, in the discussion below, a more realistic geometry is analyzed using FMM.

FIG. 6 illustrates an exemplary three dimensional (3D) finite element model 22 of a high pressure turbine (HPT) blade-disk sector. There were 24 sectors in the full system. This model was developed by approximating the features of an actual turbine blade and provided a reasonable test of FMM's ability to represent a realistic blade geometry. FIG. 7 shows tuned system frequencies of the first families of modes of the blade-disk system modeled in FIG. 6. As can be seen from FIG. 7, the system of FIG. 6 had an isolated first bending family of modes with closely spaced frequencies. As a benchmark, a finite element analysis was performed of the full mistuned rotor using the ANSYS® software. The bladed disk was mistuned by randomly varying the elastic moduli of the blades with a standard deviation that was equal to 1.5% of the tuned system's elastic modulus.

Figure 8:
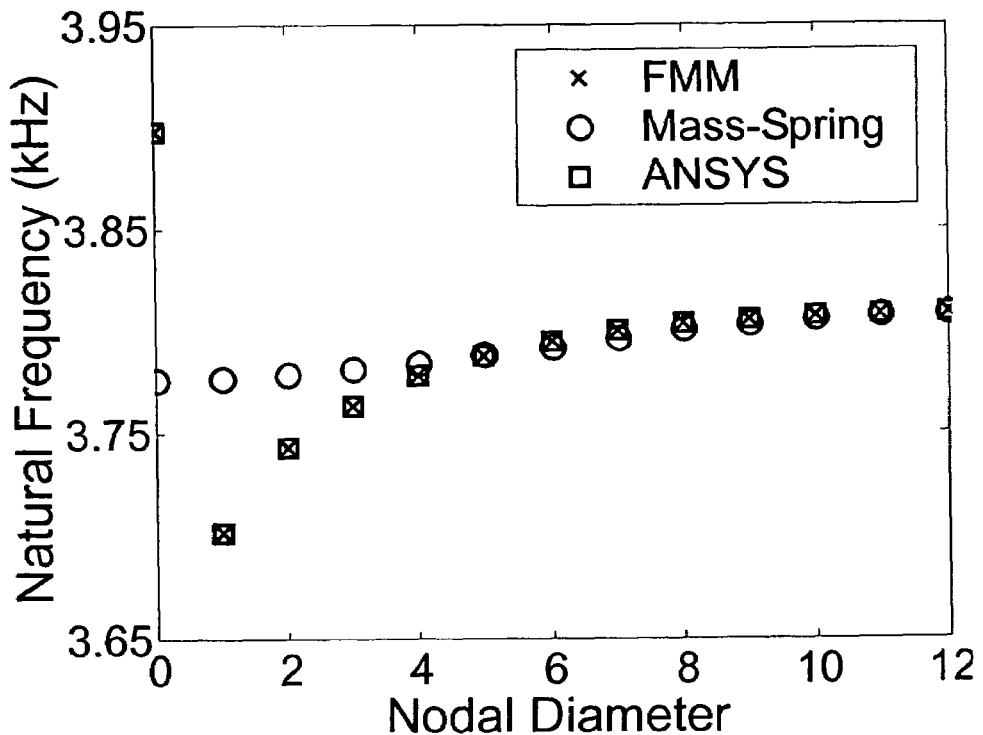
FIG. 8 illustrates the tuned frequencies of the fundamental family of modes of the system modeled in FIG. 6, along with the frequencies as determined by ANSYS® software and the best-fit mass-spring model.

Then, an equivalent mass-spring model was constructed with one degree-of-freedom per sector as described in Rivas-Guerra, A. J., and Mignolet, M. P., 2001, "Local/Global Effects of Mistuning on the Forced Response of Bladed Disks," ASME Paper 2001-GT-0289, International Gas Turbine Institute Turbo Expo, New Orleans, La. Each mass was set to unity and the stiffness parameters were obtained through a least squares fit of the tuned natural frequencies. FIG. 8 illustrates the tuned frequencies of the fumdamental family of modes of the system modeled in FIG. 6, along with the frequencies of the ANSYS® software and the best-fit mass-spring model. It is noted that while the mass-spring model was able to capture the higher nodal diameter frequencies fairly well, it had great difficulty with the low nodal diameter frequencies. This discrepancy arises because the natural frequencies of the single degree-of-freedom mass-spring system have the form $$\omega_n = \sqrt{[k+4k_c\sin^2(n\pi/N)]/m} \quad (23)$$

where m is the blade mass, k and $k_c$ are the base stiffness and coupling stiffness, n is the nodal diameter of the mode, and N is the number of blades. However, the actual frequencies of the finite element model have a significantly different shape when plotted as a function of nodal diameters. In contrast, FMM takes the actual finite element frequencies as input parameters, and therefore it matches the tuned system's frequencies exactly.

The mass-spring model was then mistuned by adjusting the base stiffness of the blades to correspond to the modulus changes used in the finite element model. The mistuned modes and forced response were then calculated with both FMM and the mass-spring model, and compared with the finite element results using the ANSYS® software. FIGS. 9(a) and (b) depict representative results of using FMM with a realistic mistuned bladed disk modeled in FIG. 6. As can be seen from FIG. 9(a), the mistuned frequencies predicted by FMM and ANSYS® software were quite similar. However the mass-spring model had some significant discrepancies, especially in the low frequency modes. FMM and ANSYS® software also predicted essentially the same mistuned mode shapes as can be seen from FIG. 9(b). In contrast, the mass-spring model performed poorly when matching the finite element mode shapes, even on modes whose frequencies were accurately predicted. For example, the mode plotted in FIG. 9(b) corresponded to the 18$^{th}$ frequency. From FIG. 9(a), it is seen that the mass-spring model accurately predicted this frequency. However, it is clear from FIG. 9(b) that the mass-spring model still did a poor job of matching the finite element mode shapes.

The predicted modes were then summed to obtain the system's forced response to various engine order excitations. As noted before, gas turbine engines are composed of a series of bladed disks (see, for example, FIG. 1). When a bladed disk is operating in an engine, it is subjected to pressure loading from the flow field which excites the blades. As the flow progresses through the engine, it passes over support struts, inlet guide vanes, and other stationary structures which cause the pressure to vary circumferentially. Therefore, the excitation forces are periodic in space when considered from a stationary reference frame. As a periodic excitation, the pressure variations can be spatially decomposed into a Fourier series. Each harmonic component drives the system with a traveling wave at a frequency given by the product of its harmonic number and the rotation speed. The harmonic number of the excitation is typically referred to as the Engine Order, and corresponds physically to the number of excitation periods per revolution. Each of the engine order excitations may be generally considered separately, because they drive the system at different frequencies.

FIGS. 10(a) and (b) show a representative case of the blade amplitudes as a function of excitation frequency for a $7^{th}$ engine order excitation predicted by the mass-spring model, ANSYS® software, and FMM. For clarity, only the high responding, median responding, and low responding blades are plotted. It is again seen that the mass-spring model provided a poor prediction of the system's forced response. However, the results from FMM agreed well with those computed by ANSYS® software, as shown in FIG. 10(b). The prediction by FMM of the highest blade response differed from that predicted by ANSYS® software by only 1.6%. Thus, FMM may be used to provide accurate predictions of the mode shapes and forced response of a turbine blade with a realistic geometry.

1.5 Other Considerations

From the foregoing discussion, it is seen that the Fundamental Mistuning Model was derived from the Subset of Nominal Modes theory by applying three simplifying assumptions: only a single, isolated family of modes is excited; the strain energy of that family's modes is primarily in the blades; and the family's frequencies are closely spaced. In addition, one corollary of these assumptions is that the blade's motion looks very similar among all modes in the family. As demonstrated in the previous section, FMM works quite well when these assumptions are met. However, these ideal conditions are usually found only in the fundamental modes of a rotor. The higher frequency families are often clustered close together, have a significant amount of strain energy in the disk, and span a large frequency range. Furthermore, veerings are quite common, causing a family's modes to change significantly from one nodal diameter to the next. Therefore, there may be situations where FMM may not work effectively in high frequency regions.

Figure 11:
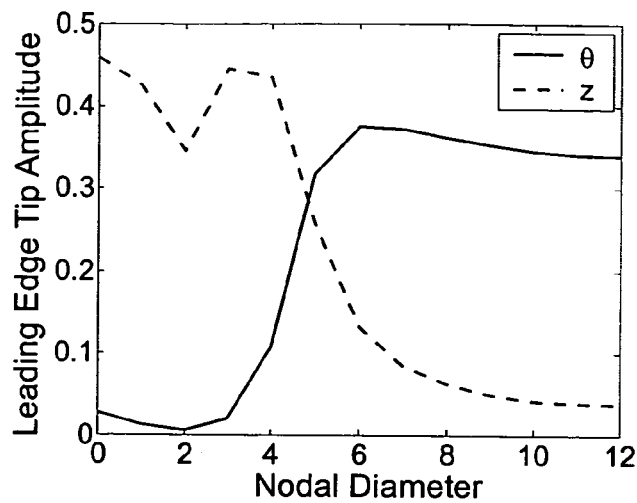
FIG. 11 illustrates the leading edge blade tip displacements for the third family of modes shown in FIG. 7.

The realistic HPT model of FIG. 6 may be used to further study FMM's performance, without the need carefully assign modes to families. Therefore, some crossings shown in FIG. 7 may in fact be veerings. However, because such errors are easily made in practice, it is useful to include them in the study. For reference, four mode families are numbered along the right side of FIG. 7. It is noted that except for the fundamental modes, the families (in FIG. 7) undergo a significant frequency increase between 0 and 6 nodal diameters. The steep slopes in this region suggest that the modes have a large amount of strain energy in the disk. Furthermore, the high modal density in this area makes it likely that some modes were assigned to the wrong family. Therefore, the modes of a single family may likely change significantly from one nodal diameter to the next. To show this behavior, FIG. 11 illustrates the leading edge blade tip displacements for the third family of modes shown in FIG. 7. FIG. 11 shows how the circumferential (θ) and out-of-plane (z) motion of the blade tip's leading edge changes from the 0 nodal diameter mode to the 12 nodal diameter mode. Observe that the θ and z components of the mode shape change significantly between 0 and 6 nodal diameters. In such case, the assumptions of FMM are violated throughout these low nodal diameter regions. Thus, FMM may not accurately predict the mistuned frequencies or shapes of these modes. As a result, FMM may not provide accurate forced response predictions when these modes are heavily excited.

Figure 12:
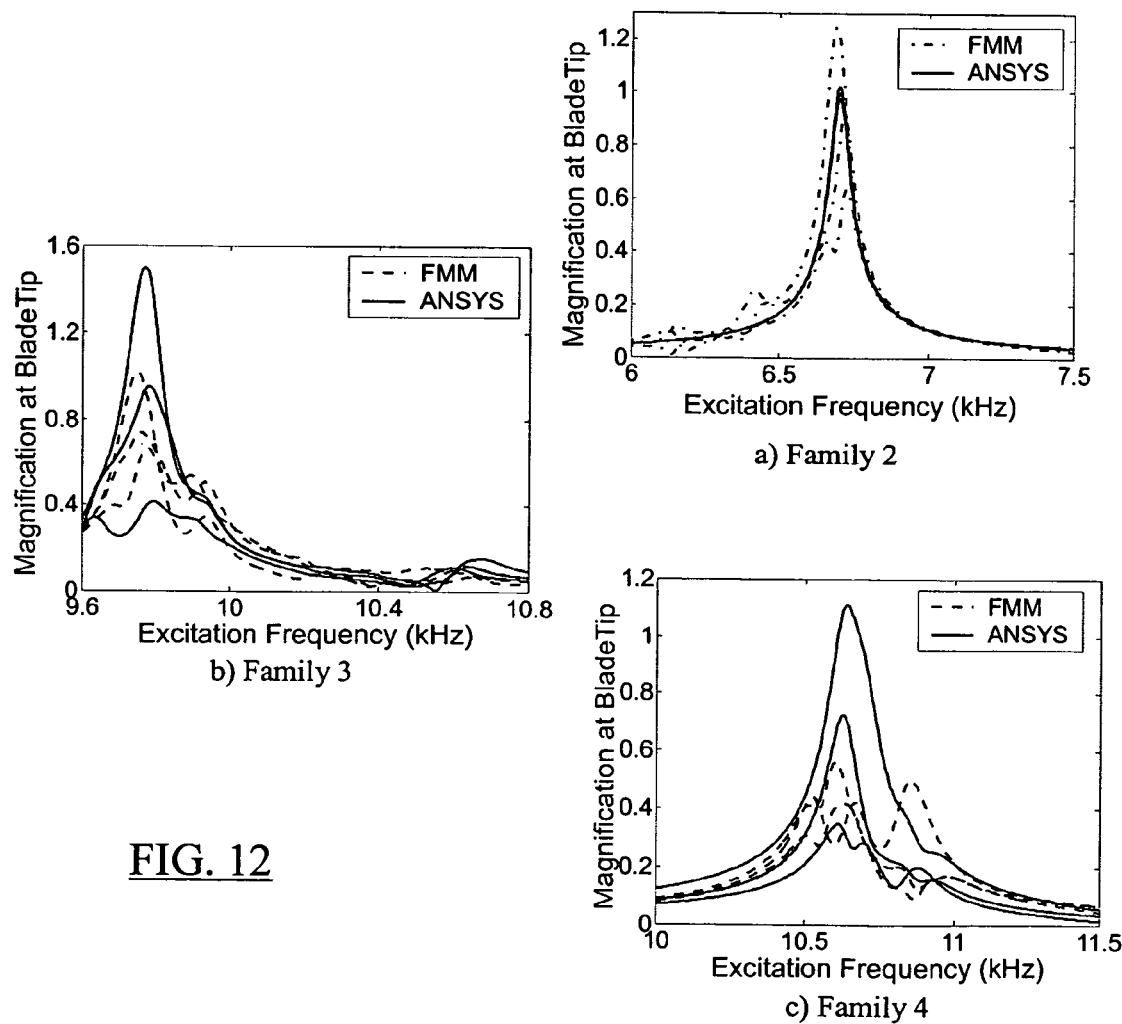
FIGS. 12(a)–(c) illustrate FMM and ANSYS® software predictions of blade amplitude as a function of excitation frequency for a $2^{nd}$ engine order excitation of $2^{nd}$, $3^{rd}$, and $4^{th}$ families respectively.

To illustrate FMM performance in such situations, FMM was used to predict the forced response of families 2, 3, and 4 to a $2^{nd}$ engine-order excitation because that engine order would primarily excite the low nodal diameter modes of each family, and those modes violate the assumptions of FMM. The FMM predictions were compared with finite element results calculated in ANSYS® software. FIGS. 12(a)–(c) illustrate FMM and ANSYS® software predictions of blade amplitude as a function of excitation frequency for a $2^{nd}$ engine order excitation of $2^{nd}$, $3^{rd}$, and $4^{th}$ families respectively. For clarity, each plot in FIGS. 12(a)–(c) shows only the low responding blade, the median responding blade, and the high responding blade. As expected, the FMM results differed significantly from the ANSYS® software response in both peak amplitudes and overall shape of the response. Thus, when a mode lies in a region where there is uncertainty as to what family a mode belongs, veering, or high slopes on the frequency vs. nodal diameter plot, FMM may not always accurately predict its mistuned frequency or mode shape. That is, FMM may not work effectively for engine orders that excite modes in these regions.

However, there are regions in high frequency modes where FMM may perform quite well. It is seen from the Frequency vs. Nodal Diameter plot in FIG. 7 that the slopes over the high nodal diameter regions are very small, indicating that the modes have most of their strain energy in the blades. Furthermore, the flat regions are well isolated from other families of modes. Therefore, the blade's motion is very similar from one nodal diameter to the next. This can be seen in FIG. 11, which indicates that the θ and z components of the blade tip motion remain fairly constant over the higher nodal diameter regions. In that case, the FMM assumptions are satisfied for these high nodal diameter modes, and FMM may capture the physical behavior of these modes better than it did for low engine orders.

To illustrate FMM performance in the situation described in the preceding paragraph, FMM was used to predict the forced response of families 2, 3, and 4 to a $7^{th}$ engine order excitation. The FMM results were compared against a finite element benchmark performed in ANSYS® software. FIGS. 13(a)–(c) illustrate FMM and ANSYS® software predictions of blade amplitude as a function of excitation frequency for a $7^{th}$ engine order excitation of $2^{nd}$, $3^{rd}$, and $4^{th}$ families respectively. For clarity, each plot in FIGS. 13(a)–(c) shows only the low responding blade, the median responding blade, and the high responding blade. In all three cases in FIG. 13, the FMM predictions captured the overall shape of the response curves as well as the peak amplitudes to within 6% of the ANSYS® software performance. Therefore, for this test case, it is observed that when a mode lies in a flat region at the upper end of a Frequency vs. Nodal Diameter plot, its response can be reasonably well predicted by FMM.

[2] System Identification Methods

It is seen from the discussion hereinbefore that the Fundamental Mistuning Model provides a simple, but accurate method for assessing the effect of mistuning on forced response, generally in case of an isolated family of modes. However, FMM can be used to derive more complex reduced order models to analyze mistuned response in regions of frequency veering, high modal density and cases of disk dominated modes. These complex models may not necessarily be limited to an isolated family of modes.

The following description of system identification is based the Fundamental Mistuning Model. As a result, the FMM based identification methods (FMM ID) (discussed below) may be easy to use and may require very little analytical information about the system, e.g., no finite element mass or stiffness matrices may be necessary. There are two forms of FMM ID methods discussed below: a basic version of FMM ID that requires some information about the system properties, and a somewhat more advanced version that is completely experimentally based. The basic FMM ID requires the nominal frequencies of the tuned system as input. The nominal frequencies of the tuned system (i.e., natural frequencies of a tuned system with each sector being identical) may be calculated using a finite element analysis of a single blade-disk sector with cyclic symmetric boundary conditions applied to the disk. Then, given (experimental) measurements of a limited number of mistuned modes and frequencies, basic FMM ID equations solve for the mistuned frequency of each sector. It is noted that the modes required in basic FMM ID are the circumferential modes that correspond to the tip displacement of each blade around the wheel or disk.

The advanced form of FMM ID uses (experimental) measurements of some mistuned modes and frequencies to determine all of the parameters in FMM, i.e. the frequencies that the system would have if it were tuned as well as the mistuned frequency of each sector. Thus, the tuned system frequencies determined from the second method (i.e., advanced FMM ID) can also be used to validate finite element models of the nominal system.

2.1 Basic FMM ID Method

As noted before, the basic method uses tuned system frequencies along with measurements of the mistuned rotor's system modes and frequencies to infer mistuning.

2.1.1 Inversion of FMM Equation

The FMM eigenvalue problem is given by equation (19), which is reproduced below.

$$(\Omega^{\circ 2}+2\Omega^{\circ}\overline{\Omega}\Omega^{\circ})\vec{\beta}_j=\omega_j^2\vec{\beta}_j \quad (24)$$

The eigenvector of this equation, $\vec{\beta}_j$, contains weighting factors that describe the $j^{th}$ mistuned mode as a sum of tuned modes. The corresponding eigenvalue, $\omega_j^2$, is the $j^{th}$ mode's natural frequency squared. The matrix of the eigenvalue problem contains two terms, $\Omega^{\circ}$ and $\overline{\Omega}$. $\Omega^{\circ}$ is a diagonal matrix of the tuned system frequencies, ordered by ascending inter-blade phase angle of their corresponding mode. The notation a $\Omega^{\circ 2}$ is shorthand for $\Omega^{\circ T}\Omega^{\circ}$, which results in a diagonal matrix of the tuned system frequencies squared. The matrix $\overline{\Omega}$ contains the discrete Fourier transforms (DFT) of the sector frequency deviations.

As discussed earlier, FMM treats the rotor's mistuning as a known quantity that it uses to determine the system's mistuned modes and frequencies. However, if the mistuned modes and frequencies are treated as known parameters, the inverse problem could be solved to determine the rotor's mistuning. This is the basis of FMM ID methods.

The following describes manipulation of the FMM equation of motion to solve for the mistuning in the rotor. Thus, in equation (24), all quantities are treated as known except $\overline{\Omega}$, which describes the system's mistuning. Subtracting the $\Omega^{\circ 2}$ term from both sides of equation (24) and regrouping terms yields $$2\Omega^{\circ}\overline{\Omega}[\Omega^{\circ}\vec{\beta}_j]=(\omega_j^2 I-\Omega^{\circ 2})\vec{\beta}_j \quad (25)$$

The bracketed quantity on the left-hand side of equation (25) contains a known vector, which may be denoted as $\vec{\gamma}_j$, $$\vec{\gamma}_j=\Omega^{\circ}\vec{\beta}_j \quad (26)$$

Thus, $\vec{\gamma}_j$ contains the modal weighting factors, $\vec{\beta}_j$, scaled on an element-by-element basis by their corresponding natural frequencies. Substituting $\vec{\gamma}_j$ into equation (25) yields $$2\Omega^{\circ}[\overline{\Omega}\vec{\gamma}_j]=(\omega_j^2 I-\Omega^{\circ 2})\vec{\beta}_j \quad (27)$$

After some algebra, it can be shown that the product in the bracket in equation (27) may be rewritten in the form $$\overline{\Omega}\vec{\gamma}_j=\Gamma_j\vec{\omega} \quad (28)$$

where the vector $\vec{\omega}$ equals $[\overline{\omega}_0, \overline{\omega}_1 \ldots \overline{\omega}_{N-1}]^T$. The matrix $\Gamma_j$ is composed from the elements in $\vec{\gamma}_j$ and has the form $$\Gamma_j = \begin{bmatrix} \overline{\gamma}_{j0} & \overline{\gamma}_{j1} & \cdots & \overline{\gamma}_{j(N-1)} \\ \overline{\gamma}_{j1} & \overline{\gamma}_{j2} & \cdots & \overline{\gamma}_{j0} \\ \vdots & \vdots & & \vdots \\ \overline{\gamma}_{j(N-1)} & \overline{\gamma}_{j0} & \cdots & \overline{\gamma}_{j(N-2)} \end{bmatrix} \quad (29)$$

where $\gamma_{jn}$ denotes the $n^{th}$ element of the vector $\vec{\gamma}_j$; the $\vec{\gamma}_j$ elements are numbered from 0 to N-1. Note that each column of $\Gamma_j$ is the negative permutation of the previous column.

Substituting equation (28) into (27) produces an expression in which the matrix of mistuning parameters, $\overline{\Omega}$, has been replaced by a vector of mistuning parameters, $\vec{\omega}$.

$$2\Omega^{\circ}\Gamma_j\vec{\omega}=(\omega_j^2 I-\Omega^{\circ 2})\vec{\beta}_j \quad (30)$$

Pre-multiplying equation (30) by $(2\Omega^{\circ}\Gamma_j)^{-1}$ would solve this expression for the DFT (Discrete Fourier Transform) of the rotor's mistuning. Furthermore, the vector $\vec{\omega}$ can then be related to the physical sector mistuning through an inverse discrete Fourier transform. However, equation (30) only contains data from one measured mode and frequency. Therefore, error in the mode's measurement may result in significant error in the predicted mistuning. To minimize the effects of measurement error, multiple mode measurements may be incorporated into the solution for the mistuning.

Equation (30) may be constructed for each of the M measured modes, and the modes may be combined into the single matrix expression, $$\begin{bmatrix} 2\Omega^\circ \Gamma_1 \\ 2\Omega^\circ \Gamma_2 \\ \vdots \\ 2\Omega^\circ \Gamma_m \end{bmatrix} \vec{\omega} = \begin{bmatrix} (\omega_1^2 I - \Omega^{\circ 2})\vec{\beta}_1 \\ (\omega_2^2 I - \Omega^{\circ 2})\vec{\beta}_2 \\ \vdots \\ (\omega_m^2 I - \Omega^{\circ 2})\vec{\beta}_m \end{bmatrix} \quad (31)$$

For brevity, equation (31) may be rewritten as $$\tilde{L}\vec{\omega} = \vec{r} \quad (32)$$

where $\tilde{L}$ is the matrix on the left-hand side of the expression, and $\vec{r}$ is the vector on the right-hand side. The "~" is used to indicate that these quantities are composed by vertically stacking a set of sub-matrices or vectors.

It is noted that the expression in equation (32) is an overdetermined set of equations. Therefore, it may not be possible to solve for a $\vec{\omega}$ by direct inverse. However, one can obtain a least squares fit to the mistuning, i.e.

$$\vec{\omega} = \text{Lsq}\{\tilde{L}, \vec{r}\} \quad (33)$$

Equation (33) produces the vector $\vec{\omega}$ which best-fits all the measured data. Therefore, the error in each measurement is compensated for by the balance of the data. The vector $\vec{\omega}$ can then be related to the physical sector mistuning through the inverse transform, $$\Delta \omega_\psi^{(s)} = \sum_{p=0}^{N-1} e^{-isp\frac{2\pi}{N}} \varpi_p \quad (34)$$

where $\Delta \omega_\psi^{(s)}$ is the sector frequency deviation of the $s^{th}$ sector. The following section describes how equations (33) and (34) can be applied to determine a rotor's mistuning.

2.1.2 Experimental Application of Basic FMM ID

To solve equation (33) and (34) for the sector mistuning, one must first construct $\tilde{L}$ and $\vec{r}$ from the tuned system frequencies and the mistuned modes and frequencies. The tuned system frequencies can be calculated through finite element analysis of a tuned, cyclic symmetric, single blade/disk sector model. However, the mistuned modes and frequencies must be obtained experimentally.

The modes used by basic FMM ID are circumferential modes, corresponding to the tip displacement of each blade on the rotor. In case of isolated families of modes, it may be sufficient to measure the displacement of only one point per blade. In practice, modes and frequencies may be obtained by first measuring a complete set of frequency response functions (FRFs). Then, the modes and frequencies may be extracted from the FRFs using modal curve fitting software.

The mistuned frequencies obtained from the measurements appear explicitly in the basic FMM ID equations as $\omega_j$. However, the mistuned modes enter into the equations indirectly through the modal weighting factors $\vec{\beta}_j$. Each vector $\vec{\beta}_j$ is obtained by taking the inverse discrete Fourier transform of the corresponding single point-per-blade mode, i.e., $$\beta_{jn} = \sum_{m=0}^{N-1} \phi_{jm} e^{-imn\frac{2\pi}{N}} \quad (35)$$

The quantities obtained from equation (35) may then be used with the tuned system frequencies to construct $\tilde{L}$ and $\vec{r}$ as outlined hereinbefore. Finally, equations (33) and (34) may be solved for the sector mistuning. This process is demonstrated through the two examples in the following section.

2.1.3 Numerical Examples for Basic FMM ID

The first example considers an integrally bladed compressor whose blades are geometrically mistuned. The sector frequency deviations identified by basic FMM ID are verified by comparing them with values directly determined by finite element analyses (FEA). The second example highlights basic FMM ID's ability to detect mistuning caused by variations at the blade-disk interface. This example considers a compressor in which all the blades are identical, however they are mounted on the disk at slightly different stagger angles. The mistuning caused by the stagger angle variations is determined by FMM ID and compared with the input values.

2.1.3.1 Geometric Blade Mistuning

Figure 14:
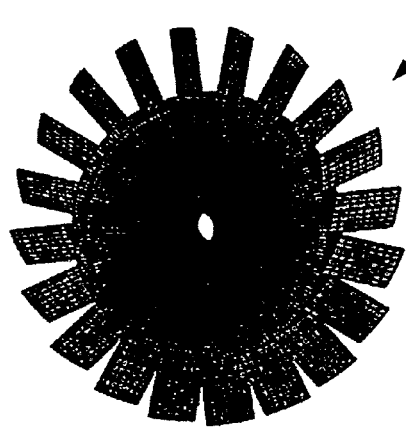
FIG. 14 represents an exemplary finite element model of a twenty blade compressor.

FIG. 14 represents an exemplary finite element model 26 of a twenty blade compressor. Although the airfoils on this model are simply flat plates, the rotor design reflects the key dynamic behaviors of a modern, integrally bladed compressor. The rotor was mistuned through a combination of geometric and material property changes. Approximately one-third of the blades were mistuned through length variations, one-third through thickness variations, and one-third through elastic modulus variations. The magnitudes of the variations were chosen so that each form of mistuning would contribute equally to a 1.5% standard deviation in the sector frequencies.

Figure 15:
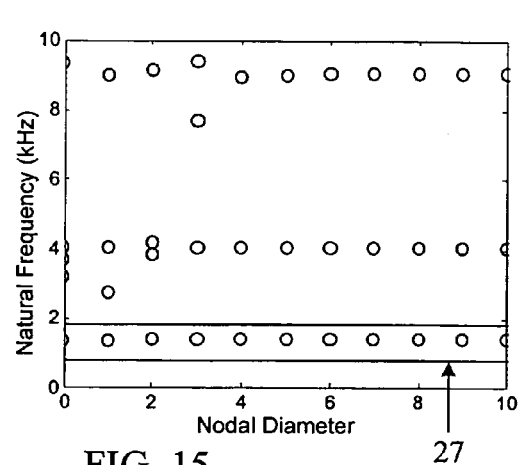
FIG. 15 illustrates the natural frequencies of the tuned compressor modeled in FIG. 14.

A finite element analysis of the tuned rotor was first performed to generate its nodal diameter map. FIG. 15 illustrates the natural frequencies of the tuned compressor modeled in FIG. 14, i.e., the tuned rotor's nodal diameter map. It is observed from FIG. 15 that the lowest frequency family of first bending modes was isolated (as denoted by the rectangle portion 27) for the basic FMM ID analysis. The sector mistuning of this rotor was then determined through two different methods: finite element analyses (FEA) of the mistuned sectors using the commercially available ANSYS finite element code, and basic FMM ID.

The finite element calculations serve as a benchmark to assess the accuracy of the basic FMM ID method. In the benchmark, a finite element model was made for each mistuned blade. In the model the blade was attached to a single disk sector. The frequency change in the mistuned blade/disk sector was then calculated with various cyclic symmetric boundary conditions applied to the disk. It was found that the phase angle of the cyclic symmetric constraint had little effect on the frequency change caused by blade mistuning. The values described herein were for a disk phase constraint of 90 degrees, i.e., for the five nodal diameter mode.

A finite element model of the full, mistuned bladed disk was also constructed and used to compute its mistuned modes and natural frequencies. The modes and frequencies were used as input data for basic FMM ID. In another embodiment, the mistuned modes and frequencies may be obtained through a modal fit of the rotor's frequency response functions. Typically, the measurements may not detect modes that have a node point at the excitation source. To reflect this phenomenon, all mistuned modes that had a small response at blade one were eliminated. This left 16 modes and natural frequencies to apply to basic FMM ID.

The mistuned modes and frequencies were combined with the tuned system frequencies of the fundamental mode family to construct the basic FMM ID equations (31). These equations were solved using a least squares fit. The solution was then converted to the physical sector frequency deviations through the inverse transform given in equation (34).

Figure 16:
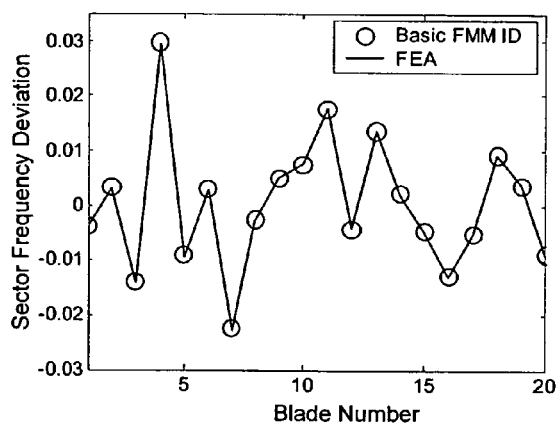
FIG. 16 shows the comparison between the sector mistuning calculated directly by finite element simulations of each mistuned blade/sector and the mistuning identified by basic FMM ID.

FIG. 16 shows the comparison between the sector mistuning calculated directly by finite element simulations of each mistuned blade/sector and the mistuning identified by basic FMM ID. As is seen from FIG. 16, the two results are in good agreement.

2.1.3.2 Stagger Angle Mistuning

Figure 17:
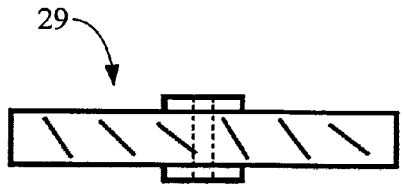
FIG. 17 schematically illustrates a rotor 29 with exaggerated stagger angle variations as viewed from above.

One of the differences between basic FMM ID and other mistuning identification methods is its measure of mistuning. Basic FMM ID uses a frequency quantity that characterized the mistuning of an entire blade-disk sector, whereas other methods in the literature consider mistuning to be confined to the blades as can be seen, for example, from the discussion in Judge, J. A., Pierre, C., and Ceccio, S. L., 2002, "Mistuning Identification in Bladed Disks," Proceedings of the International Conference on Structural Dynamics Modeling, Madeira Island, Portugal. The sector frequency approach used by FMM not only identifies the mistuning in the blades, but it also captures the mistuning in the disk and the blade-disk interface. To highlight this capability, the following example considers a rotor in which the blades are identical except they are mounted on the disk with slightly different stagger angles. FIG. 17 schematically illustrates a rotor 29 with exaggerated stagger angle variations as viewed from above.

Figure 18:
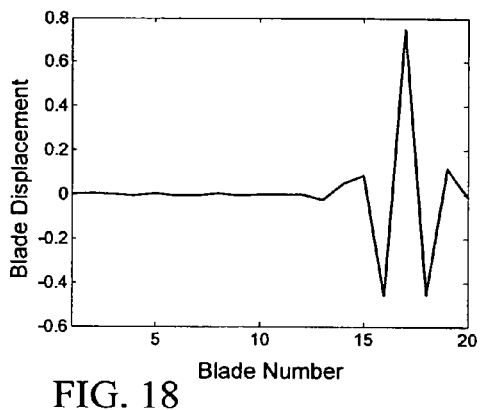
FIG. 18 shows a representative mistuned mode caused by stagger angle mistuning of the rotor in FIG. 14.

In case of the compressor 26 in FIG. 14, its rotor was mistuned by randomly altering the stagger angle of each blade with a maximum variation of ±4°. Otherwise the blades were identical. The modes of the system were then calculated using the ANSYS® finite element code. FIG. 18 shows a representative mistuned mode caused by stagger angle mistuning of the rotor in FIG. 14. It is seen in FIG. 18 that the mode was localized (in the higher blade number region), indicating that varying the stagger angles does indeed mistune the system.

Figure 19:
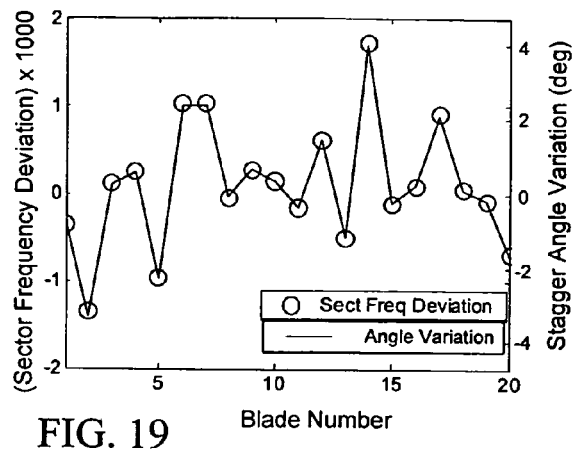
FIG. 19 illustrates a comparison of mistuning determination from basic FMM ID and the variations in the stagger angles.

The mistuned modes and frequencies calculated by ANSYS® software were then used to perform a basic FMM ID analysis of the mistuning. The resulting sector frequency deviations are plotted as the solid line in FIG. 19, which illustrates a comparison of mistuning determination from basic FMM ID and the variations in the stagger angles. The circles in FIG. 19 correspond to the stagger angle variations applied to each blade. The vertical axes in FIG. 19 have been scaled so that the maximum frequency and angle variation data points (blade 14) are coincident. This was done to highlight the fact that the stagger angle variations are proportional to the sector frequency deviations detected by basic FMM ID. Thus, not only can basic FMM ID substantially accurately detect mistuning in the blades, as illustrated in the previous example, but it can also substantially accurately detect other forms of mistuning such as variation in the blade stagger angle.

2.2 Advanced FMM ID Method

As discussed before, the basic FMM ID method provides an effective means of determining the mistuning in an IBR. The basic FMM ID technique requires a set of simple vibration measurements and the natural frequencies of the tuned system. However, at times neither the tuned system frequencies nor a finite element model from which to obtain them are available to determine an IBR's mistuning. Furthermore, even if a finite element model is available, there is often concern as to how accurately the model represents the actual rotor. Therefore, the following describes an alternative FMM ID method (advanced FMM ID) that does not require any analytical data. Advanced FMM ID requires only a limited number of mistuned modes and frequency measurements to determine a bladed disk's mistuning. Furthermore, the advanced FMM ID method also identifies the bladed disk's tuned system frequencies. Thus, advanced FMM ID not only serves as a method of identifying mistuning of the system, but can also provide a method of corroborating the finite element model of the tuned system 2.2.1 Advanced FMM ID Theory Advanced FMM ID may be derived from the basic FMM ID equations. Recall that a step in the development of the basic FMM ID theory was to transform the mistuning matrix $\overline{\Omega}$ into a vector form. Once the mistuning was expressed as a vector, it could then be calculated using standard methods from linear algebra. A similar approach is used below to solve for the tuned system frequencies. However, the resulting equations are nonlinear, and require a more sophisticated solution approach.

2.2.1.1 Development of Nonlinear Equations

Consider the basic FMM ID equation (30). Moving the $\Omega^{\circ 2}$ term to the left-hand side of the equation, the expression becomes $$\Omega^{\circ 2}\vec{\beta}_j + 2\Omega^{\circ}\Gamma_j\vec{\omega} = \omega_j^2\vec{\beta}_j \quad (36)$$

It is assumed that from measurement of the mistuned modes and frequencies, $\vec{\beta}_j$ and $\omega_j$ in equation (36) are known. All other quantities are unknown. It is noted that although $\Gamma_j$ is not known, the matrix contains elements from $\vec{\beta}_j$. Therefore, some knowledge of the matrix is available.

After some algebra, one can show that the term $\Omega^{\circ 2}\vec{\beta}_j$ in equation (36) may be re-expressed as $$\Omega^{\circ 2}\vec{\beta}_j = B_j\vec{\lambda}^{\circ} \quad (37)$$

where $\vec{\lambda}^{\circ}$ is a vector of the tuned frequencies squared, and $B_j$ is a matrix composed from the elements of $\vec{\beta}_j$. If $\eta$ is defined to be the maximum number of nodal diameters on the rotor, i.e. $\eta = N/2$ if N is even or $(N-1)/2$ if N is odd, then $\vec{\lambda}^{\circ}$ is given by $$\vec{\lambda}^{\circ} = \begin{bmatrix} \omega_{0ND}^{\circ 2} \\ \omega_{1ND}^{\circ 2} \\ \vdots \\ \omega_{\eta ND}^{\circ 2} \end{bmatrix} \quad (38)$$

For N even, the matrix $B_j$ has the form $$B_j = \begin{bmatrix} \beta_{j0} & & & & & & \\ & \beta_{j1} & & & & & \\ & & \beta_{j2} & & & & \\ & & & \ddots & & & \\ & & & & \beta_{jn} & & \\ & & & & & \ddots & \\ & & & & & & \beta_{j2} \\ & & & & & & \beta_{j1} \end{bmatrix} \quad (39)$$

A similar expression can be derived for N odd.

Substituting equation (37) into (36) and regrouping the left-hand side results in a matrix equation for the tuned frequencies squared and the sector mistuning, $$[B_j \quad 2\Omega^\circ \Gamma_j] \begin{bmatrix} \vec{\lambda} \\ \vec{\omega} \end{bmatrix} = \omega_j^2 \vec{\beta}_j \quad (40)$$

Equation (40) contains information from only one of the M measured modes and frequencies. However, equation (40) can be constructed for each measured mode, and combined into the single matrix expression $$\begin{bmatrix} B_1 & 2\Omega^\circ \Gamma_1 \\ B_2 & 2\Omega^\circ \Gamma_2 \\ \vdots & \vdots \\ B_M & 2\Omega^\circ \Gamma_M \end{bmatrix} \begin{bmatrix} \vec{\lambda} \\ \vec{\omega} \end{bmatrix} = \begin{bmatrix} \omega_1^2 \vec{\beta}_1 \\ \omega_2^2 \vec{\beta}_2 \\ \vdots \\ \omega_M^2 \vec{\beta}_M \end{bmatrix} \quad (41)$$

Thus, equation (41) represents a single expression that incorporates all of the measured data. For brevity, equation (41) is rewritten as $$[\tilde{B} \quad 2(\widetilde{\Omega^\circ \Gamma})] \begin{bmatrix} \vec{\lambda} \\ \vec{\omega} \end{bmatrix} = \vec{r} \quad (42)$$

where $\tilde{B}$ is the stacked matrix of $B_j$, the term $(\widetilde{\Omega^\circ \Gamma})$ is the stacked matrix of $\Omega^\circ \Gamma_j$, and $\vec{r}$ ' is the right-hand side of equation (41).

An additional constraint equation may be required because the equations (42) are underdetermined. To understand the cause of this indeterminacy, consider a rotor in which each sector is mistuned the same amount. Due to the symmetry of the mistuning, the rotor's mode shapes will still look tuned, but its frequencies will be shifted. If one has no prior knowledge of the tuned system frequencies, there may not be any way to determine that the rotor has in fact been mistuned. The same difficulty arises in solving equation (42) because there may not be any way to distinguish between a mean shift in the mistuning and a corresponding shift in the tuned system frequencies. To eliminate this ambiguity, mistuning may be defined so that it has a mean value of zero.

Mathematically, a zero mean in the mistuning translates to prescribing the first element of $\vec{\omega}$ to be zero. With the addition of this constraint, equation (42) takes the form $$\begin{bmatrix} \tilde{B} & 2(\widetilde{\Omega^\circ \Gamma}) \\ 0 & \vec{c} \end{bmatrix} \begin{bmatrix} \vec{\lambda}^\circ \\ \vec{\omega} \end{bmatrix} = \begin{bmatrix} \vec{r} \\ 0 \end{bmatrix} \quad (43)$$

where $\vec{c}$ is a row vector whose first element is 1 and whose remaining elements are zero.

2.2.1.2 Iterative Solution Method

If the term $(\widetilde{\Omega^\circ \Gamma})$ in equation (43) were known, then a least squares solution could be obtained for the tuned eigenvalues $\vec{\lambda}^\circ$ and the DFT of the sector mistuning $\vec{\omega}$. However, because $(\widetilde{\Omega^\circ \Gamma})$ is based in part on the unknown quantities $\vec{\lambda}^\circ$, the equations in (43) are nonlinear. Therefore, an alternative solution method may be devised. In a solution described below, an iterative approach is used to solve the equations in (43).

In iterative form, the least squares solution to equation (43) can be written as $$\begin{bmatrix} \vec{\lambda}^\circ \\ \vec{\omega} \end{bmatrix}_{(k)} = Lsq \left\{ \begin{bmatrix} \tilde{B} & 2(\widetilde{\Omega^\circ \Gamma})_{(k-1)} \\ 0 & \vec{c} \end{bmatrix}, \begin{bmatrix} \vec{r} \\ 0 \end{bmatrix} \right\} \quad (44)$$

where the subscripts indicate the iteration number. For each iteration, a new matrix $(\widetilde{\Omega^\circ \Gamma})$ may be constructed based on the previous iteration's solution for $\vec{\lambda}^\circ$. This process may be repeated until a converged solution is obtained. With a good initial guess, this method may typically converge within a few iterations.

To identify a good initial guess, in case of analyzing an isolated family of modes, it is observed that generally the frequencies of isolated mode families tend to span a fairly small range. Therefore, one good initial guess is to take all of the tuned frequencies to be equal to one another, and assigned the value of the mean tuned frequency, i.e.

$$\vec{\lambda}_{(0)}^\circ = \omega_{avg}^{\circ 2} \quad (45)$$

However, the value of $\omega_{avg}^\circ$ is not known and therefore cannot be directly applied to equation (44). Consequently, equation (43) may be slightly modified to incorporate the initial guess defined by equation (45). In equation (43), if the tuned frequencies are taken to be equal to $\omega_{avg}^\circ$, then the term $(\widetilde{\Omega^\circ \Gamma})$ may be expressed as $$(\widetilde{\Omega^\circ \Gamma}) = \omega_{avg}^\circ \tilde{\Gamma} \quad (46)$$

where $\tilde{\Gamma}$ is the matrix formed by vertically stacking the M $\Gamma_j$ matrices.

The matrix $\Gamma_j$ is also related to the tuned frequencies. As a result, the elements of each matrix $\Gamma_j$ simplify to the form $\omega_{avg}^\circ \beta_{jn}$. This allows one to rewrite $\Gamma_j$ as $$\Gamma_j = \omega_{avg}^\circ Z_j \quad (47)$$

where $Z_j$ is composed of the elements $\beta_{jn}$ in arranged in the same pattern as the $\gamma_{jn}$ elements shown in equation (29).

Thus, consolidating all $\omega_{avg}^{\circ}$ terms, equation (46) can be written as $$(\tilde{\Omega}^{\circ}\tilde{\Gamma}) = \omega_{avg}^{\circ 2}\tilde{Z} \qquad (48)$$

where $\tilde{Z}$ is the stacked form of the $Z_j$ matrices.

Substituting equation (48) into equation (43) and regrouping terms results in the expression $$\begin{bmatrix} \tilde{B} & 2\tilde{Z} \\ 0 & \vec{c} \end{bmatrix} \begin{bmatrix} \vec{\lambda}^{\circ} \\ \omega_{avg}^{\circ 2}\vec{\omega} \end{bmatrix} = \begin{bmatrix} \vec{\tilde{r}} \\ 0 \end{bmatrix} \qquad (49)$$

Note that the $\omega_{avg}^{\circ 2}$ term was grouped with the vector $\vec{\omega}$. Thus, all the unknown expressions are consolidated into the single vector on the left-hand side of equation (49). These quantities can be solved through a least squared fit of the equations. This represents the $0^{th}$ iteration of the solution process. The $\vec{\lambda}^{\circ}$ terms of the solution may then be used as an initial guess for the first iteration of equation (44).

In practice, the mistuned modes and frequencies may be measured using the technique described for basic FMM ID in Section 2.1.3.2. The next section presents a numerical example that demonstrates the ability of the advanced FMM ID method to identify the frequencies of the tuned system as well as mistuned sector frequencies.

2.2.2 Numerical Test Case for Advanced FMM ID

This section presents a numerical example of the advanced FMM ID method that identifies the tuned system frequencies as well as the mistuning. This example uses the same geometrically mistuned compressor model 26 (FIG. 14) as that used for the basic FMM ID method. The tuned system frequencies and sector mistuning identified by advanced FMM ID are then compared with finite element results.

The modes and natural frequencies of the mistuned bladed disk were calculated using a finite element model of the mistuned system. The physical modes were then converted to vectors of modal weighting factors, $\vec{\beta}_j$, through equation (35). The weighting factors were used to form the elements of equation (49) which was solved to obtain an initial estimate of the tuned system frequencies. This initial estimate was used as an initial guess to iteratively solve equation (44). The solution vector contained two parts: a vector of the tuned system frequencies squared, and a vector of the DFT of the sector frequency deviations. The sector mistuning was converted to the physical domain using the inverse transform in equation (34).

Figure 20:
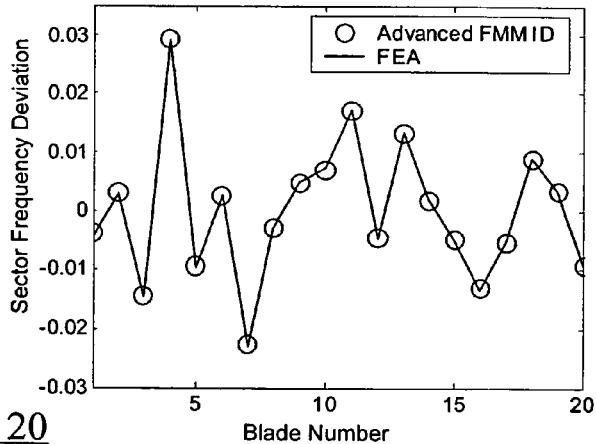
FIG. 20 depicts a comparison of mistuning predicted using advanced FMM ID with that obtained using the finite element analysis (FEA)
Figure 21:
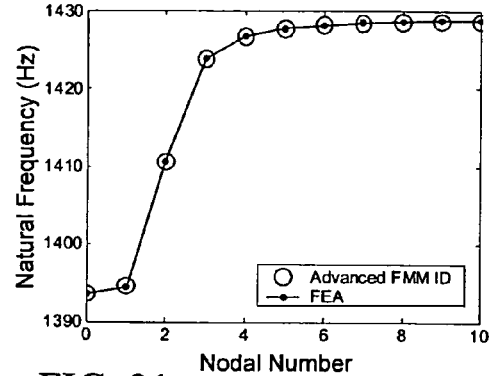
FIG. 21 shows a comparison of the tuned frequencies identified by advanced FMM ID and those computed directly with the finite element model.

The resulting sector frequency deviations were compared with the benchmark finite element analysis (FEA) values. FIG. 20 depicts a comparison of mistuning predicted using advanced FMM ID with that obtained using the finite element analysis (FEA). The results in FIG. 20 were obtained using the same procedure as that discussed in section 2.1.3 above. FIG. 21 shows a comparison of the tuned frequencies identified by advanced FMM ID and those computed directly with the finite element model (i.e., FEA). In each of FIGS. 20 and 21, the results obtained using advanced FMM ID were in good agreement with those from FEA.

[3] System Identification: Application

Figure 22:
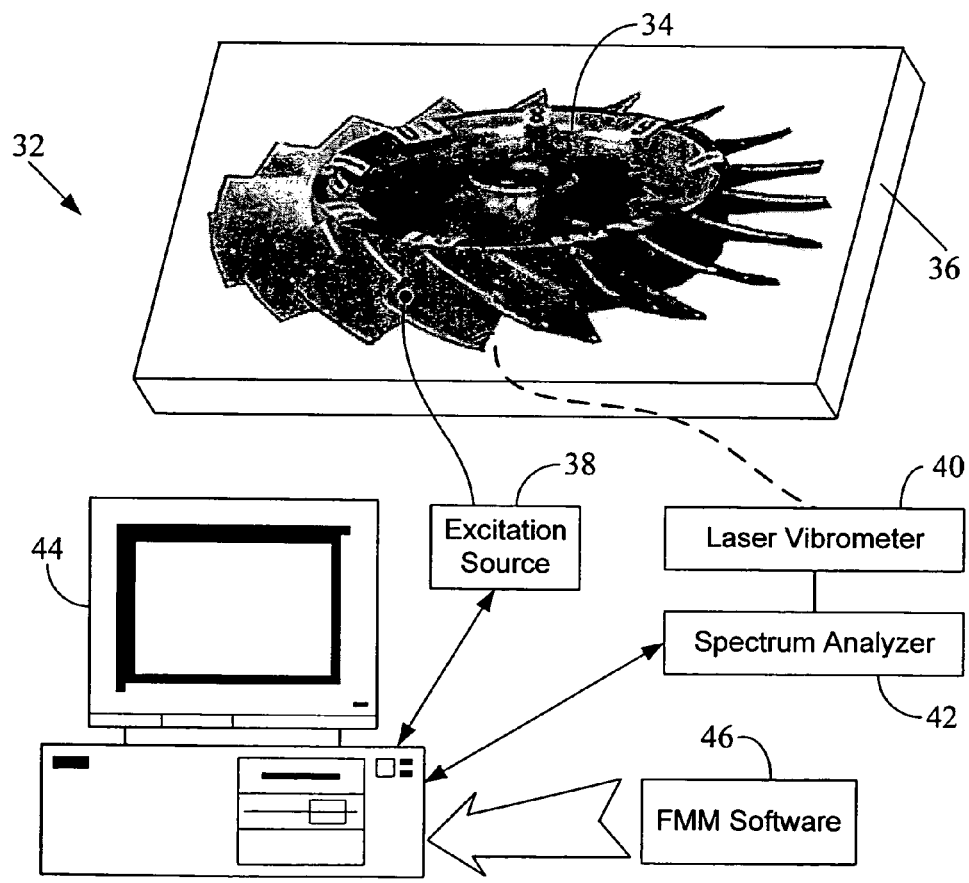
FIG. 22 illustrates an exemplary setup to measure transfer functions of test rotors and also to verify various FMM ID methods.

FIG. 22 illustrates an exemplary setup 32 to measure transfer functions of test rotors and also to verify various FMM ID methods discussed hereinbefore. As discussed earlier, the advanced FMM ID method uses the measurements of the mistuned rotor's system modes and natural frequencies. The term "system mode" is used herein to refer to the tip displacement of each blade as a function of blade's angular position. The system modes may be obtained using a standard modal analysis approach: measure the bladed disk's transfer functions, and then cuve-fit the transfer functions to obtain the mistuned modes and natural frequencies. The setup 32 in FIG. 22 may be used to perform standard transfer function measurements. As illustrated in FIG. 22, the rotor to be tested (rotor 34) may be placed on a foam pad 36 to approximate a free boundary condition. Then, one of the rotor blades may be excited over the frequency range of interest using an excitation source 38 (for example, a function generator coupled to an audio amplifier and loudspeaker) and the response of each blade may be measured with a laser vibrometer 40 coupled to a spectrum analyzer 42, which can be used to analyze the output of the laser vibrometer 40 to determine the transfer function. The devices 38, 40, and 42 may be obtained from any commercially available sources as is known in the art. For example, the companies that make the function generator and spectrum analyzer include Hewlett-Packard, Agilent, and Tektronix. The laser vibrometer may be a Polytec or Ometron vibrometer.

All of the devices 38, 40, 42 used in the test setup 32 are shown coupled (directly or indirectly through another device) to a computer 44, which may be used to operate the devices as well as to analyze various data received from the devices. The computer 44 may also store the FMM software 46, which can include software to implement any or all of the FMM ID methods. It is understood by one skilled in the art that the FMM software module 46 may be stored on an external magnetic, electromagnetic or optical data storage medium (not shown) such as, for example, a compact disc, an optical disk, a floppy diskette, etc. The data storage medium may then be supplied to the appropriate reader unit in the computer 44 or attached to the computer 44 to read the content of the data storage medium and supply the FMM software to the computer 44 for execution. Alternatively, the FMM software module 46 may reside in the computer's internal memory such as, for example, a hard disk drive (HDD) from which it can be executed by the computer's operating system. It is apparent to one skilled in the art that the computer 44 may be any computing unit including, for example, a stand-alone or networked IBM-PC compatible computer, a computing work station, etc.

It is noted here that for the sake of convenience and brevity the following discussion uses the term "FMM ID" to refer to any of the basic as well as the advanced FMM ID methods without specifically identifying each one. However, based on the context of the discussion and the discussion presented hereinbefore, it would not be difficult for one skilled in the art to comprehend which one of the two FMM ID methods is being referred to in the discussion.

To investigate applicability of FMM ID methods to real experimental data from actual hardware, the methods were applied to a pair of transonic compressors whose corresponding test rotors were designated as SN-1 and SN-3. A single blade/disk sector finite element model of the tuned compressor was provided by Pratt and Whitney. By solving this model with free boundary conditions at the hub and various cyclic symmetric boundary conditions on the radial boundaries of the disk, a nodal diameter map of the tuned rotor was generated as illustrated in FIG. 23. The free boundary conditions at the hub represented the boundary conditions in the experiment: an IBR supported by a soft foam pad and is otherwise unconstrained. In FIG. 23, each of the first two families of modes (designated by reference numerals 50 and 52) have isolated frequencies. These correspond to first bending and first torsion modes, respectively. Because FMM ID is equally applicable for isolated families of modes, both the first bending and first torsion modes were suitable candidates for system identification analysis.

FIG. 24 illustrates a typical transfer function from compressor SN-1 obtained using the test setup 32 shown in FIG. 22. Note that due to the high modal density, it was necessary to measure the compressor frequency response with a very high frequency resolution. This process was repeated for both compressors over two frequency bands to capture the response of both the first bending and first torsion modes. The commercially available MODENT modal analysis package was then used to curve-fit the transfer functions. This resulted in measurements of the mistuned first bending and torsion modes of each rotor, along with their natural frequencies. Because the blade that was excited was at a low response point in some modes, two or three of the modes in each family were not measurable. In any event, the measured mistuned modes and natural frequencies were used to demonstrate the applicability of FMM ID to actual hardware.

3.1 FMM ID Results

The measured modes and frequencies were used to test both forms of the FMM ID method. The basic and advanced FMM ID methods were applied to each rotor, for both the first bending and torsion families of modes. The tuned frequencies required by basic FMM ID were the same as those depicted in FIG. 23. To assess the accuracy of FMM ID, the results were compared to benchmark data.

3.1.1 Benchmark Measure of Mistuning

To assess the accuracy of the FMM ID method, the results must be compared to benchmark data. However, because the test rotors were integrally bladed, their mistuning could not be measured directly. Therefore, an indirect approach was used to obtain the benchmark mistuning. Pratt and Whitney personnel carefully measured the geometry of each blade on the two rotors and calculated the frequencies that it would have if it were clamped at its root. Because each blade had a slightly different geometry, it also had slightly different frequencies. Thus, the variations in the blade frequencies caused by geometric variations were determined. This data was put in a form that could be compared with the values identified by FMM ID. First, the frequency variations as a fraction of the mean were calculated so that the deviation in the blade frequencies could be determined. These in turn were related to the sector frequency deviations determined by FMM ID. For modes with most of their strain energy in the blade, sector frequency deviations can be obtained from blade frequency mistuning by simple scaling, i.e.

$$\Delta\omega_\psi = a(\Delta\omega_b) \quad (50)$$

where a is the fraction of strain energy in the blade for the average nodal diameter mode.

3.1.2 FMM ID Results for Bending Modes

SN-1 Results

The measured mistuned modes and natural frequencies for the compressor SN-1 were used as input to both versions of FMM ID. In the case of basic FMM ID, the tuned system frequencies of the first bending family from FIG. 23 were also used as input. FIG. 25 illustrates a comparison of mistuning from each FMM ID method with benchmark results for a test rotor SN-1. FIG. 25 thus shows the sector frequency deviations identified by each FMM ID method along with the benchmark results. Both FMM ID methods were in good agreement with the benchmark. This may imply that the mistuning was predominantly caused by geometric variations and that the variations were accurately captured by Pratt and Whitney.

To make the comparisons easier, all mistuning in FIG. 25 was plotted as the variation from a zero mean. However, it is noted that rotor SN-1 had a mean frequency 1.3% higher than that of the tuned finite element model. This DC shift was detected by basic FMM ID as a constant amount of mistuning added to each blade's frequency. However, because the advanced FMM ID formulation does not incorporate the tuned finite element frequencies, it had no way to distinguish between a mean shift in the mistuning and a corresponding shift in the tuned system frequencies. Therefore, in advanced FMM ID, mistuning was defined to have a zero mean, and then a corresponding set of tuned frequencies was inferred.

FIG. 26 shows a comparison of tuned system frequencies for the test rotor SN-1 from advanced FMM ID (i.e., identified by advanced FMM ID) and the finite element model (FMM) using ANSYS® software. It is seen from FIG. 26 that the FMM ID frequencies were approximately 17 Hz higher than the finite element values. This corresponds to a 1.3% shift in the mean of the tuned system frequencies that compensated for fact that the blade mistuning now had a zero mean. To facilitate the comparison of the finite element and FMM ID results, the mean shift was subtracted and then the results were then plotted as circles on FIG. 26. After this adjustment, it is seen that the distribution of the tuned frequencies determined by FMM ID agreed quite well with the values calculated from the finite element model. Advanced FMM ID additionally identified the fact that SN-1 had slightly higher average frequencies than the FEM model—a fact that could be important in establishing frequency margins for the stage.

It is observed from the sector frequency deviations of SN-1 shown in FIG. 25 that the mistuning varied from blade-to-blade in a regular pattern. The decreasing pattern of mistuning and the jump in the pattern may suggest that the mistuning might have been caused by tool wear during the machining process and that an adjustment in the process was made during blade manufacturing.

SN-3 Results

The basic and advanced FMM ID methods were then applied in a similar manner to rotor SN-3's family of first bending modes. The identified mistuning and tuned system frequencies are shown in FIGS. 27 and 28, respectively. For comparison purposes, the mistuning was again plotted with a zero mean, and a corresponding mean shift was subtracted from the predicted tuned system frequencies. The predictions for rotor SN-3 from both FMM ID methods were also in good agreement with the benchmark results. It is noted that in FIG. 27, the blades were numbered so that blade-1 corresponded to the high frequency sector. A similar numbering scheme (not illustrated here) was also implemented for SN-1 for comparison.

3.1.3 FMM ID Results for Torsion Modes

In this section, FMM ID's ability to identify mistuning in the first torsion modes is examined. For brevity, only the results for advanced FMM ID are presented. Advanced FMM ID was applied to each test rotor's family of torsion modes. FIGS. 29(a) and (b) show a comparison, for rotors SN-1 and SN-3 respectively, of the mistuning identified by FMM ID with the values from benchmark results obtained by Pratt & Whitney from geometric measurements. The agreement between FMM ID and benchmark results is good. In FIG. 29, the blades were numbered in the same order as in FIG. 27, which represents the numbering for SN-3 but, although not shown, a similar numbering for SN-1 was also employed. Thus, the mistuning patterns in the torsion modes looked very similar to those observed for the bending modes, e.g., the blades with the highest and lowest frequencies were the same for both sets of modes. This suggests that the mistuning in SN-1 and SN-3 systems might have been caused by relatively uniform thickness variations in the blades because such mistuning would affect the frequencies of both types of modes in a very similar manner.

In addition to identifying the mistuning in these rotors, advanced FMM ID also simultaneously inferred the tuned system frequencies of the system's torsion modes, as shown in FIG. 30, which illustrates a comparison of tuned system frequencies from advanced FMM ID and ANSYS® software for torsion modes of rotors SN-1 and SN-3. Thus, FMM ID worked well on both the torsion and bending modes of the test compressors.

3.2 Forced Response Prediction

The mistuning identified in section 3.1 was used to predict the forced response of the test compressors (SN-1, SN-3) to a traveling wave excitation. The results were compared with benchmark measurements done by Pratt & Whitney.

Pratt and Whitney has developed an experimental capability for simulating traveling wave excitation in stationary rotors. Their technique was applied to SN-1 to measure its first bending family's response to a 3E excitation (third engine order excitation). The response of SN-1 was then predicted using FMM ID methods. To make the prediction, the mistuning and tuned system frequencies identified by advanced FMM ID (as discussed in section 3.1) were input to the FMM reduced order model discussed hereinabove under part [1]. FMM calculated the system's mistuned modes and natural frequencies. Then, modal summation was used to calculate the response to a 3E excitation. The modal damping used in the summation was calculated from the half-power bandwidth of the transfer function peaks.

FIG. 31(a) depicts FMM-based forced response data, whereas FIG. 31(b) depicts the experimental forced response data. Thus, the plots in FIG. 31 show the comparison of the benchmark forced response results with that predicted by FMM. For clarity, only the envelope of the blade response is shown in FIGS. 31(a), (b). Also, the plots in FIG. 31 have been normalized so that the maximum response is equal to one. In general, the two curves in FIG. 31 agree reasonably well. To observe how well the response of individual blades was predicted, the relative responses of the blades at two resonant peaks were compared. The peaks are labeled $\hat{1}$ and $\hat{2}$ in FIG. 31(a). FIGS. 32(a) and (b) respectively show relative blade amplitudes at forced response resonance for the resonant peaks labeled $\hat{1}$ and $\hat{2}$ in FIG. 31(a). The relative amplitude of each blade as determined by FMM and experimental methods is plotted for both resonant peaks in FIG. 32. The agreement between FMM and experimental predictions was reasonably good. Thus, the FMM based method may be used to not only capture the overall shape of the response, but also to determine the relative amplitudes of the blades at the various resonances.

3.3 Cause and Implications of Repeated Mistuning Pattern

The mistuning in bladed disks is generally considered to be a random phenomenon. However, it is seen from the discussion in section 3.1 that both test rotors SN-1 and SN-2 had very similar mistuning patterns that were far from random. If such repeated mistuning matters are found to be common among IBRs, it may have broad implications on the predictability of these systems.

3.3.1 Cause of Repeated Mistuning

The similarity between the mistuning patterns identified in SN-1 and SN-3 is highly suggestive that the mistuning was caused by a consistent manufacturing effect. In addition, it was observed that the mistuning in the torsion modes followed the same trends as in the bending modes. Thus, the dominant form of mistuning may most likely be caused by relatively uniform blade-to-blade thickness variations. Blade thickness variations may be analyzed using geometry measurements of a rotor to extract the thickness of each blade at different points across the airfoil. Then, a calculation may be performed to determine how much each point's thickness deviated from the average values of all corresponding points. The results can be expressed as a percentage variation from the mean blade thickness. It was found that a 2% change in blade thickness, produced about a 1% change in corresponding sector frequency, which is consistent with beam theory for a beam of curved cross-section.

It is observed that tool wear may cause blade thickness variations. For example, if the blades were machined in descending order from blade 18 to blade 1 (e.g., the 18 blades in rotor SN-1), then, due to tool wear, each subsequent blade would be slightly larger than the previous one. This effect would cause the sector frequencies to monotonically increase around the wheel. Any frequency jump or discontinuity observed (e.g., the jump at blade 15 in FIG. 25) may be the result of a tool adjustment made during the machining process.

3.3.2 Implications of Repeated Mistuning

The repeating mistuning patterns caused by machining effects may allow prediction of the response of a fleet (e.g., of compressors) through probabilistic methods. For example, consider an entire fleet of the transonic compressors, two of which—SN-1 and SN-2—were discussed hereinbefore. If it is incorrectly assumed that the mistuning in these rotors was completely random, then one would estimate that the sector frequency deviation of each sector has a mean of zero and a standard deviation of about 2%. Assuming these variations, FMM was used to perform 10,000 Monte Carlo simulations to represent how a fleet of engines would respond to a 3E excitation. The data from Monte Carlo simulations was used to compute the cumulative probability function (CPF) of the maximum blade amplitude on each compressor in the fleet. FIG. 33 depicts cumulative probability function plots of peak blade amplitude for a nominally tuned and nominally mistuned compressor. The CPF of a fleet of engines with random mistuning had a standard deviation of 2% as shown by the dashed line in FIG. 33. It is observed from FIG. 33 that the maximum amplitude varied widely across the fleet, ranging in magnification from 1.1 to 2.5.

However, the test rotors were in fact nominally mistuned with a small random variation about the nominal pattern. Because the random variation was much smaller than that considered above, the fleet's response was more predictable. To illustrate this point, the nominal mistuning pattern (of the fleet of rotors) was approximated as the mean of the patterns measured for the two test rotors SN-1 and SN-2. Based on this approximated pattern, it was found that the sector frequency deviations differed from the nominal values with a standard deviation of only 0.2%, as shown in FIG. 34, which shows mean and standard deviations of each sector's mistuning for a nominally mistuned compressor. Making use of the fact that the rotors were nominally mistuned, the Monte Carlo simulations were repeated. The CPF of the maximum amplitude on each rotor was then calculated. The calculated results were plotted as the solid line on FIG. 33. It is observed that by accounting for nominal mistuning, the range of maximum amplitudes is significantly reduced. Thus, by measuring and making use of nominal mistuning when it occurs, a test engineer may predictably determine the fleet's vibratory response behavior from the vibratory response of a specific IBR that is tested in a spin pit, rig test or engine.

[4] Mistuning Extrapolation for Rotation

The FMM ID methods presented earlier in part [3] determine the mistuning in a bladed disk while it is stationary. However, once the rotor is spinning, centrifugal forces can alter its effective mistuning. However, an analytical method, discussed below, may be used for approximating the effect of rotation speed on mistuning.

4.1 Mistuning Extrapolation Theory

Centrifugal effects cause the sector frequency deviations present under rotating conditions to differ from their values when the bladed disk is not rotating. To approximate the effect of rotational speed on mistuning, a lumped parameter model 54 of a rotating blade, as shown in FIG. 35, may be considered. The pendulum 56 mounted on a torsion spring 58 represents the blade, while the circular region 60 of the system represents a rigid disk. Thus, the blade is modeled as a pendulum 56 of mass "m" and length "l" which is mounted to a rigid disk 60 through a torsional spring "k" 58. The disk 60 has radius "L" and rotates at speed "S".

It can be shown that the blade's natural frequency in this system is given by the expression $$\omega(S)^2 = \frac{k}{ml^2} + \frac{L}{l}S^2 \quad (51)$$

where S is the rotation speed in radians/sec, and the notation $\omega(S)$ indicates the natural frequency at speed S. Notice that the quantity $k/ml^2$ is the natural frequency of the system at rest. Therefore, equation (51) can be rewritten in the more general form $$\omega(S)^2 = \omega(0)^2 + rS^2 \quad (52)$$

where r is a constant.

Take $\omega$ to be a mistuned frequency in the form $\omega(S) = \omega^\circ(S)[1+\Delta\omega(S)]$. Substituting this expression into equation (52) and keeping only the first order terms implies $$\omega(S)^2 \approx \omega^\circ(S)^2 + 2(\Delta\omega(0))\omega^\circ(0)^2 \quad (53)$$

where $\omega^\circ(S)$ is the tuned frequency at speed.

Taking the square root of expression (53) and again keeping only the first order terms one obtains an expression for the mistuned frequency at speed, $$\omega(S) \approx \omega^\circ(S)\left\{1 + \Delta\omega(0)\left[\frac{\omega^\circ(0)^2}{\omega^\circ(S)^2}\right]\right\} \quad (54)$$

Subtracting and dividing both sides of the expression (54) by $\omega^\circ(S)$ yields an approximation for the mistuned frequency ratio at speed, i.e.

$$\Delta\omega(S) \approx \Delta\omega(0)\left[\frac{\omega^\circ(0)^2}{\omega^\circ(S)^2}\right] \quad (55)$$

In the case of system modes in which the strain energy is primarily in the blades, the tuned system frequencies tend to increase with speed by the same percentage as the blade alone frequencies. Therefore, expression (55) can also be approximated by noting how a frequency of the tuned system changes with speed, e.g., $$\Delta\omega(S) \approx \Delta\omega(0)\left[\frac{\omega_\psi^\circ(0)^2}{\omega_\psi^\circ(S)^2}\right] \quad (56)$$

where $\omega_\psi^\circ$ is the average tuned system frequency. Expression (56) may then be used to adjust the sector frequency deviations measured at rest for use under rotating conditions.

4.2 Numerical Test Cases

This section presents two numerical tests of the mistuning extrapolation theory. The first example uses finite element analysis of the compressor SN-1 discussed hereinbefore (see, for example, FIG. 22) to assess the accuracy of expression (56). Then, the second example demonstrates that this result may be combined with FMM ID and the FMM forced response software to predict the response of a rotor at speed.

4.2.1 Compressor SN-1

As mentioned earlier, Pratt & Whitney personnel made careful measurements of each blade's geometry and used this data to construct accurate finite element models of all 18 airfoils in SN-1. Thus, these finite element models captured the small geometric variations from one blade to the next.

Two of the airfoil models were randomly selected for use in this test case. For the purpose of this study, the first airfoil represented the tuned blade geometry, and the second represented a mistuned blade. Then, both blades were clamped at their root, and their natural frequencies were calculated using finite element analysis (FEA) software ANSYS®. The values were obtained for the first three modes corresponding to first bending, first torsion, and second bending respectively. The calculations were then repeated with the addition of rotational velocity loads to simulate centrifugal effects. Through this approach, the natural frequencies of both blades were obtained at five rotation speeds ranging from 0 to 20,000 RPM.

Figure 36:
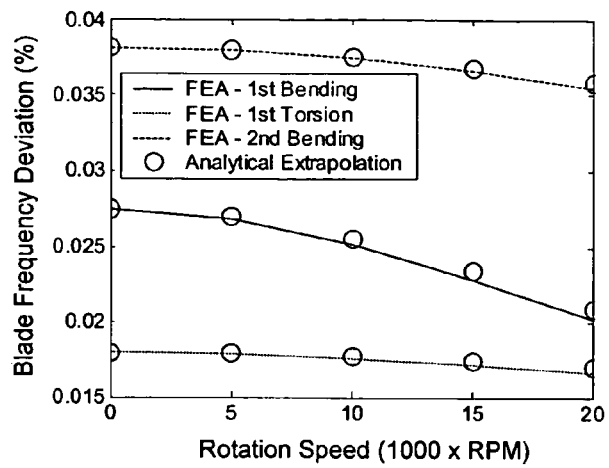
FIG. 36 shows a comparison of mistuning values analytically extrapolated to speed with an FEA (finite element analysis) benchmark.

Next, the frequency deviation of the mistuned blade was calculated by subtracting the tuned frequencies from the mistuned values, and then dividing each result by its corresponding tuned frequency. FIG. 36 shows a comparison of mistuning values analytically extrapolated to speed with an FEA (finite element analysis) benchmark. The results plotted as lines in FIG. 36 represent benchmark values on which to assess the accuracy of the analytical mistuning extrapolation method. Using expression (55), the frequency deviations calculated for the stationary rotor were extrapolated to the same rotational conditions considered in the benchmark calculation. The extrapolated results are shown as circles on FIG. 36. The agreement between extrapolated results and the results using the FEA benchmark were good for all three modes. Thus, expression (55) may be used to analytically extrapolate blade frequency deviations to rotating conditions. It is noted that expression (55) was used here rather than expression (56) because the calculated natural frequencies represented an isolated blade and not a blade/disk sector. However, for the cases where FMM is applicable, a blade-alone frequency differs from an average sector frequency by a multiplicative constant. Thus, expression (56) may also be suitable for mistuning extrapolation.

4.2.2 Response Prediction at Speed

This section uses a numerical test case that shows how FMM ID, expression (56), and the FMM forced response software can be combined to predict the response of a bladed disk under rotating conditions.

The geometrically mistuned rotor illustrated in FIG. 14 had a $6^{th}$ engine order crossing with the first bending modes at a rotational speed of 20,000 RPM. However, to create a more severe test case, it is assumed that the crossing occurred at 40,000 RPM.

To use FMM to predict the rotor's forced response at this speed (40,000 RPM), the FMM prediction software must be provided with the bladed disk's tuned system frequencies and the sector frequency deviations that are present at 40,000 RPM. As part of the discussion in section (2.1.3.1) above, these two sets of parameters were determined for at-rest condition using ANSYS and basic FMM ID respectively. However, because both of these properties change with rotation speed, they must first be adjusted to reflect their values at 40,000 RPM.

Figure 37:
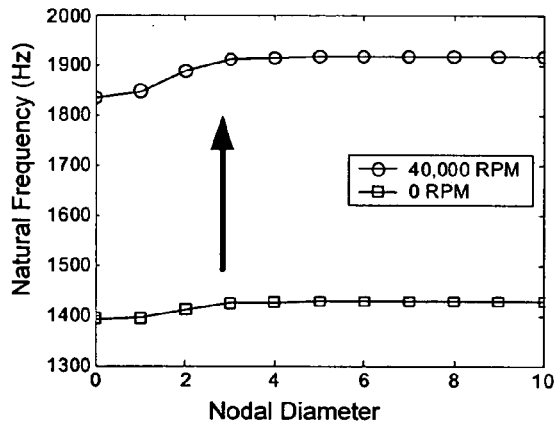
FIG. 37 illustrates the effect of centrifugal stiffening on tuned system frequencies.
Figure 38:
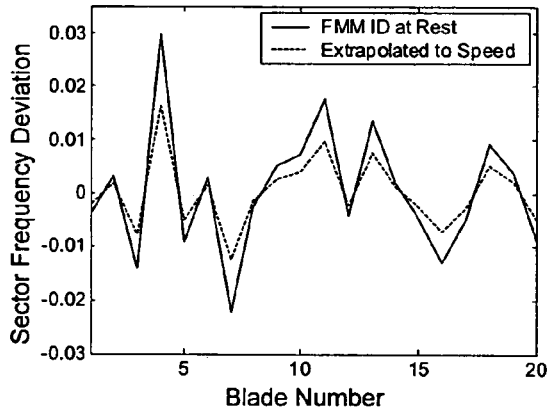
FIG. 38 illustrates the effect of centrifugal stiffening on mistuning.

To adjust the tuned system frequencies for higher rotational speed, tuned system frequencies were recalculated in ANSYS® software using the centrifugal load option to simulate rotational effects. FIG. 37 illustrates the effect of centrifugal stiffening on tuned system frequencies. As shown in FIG. 37, the centrifugal stiffening caused the tuned system frequencies to increase by about 30%. Then, the change in the five nodal diameter, tuned system frequency and expression (56) were used to analytically extrapolate the sector frequency deviations to 40,000 RPM. The adjusted mistuning, along with the original mistuning values identified at rest, are plotted in FIG. 38, which illustrates the effect of centrifugal stiffening on mistuning. It is seen from FIG. 38 that the centrifugal loading reduces the mistuning ratios by 40%.

Figure 39:
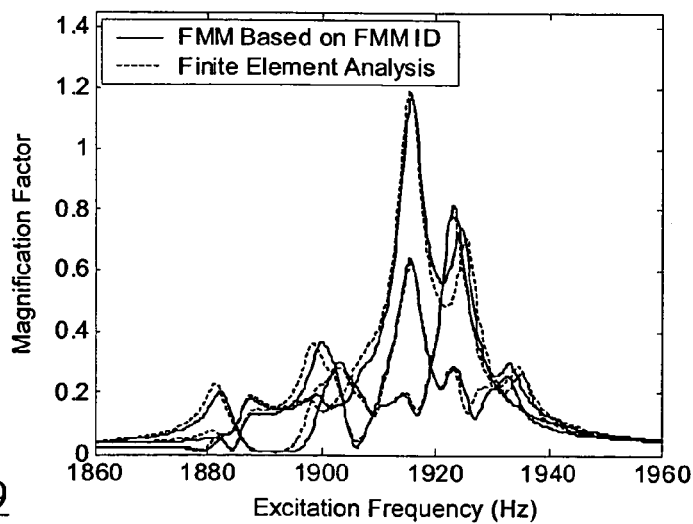
FIG. 39 depicts frequency response of blades to a six engine order excitation at 40,000 RPM rotational speed.

The adjusted parameters were then used with the FMM forced response software to calculate the rotor's response to a 6E excitation using the method described hereinabove in parts [1] and [2]. As a benchmark, the forced response was also calculated directly in ANSYS® software using a full 360° mistuned finite element model. Tracking plots of the FMM and ANSYS® software results are shown in FIG. 39, which depicts frequency response of blades to a six engine order excitation at 40,000 RPM rotational speed. For clarity, the response of only three blades is shown in FIG. 39: the high responding blade, the median responding blade, and the low responding blade. It is observed from FIG. 39 that each blade's peak amplitude and the shape of its overall response as predicted by FMM agree well with the benchmark results. Thus, FMM ID, the mistuning extrapolation equation, and FMM may be combined to identify the mistuning of a rotor at rest, and use the mistuning to predict the system's forced response under rotating conditions.

[5] System Identification from Traveling Wave Response Measurements

Traditionally, mistuning in rotors with attachable blades is measured by mounting each blade in a broach block and measuring its natural frequency. The difference of each blade's frequency from the mean value is then taken as a measure of its mistuning. However, this method cannot be applied to integrally bladed rotors (IBRs) whose blades cannot be removed for individual testing. In contrast, FMM ID system identification techniques rely on measurements of the bladed disk system as a whole, and are thus well suited to IBRs.

FMM ID may also be used for determining the mistuning in conventional bladed disks. Even when applied to bladed disks with conventionally attached blades, the traditional broach block method of mistuning identification is limited. In particular, it does not take into account the fact that the mistuning measured in the broach block may be significantly different from the mistuning that occurs when the blades are mounted on the disk. This variation can arise because each blade's frequency is dependent on the contact conditions at the attachment. In the engine, the attachment is loaded by centrifugal force from the blade which provides a different contact condition than the clamping action used in broach block tests. This difference is accentuated in multi-tooth attachments because different teeth may come in contact depending on how the attachment load is applied. In addition, the contact in multi-tooth attachments may be sensitive to manufacturing variations and, consequently, vary from one location to the next on the disk. The discussion given below addresses these issues by devising a method of system identification that can be used to directly determine mistuning while the stage is rotating, and can also identify mistuning from the response of the entire system because the blades are inherently coupled under rotating conditions. The method discussed below provides an approach for extracting the mistuned modes and natural frequencies of the bladed disk under rotating conditions from its response to naturally occurring, engine order excitations. The method is a coordinate transformation that makes traveling wave response data compatible with the existing, proven modal analysis algorithms. Once the mistuned modes and natural frequencies are known, they can be used as input to FMM ID methods.

5.1 Theory

Both of the FMM ID mistuning identification methods require the mistuned modes and natural frequencies of the bladed disk as input. Under stationary conditions, they can be determined by measuring the transfer functions of the system and using standard modal analysis procedures. One way of measuring the transfer functions is to excite a single point (e.g., on a blade) with a known excitation and measure the frequency response of all of the other points that define the system. However, when the bladed disk is subjected to an engine order excitation all of the blades are simultaneously excited and it may not be clear how the resulting vibratory response can be related to the transfer functions typically used for modal identification. As discussed below, if the blade frequency response data is transformed in a particular manner then the traveling wave excitation constitutes a point excitation in the transform space and that standard modal analysis techniques can then be used to extract the transformed modes. Once the transformed modes are determined, the physical modes of the system can be calculated from an inverse transformation.

5.1.1 Traditional Modal Analysis

Standard modal analysis techniques are based on measurements of a structure's frequency response functions (FRFs). These frequency response functions are then assembled as a frequency dependant matrix, $H(\omega)$, in which the element $H_{i,j}(\omega)$ corresponds to the response of point i to the excitation of point j as discussed, for example, in Ewins, D. J., 2000, *Modal Testing: Theory, Practice, and Applica-*

*tion*, Research Studies Press Ltd., Badlock, UK, Chapter 1. Traditional modal analysis methods require that one row or column of this frequency response matrix be measured. In the test cases discussed hereinbelow the mistuned modes correspond to a single isolated family of modes. For example, the lower frequency modes such as first bending and first torsion families often have frequencies that are relatively isolated. When this is the case the "modes" of interest may be defined in terms of how the blade displacements vary from one blade to the next around the wheel and can be characterized by the response of one point per blade. Thus, the standard modal analysis experiment may be performed in one of two ways when measuring the mistuned modes of a bladed disk. First, the structure's frequency response may be measured at one point on each blade, while it is excited at only one blade. This would result in the measurement of a single column of $H(\omega)$. Alternatively, a row of $H(\omega)$ may be obtained by measuring the structure's response at only one blade and exciting the system at each blade in turn. In either of these acceptable test configurations, the structure is excited at only one point at a time. However, in a traveling wave excitation, all blades are excited simultaneously. Thus, the response of systems subjected to such multi-point excitations cannot be directly analyzed by standard SISO (single input, single output) modal analysis methods.

5.1.2 General Multi-Point Excitation Analysis

As discussed above, a traveling wave excitation is not directly compatible with standard SISO modal analysis methods. Further, a traveling wave excites each measurement point with the same frequency at any given time. The method discussed below may be applicable to any. multi-input system, in which the frequency profile is consistent from one excitation point to the next; however, the amplitude and phase of the excitation sources may freely vary spatially. It is noted that suitable excitation forms include traveling waves, acoustic pressure fields, and even shakers when appropriately driven.

In typical applications, the i,j element of the frequency response matrix $H(\omega)$ corresponds to the response of point i to the excitation of point j. However, to analyze frequency response data from a multi-point excitation, $H_{i,j}(\omega)$ may be viewed in a more general fashion. Thus, in a more general sense, the i,j element describes the response of the $i^{th}$ coordinate to an excitation at the $j^{th}$ coordinate. Although these coordinates are typically taken to be the displacement at an individual measurement point, this need not be the case.

The structure's excitation and response can instead be transformed into a different coordinate system. For example, an N degree-of-freedom coordinate system can be defined by a set of N orthogonal basis vectors which span the space. In this representation, each basis vector is a coordinate. Thus, to perform modal analysis on multi-point excitation data, it may be desirable to select a coordinate system in which the excitation is described by just one basis vector. Within this newly defined modal analysis coordinate system, the structure is subjected to only a single coordinate excitation. Therefore, when the response measurements are expressed in this same domain, they represent a single column of the FRF matrix, and can be analyzed by standard SISO modal analysis techniques. The following section describes how this approach may be applied to traveling wave excitations.

5.1.3 Traveling Wave Modal Analysis

Consider an N-bladed disk subjected to a traveling wave excitation. It is assumed that the amplitude and phase of each blade's response is measured as a function of excitation frequency. In practice, these measurements may be made under rotating conditions with a Non-intrusive Stress Measurement System (NSMS), whereas a laser vibrometer may be used in a stationary bench test. For simplicity, only consider one measurement point per blade is considered.

It is assumed that the blades are excited harmonically by the force $\vec{f}(\omega)e^{i\omega t}$, where the vector $\vec{f}$ describes the spatial distribution of the excitation force. Similarly, the response of each measurement point is given by $\vec{h}(\omega)e^{i\omega t}$. The components of $\vec{f}$ and $\vec{h}$ are complex because they contain phase as well as magnitude information. It is this excitation and response data from which modes shapes and natural frequencies may be extracted. However, for this data to be compatible with standard SISO modal analysis methods, it must preferably first be transformed to an appropriate modal analysis coordinate system.

As indicated in the immediately preceding section, an appropriate coordinate system that would allow this to occur is one in which the spatial distribution of the force, $\vec{f}$, is itself a basis vector. For simplicity, only the phase difference that occurs from one blade to the next is included in the equation (57) below. In the case of higher frequency applications, it may be necessary to also include the spatial variation of the force over the airfoil if more than one family of modes interact. The spatial distribution of a traveling wave excitation has the form:

$$\vec{f}_E = F_o \begin{bmatrix} e^0 \\ e^{-i\left(\frac{2\pi}{N}\right)E} \\ \vdots \\ e^{-i(N-1)\left(\frac{2\pi}{N}\right)E} \end{bmatrix} \quad (57)$$

where E is the engine order of the excitation. Therefore, a coordinate system whose basis vectors are the N possible values of $\vec{f}$, corresponding to all N distinct engine order excitations, 0 through N−1, may be used as a basis. The basis vectors are complete and orthogonal.

The vectors $\vec{f}$ and $\vec{h}$ are transformed into this modal analysis coordinate system by expressing them as a sum of the basis vectors. Denoting the basis vectors as the set $\{\vec{b}_0, \vec{b}_1, \ldots, \vec{b}_{N-1}\}$, this summation takes the form, $$\vec{f} = \sum_{m=0}^{N-1} \bar{f}_m \vec{b}_m \quad (58a)$$

$$\vec{h}(\omega) = \sum_{m=0}^{N-1} \bar{h}(\omega)_m \vec{b}_m \quad (58b)$$

where the coefficients $\bar{f}_m$ and $\bar{h}(\omega)_m$ describe the value of the $m^{th}$ coordinate in the modal analysis domain. To identify the values of these coefficients, orthogonality may be used. This is a general approach that may be applicable for any orthogonal coordinate system. However, for the case of traveling wave excitations, the coordinate transformation may be simplified.

Consider the $n^{th}$ element of the vectors in equations (58). For convenience, let all vector indices run from 0 to N−1. Thus, these elements may be expressed as, $$f_n = \sum_{m=0}^{N-1} \bar{f}_m e^{-i\left(\frac{2\pi}{N}\right)mn} \quad (59a)$$

$$h(\omega)_n = \sum_{m=0}^{N-1} \bar{h}(\omega)_m e^{-i\left(\frac{2\pi}{N}\right)mn} \quad (59b)$$

where the exponential term is the $n^{th}$ component of the basis vector $\vec{b}_m$. Equation (59) is the inverse discrete Fourier Transform (DFT$^{-1}$) of $\vec{f}$. This relation allows to state the transformation between physical coordinates and the modal analysis domain in the simpler form, $$\vec{f} = \text{DFT}^{-1}\{\vec{\bar{f}}\} \quad (60a)$$

$$\vec{h} = \text{DFT}^{-1}\{\vec{\bar{h}}\} \quad (60b)$$

and conversely, $$\vec{\bar{f}} = \text{DFT}\{\vec{f}\} \quad (61a)$$

$$\vec{\bar{h}} = \text{DFT}\{\vec{h}\} \quad (61b)$$

where DFT is the discrete Fourier Transform of the vector.

By applying equation (61), the force and response vectors may be transformed to the modal analysis coordinate system. Due to the present selection of basis vectors, the resulting vector $\vec{\bar{f}}$ will contain only one nonzero term that corresponds to the engine order of the excitation, i.e., a 5E excitation (fifth engine order excitation) will produce a nonzero term in element 5 of $\vec{\bar{f}}$. This indicates that within the modal analysis domain, only the $E^{th}$ coordinate has been excited. Therefore, $\vec{\bar{h}}(\omega)$ represents column E of the FRF matrix.

The transformed response data, $\vec{\bar{h}}(\omega)$, may now be analyzed using standard SISO modal analysis algorithms. The resulting modes will also be in the modal analysis coordinate system, and must be converted back to physical coordinates though an inverse discrete Fourier transform given, for example, in equation (60). These identified (mistuned) modes and natural frequencies may in turn be used as inputs to FMM ID methods to determine the mistuning of a bladed disk from its response to an engine order excitation.

There are two further details of this method. First, for the purpose of convenience of notation, the indices of all matrices and vectors are numbered from 0 to N−1. However, most modal analysis software packages use a numbering convention that starts at 1. Therefore, an $E^{th}$ coordinate excitation in the present notation corresponds to an $(E+1)^{th}$ coordinate excitation in the standard convention. This must be taken into account when specifying the "excitation point" in the modal analysis software. Second, the coordinate transformation described herein is based on a set of complex basis vectors. Because the modes are extracted in the modal analysis domain they will be highly complex, even for lightly damped systems. Thus it may be necessary to use a modal analysis software package that can properly handle highly complex mode shapes. In one embodiment, the MODENT Suite by ICATS was used. Information about MODENT may be obtained from Imregun, M., et al., 2002, *MODENT 2002*, ICATS, London, UK, http://www.i-cats.co.uk.

5.2 Experimental Test Cases

This section presents two experimental test cases of the traveling wave system identification technique. In the first example, an integrally bladed fan (IBR) was excited with a traveling wave while it was in a stationary configuration. Because the IBR was stationary, it was easier to make very accurate response measurements using a laser vibrometer. Thus, this example may serve as a benchmark test of the traveling wave identification theory. Then, in the second example, the method's effectiveness on a rotor that is excited in a spin pit under rotating conditions is explored. The amplitude and phase of the response were measured using an NSMS system; NSMS is a non-contacting measurement method which is commonly used in the gas turbine industry for rotating tests. The NSMS technology may be used with the traveling wave system identification technique to determine the IBR's mistuning from its engine order response.

5.2.1 Stationary Benchmark

An integrally bladed fan was tested using the traveling wave excitation system at Wright Patterson Air Force Base's Turbine Engine Fatigue Facility as discussed in Jones K. W., and Cross, C. J., 2003, "Traveling Wave Excitation System for Bladed Disks," *Journal of Propulsion and Power*, 19(1), pp. 135–141. Because the facility's test system used an array of phased electromagnets to generate a traveling wave excitation, the bladed disk remained stationary during the test. The experiment was performed with the fan placed on a rubber mat to approximate a free boundary condition. First, the IBR was intentionally mistuned by fixing a different mass to the leading edge tip of each blade with wax. The masses ranged between 0 and 7 g, and were selected randomly. Then, to obtain a benchmark measure of the mistuned fan's mode shapes, a standard SISO modal analysis test was performed. Specifically, a single electromagnet was used to excite one blade over the frequency range of the first bending modes while the response was measured at all sixteen (16) blades with a Scanning Laser Doppler Vibrometer (SLDV). The modes were then extracted from the measured FRFs using the commercially available MODENT modal analysis package.

Next, to validate the traveling wave modal analysis method, the fan was excited using a $5^{th}$ engine order traveling wave excitation. Again, the response of each blade was measured using the SLDV. The blade responses to the traveling wave excitation were transformed using equation (61) and then analyzed with MODENT to extract the transformed modes. Because MODENT numbers its coordinates starting at 1 (0E), a 5E excitation corresponds to the excitation of coordinate 6. Therefore, in the mode extraction process, it was specified that the excitation was applied at the $6^{th}$ coordinate. Lastly, equation (60) was used to transform the resulting modes back to physical coordinates.

Figure 41:
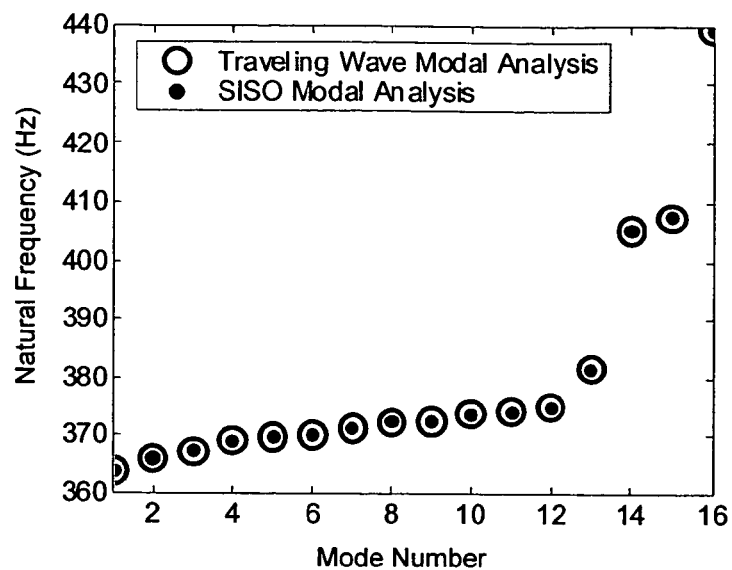
FIG. 41 depicts comparison of the natural frequencies extracted from the traveling wave response data with the benchmark results for the stationary benchmark of FIG. 40.

The modes measured through the traveling wave test were then compared with those from the benchmark analysis. FIGS. 40(*a*), (*b*) and (*c*) show a comparison of the representative mode shape extracted from the traveling wave response data with benchmark results. FIG. 40 thus shows several representative sets of mode shape comparisons that range from nearly tuned-looking modes (e.g., FIG. 40(*a*)) to modes that are very localized (e.g., FIG. 40(*c*)). In all cases in FIG. 40, the modes from the traveling wave and SISO benchmark methods agreed quite well. In addition, the natural frequencies were also accurately identified as can be seen from FIG. 41, which depicts comparison of the natural frequencies extracted from the traveling wave response data with the benchmark results. Thus, the traveling wave modal analysis method may be used to determine the modes and natural frequencies of a bladed disk based on its response to a traveling wave excitation.

It is discussed below that the resulting modes and natural frequencies can be used with FMM ID methods to identify the mistuning in the bladed disk. Because most of the mistuning in the stationary benchmark fan was caused by the attached masses, to a large extent the mistuning was known. Therefore, these mass values may be used as a benchmark with which to assess the accuracy of the FMM ID results.

Because the mass values are to be used as a benchmark, the mistuning caused by the masses must be isolated from the inherent mistuning in the fan. Therefore, a standard SISO modal analysis was first performed on the rotor fan with the masses removed, and the resulting modal data was used as input to FMM ID (e.g., advanced FMM ID). This resulted in an assessment of the IBR's inherent mistuning, expressed as a percent change in each sector's frequency.

Next, an FMM ID analysis was performed of the modes and frequencies extracted from the traveling wave response of the rotor with mass-mistuning. The resulting mistuning represented the total effect of the masses and the IBR's inherent mistuning. To isolate the mass effect, the rotor's nominal mistuning was subtracted. Again, the resulting mistuning was expressed as a percent change in each sector's frequency.

Figure 42:
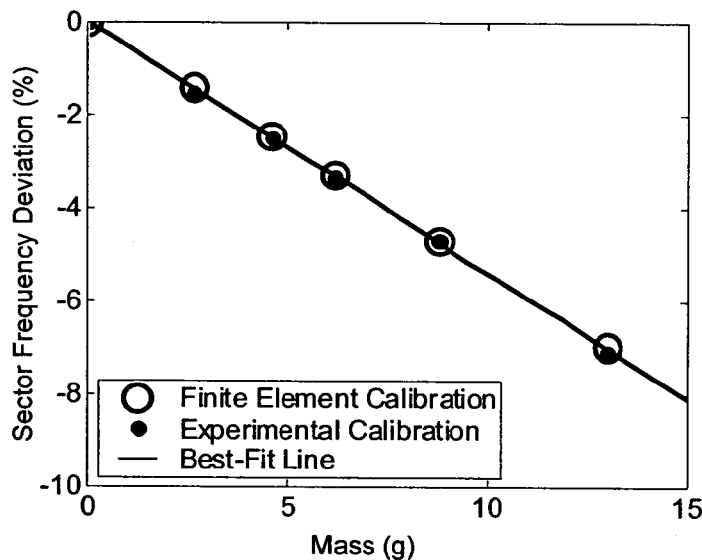
FIG. 42 shows a calibration curve relating the effect of a unit mass on a sector's frequency deviation in a stationary benchmark.

To compare these mistuning values with the actual masses placed on the blade tips, each sector frequency change may be first translated into its corresponding mass. A calibration curve to relate these two quantities was generated through two independent methods. First, the calibration was determined through a series of finite element analyses in which known mass elements were placed on the tip of a blade, and the finite element model was used to directly calculate the effect of the mass elements on the corresponding sector's frequency. It is noted that in this method a single blade disk sector of the tuned bladed disk with cyclic symmetric boundary conditions applied to the disk was used. Further, changing the phase in the cyclic symmetric boundary condition had only a slight effect on the results (the results shown in FIG. 42 corresponded to a phase constraint of 90 degrees). While this method was sufficient in this case, there are often times when a finite element model is not available. For such cases, a similar calibration curve can be generated experimentally by varying the mass on a single blade, and repeating the FMM ID analysis. This experimental method was performed as an independent check of the calibration. Both approaches gave very similar results, as can be seen from the plot in FIG. 42, which shows a calibration curve relating the effect of a unit mass on a sector's frequency deviation in a stationary benchmark. For the range of masses used in this experiment, it was found that mass and sector frequency change were linearly related as shown in FIG. 42. The calibration curve of FIG. 42 was then used to translate the identified sector frequency changes into their corresponding masses.

Figure 43:
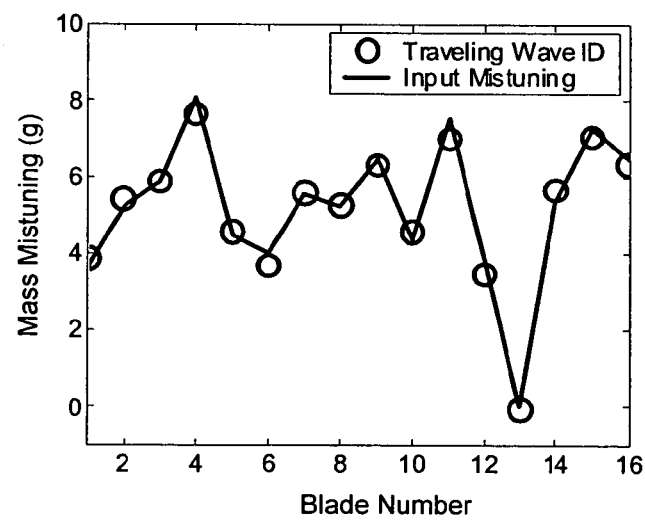
FIG. 43 shows the comparison between the mass mistuning identified through traveling wave FMM ID with the values of the actual masses placed on each blade tip.

FIG. 43 shows the comparison between the mass mistuning identified through traveling wave FMM ID with the values of the actual masses placed on each blade tip (i.e., the input mistuning values). As can be seen from FIG. 43, the agreement between the mistuning obtained using the traveling wave system identification method and the benchmark values is quite good. Thus, by combining the traveling wave modal analysis method with FMM ID, the mistuning in a bladed disk from its traveling wave response can be determined.

5.2.2 Rotating Test Case

In the example in section 5.2.1, the traveling wave modal analysis method was verified using a stationary benchmark rotor. However, if the method is to be applicable to conventional bladed disks, it may be desirable to make response measurements under rotating conditions. This second test case assesses if the measurement techniques commonly used in rotating tests are sufficiently accurate to be used with FMM ID to determine the mistuning in a bladed disk.

For this second case, another rotor fan was considered. To obtain a benchmark measure of the rotor's mistuning in its first bending modes, an impact hammer and a laser vibrometer were used to perform a SISO modal analysis test. The resulting modes and natural frequencies were then used as input to FMM ID to determine the fan's mistuning.

Next, the fan was tested in the spin pit facility at NASA Glenn Research Center. The NASA facility used an array of permanent magnets to generate an eddy current excitation that drove the blades. The blade response was then measured with an NSMS system. For this test, the fan was driven with a 7E excitation, over a rotational speed range of 1550 to 1850 RPM. The test was performed twice, at two different acceleration rates. The NSMS signals were then processed to obtain the amplitude and phase of each blade as a function of its excitation frequency. FIGS. 44(*a*) and (*b*) show tracking plots of blade amplitudes as a function of excitation frequency for two different acceleration rates. The NSMS system measured the amplitude and phase of each blade once per revolution. Thus, the data taken at the slower acceleration rate (FIG. 44(*b*)) had a higher frequency resolution than that obtained from the faster acceleration rate (FIG. 44(*a*)). However, in both cases, the data was significantly noisier than the measurements obtained in the previous example (in section 5.2.1) using an SLDV.

Next, the traveling wave system identification method was applied to extract the mode shapes from the response data. First, the measurements were transformed to the modal analysis domain by using equation (61), and the mode shapes and natural frequencies were extracted with MODENT. The extracted modes were then transformed back to the physical domain through equation (60). Finally, the resulting modes and frequencies were used as input to FMM ID to identify the fan's mistuning.

Figure 45:
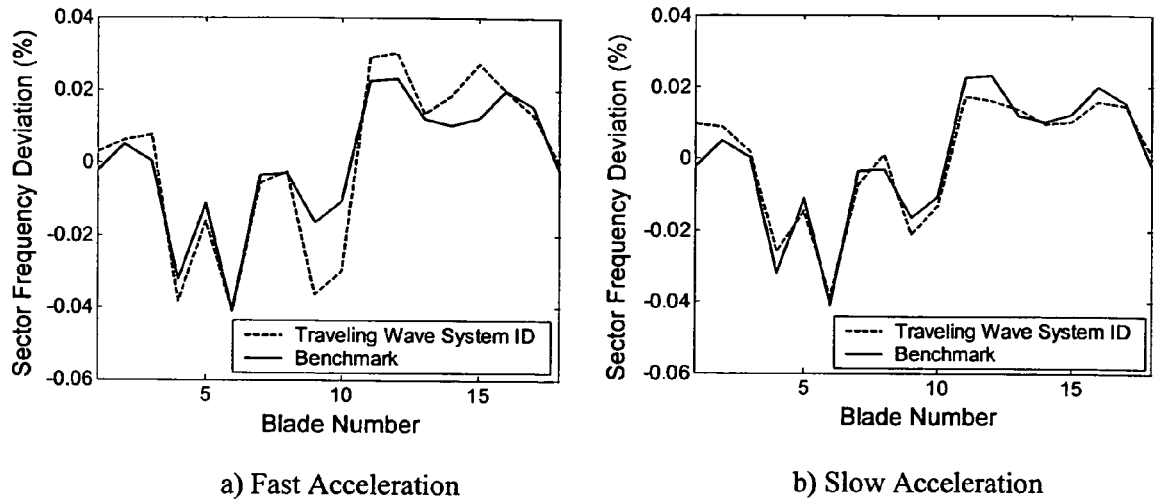
FIGS. 45(a) and (b) illustrate the comparison of the mistuning determined through the traveling wave system identification method with benchmark values for two different acceleration rates.

The mistuning identified from the two spin pit tests was then compared with the benchmark values. FIGS. 45(*a*) and (*b*) illustrate the comparison of the mistuning determined through the traveling wave system identification method with benchmark values for two different acceleration rates. In the case of the faster acceleration rate (FIG. 45(*a*)), the trends of the mistuning pattern were identifiable, but the mistuning values for all blades were not accurately determinable. The reduced accuracy may be attributed to difficulty in extracting accurate mode shapes from data with such coarse frequency resolution. However, the frequency resolution of the data measured at a slower acceleration rate (FIG. 45(*b*)) was three times higher than the case for faster acceleration. Thus, when FMM ID was applied to this higher resolution data set, the agreement between the traveling wave based ID and the benchmark values was significantly improved, as can be seen from FIG. 45(*b*). Thus, with adequate frequency resolution, NSMS measurements can be used to determine the mistuning of a bladed disk under rotating conditions.

Thus, NSMS measurements (from traveling wave excitation) may be used to elicit system mode shapes (blade number vs. displacement) and natural frequencies. The modes and natural frequency data may then be input to, for example, advanced FMM ID to infer frequency mistuning of each blade in a bladed disk and, thus, to predict the disk's forced response.

There are a number of advantages to performing system identification based on a bladed disk's response to a traveling wave excitation. First, it allows the use of data taken in a spin pit or stage test to determine a rotor's mistuning. In this way, the identified mistuning may include all effects present during the test conditions, i.e., centrifugal stiffening, gas loading, mounting conditions, as well as temperature effects. The effect of centrifugal loading on conventional bladed disks may also be analyzed using FMM ID.

Although FMM ID theoretically only needs measurements of one or two modes, the method's robustness and accuracy may be greatly improved when more modes are included. For certain bladed disks, a single traveling wave excitation can be used to measure more modes than would be possible from a single point excitation test. For example, in a highly mistuned rotor that has a large number of localized modes, it may be hard to excite all of these modes with only one single point excitation test, because the excitation source will likely be at a node of many of the modes. Therefore, to detect all of the mode shapes, the test must be repeated at various excitation points. However, if the system is driven with a traveling wave excitation, all localized modes can generally be excited with just a single engine order excitation. The more localized a mode becomes in physical coordinates, the more extended it will be in the modal analysis coordinate system. Thus in highly mistuned systems, one engine order excitation can often provide more modal information than several single point excitations.

The traveling wave system identification method may form the basis of an engine health monitoring system. If a blade develops a crack, its frequency will decrease. Thus, by analyzing blade vibration in the engine, the traveling wave system identification method could detect a cracked blade. A health monitoring system of this form may use sensors, such as NSMS, to measure the blade vibration. The measurements may be filtered to isolate an engine order response, and then analyzed using the traveling wave system identification method to measure the rotor's mistuning, which can be compared with previous measurements to identify if any blade's frequency has changed significantly, thus identifying potential cracks. It may be possible to develop a mode extraction method that does not require user interaction—i.e., an automated modal analysis method which is tailored to a specific piece of hardware.

The traveling wave system identification method discussed hereinabove may be extended to any structure subjected to a multi-point excitation in which the driving frequencies are consistent from one excitation point to the next. This allows structures to be tested in a manner that more accurately simulates their actual operating conditions.

[6] Conclusion

Figure 46:
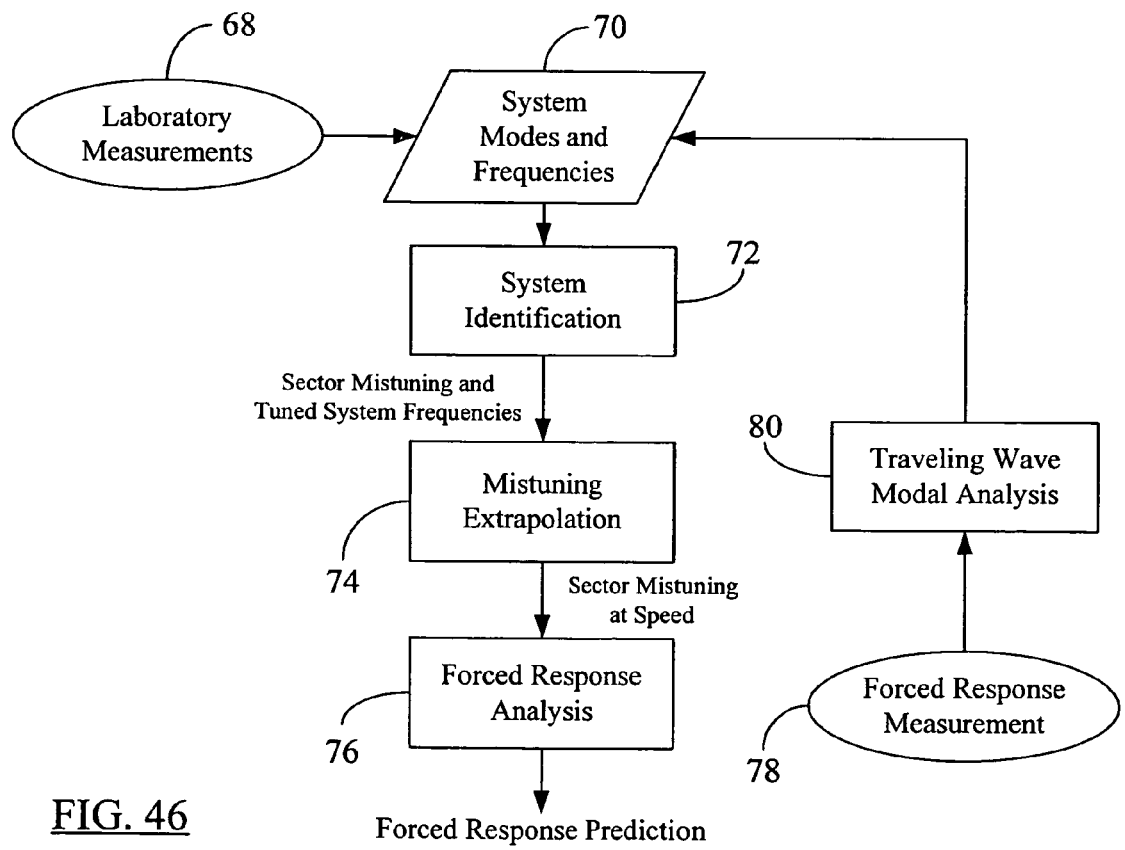
FIG. 46 illustrates an exemplary process flow depicting various blade sector mistuning tools discussed herein.

FIG. 46 illustrates an exemplary process flow depicting various blade sector mistuning tools discussed herein. The flow chart in FIG. 46 summarizes how the FMM and FMM ID methods discussed hereinbefore may be used to predict bladed disk system mistuning in stationary as well as rotating disks. For simplicity, the FMM discussion presented hereinbefore addressed mistuning in mode families that are fairly isolated in frequency (i.e., first two or three families of modes). Modeling mistuning in these modes may be relevant to the problem of flutter as discussed in Srinivasan, A. V., 1997, "Flutter and Resonant Vibration Characteristics of Engine Blades," *Journal of Engineering for Gas Turbines and Power*, 119, 4, pp. 742–775. However, as mentioned before, the applicability of various FMM methodologies discussed hereinbefore may not be necessarily limited to an isolated family of modes.

Referring to FIG. 46, measurements (block 68) of the mode shapes and natural frequencies of a mistuned bladed disk (block 70) may be input to various FMM ID methods (block 72) to infer the mistuning in each blade/disk sector. The advanced FMM ID method can also calculate the natural frequencies that the system would have if it were tuned, i.e., was perfectly periodic. The detailed discussion of blocks 68, 70, and 72 has been provided under parts 1 through 3 hereinabove. Because mode shapes measurements are generally made on stationary systems, the resulting mistuning often corresponds to a non-rotating bladed disk. However, centrifugal forces that are present while the disk rotates can alter the mistuning. Thus, mistuning extrapolation (block 74) may be performed to correct the mistuning from a stationary rotor for the effects of centrifugal stiffening. Mistuning extrapolation has been discussed under part-4 hereinabove. The FMM methodology (including FMM ID methods) may be coupled with a modal summation algorithm to calculate the forced response (block 76) of a bladed disk based on the mistuning identified in the previous steps. The discussion of forced response analysis (block 76) has been provided hereinabove at various locations under parts 1 through 3. Further, as discussed under part-5 above, the mode shapes and natural frequencies of a bladed disk may be extracted from its response to a traveling wave excitation (blocks 78, 80). Thus, by combining the traveling wave modal analysis technique (block 80) (which may use NSMS measurements identified at block 78) with the FMM ID system identification methods, mistuning in a bladed disk can be determined while the disk is under actual operating conditions.

The vibratory response of a turbine engine bladed disk is very sensitive to mistuning. As a result, mistuning increases its resonant stress and contributes to high cycle fatigue. The vibratory response of a mistuned bladed disk system may be predicted by the Fundamental Mistuning Model (FMM) because of its identification of parameters—the tuned system frequencies and the sector frequency deviations—that control the mode shapes and natural frequencies of a mistuned bladed disk. Neither the geometry of the system nor the physical cause of the mistuning may be needed. Thus, FMM requires little or no interaction with finite element analysis and is, thus, extremely simple to apply. The simplicity of FMM provides an approach for making bladed disks less sensitive to mistuning—at least in isolated families of modes. Of the two parameters that control the mistuned modes of the system, one is the mistuning itself which has a standard deviation that is typically known from past experience. The only other parameters that affect the mistuned modes are the natural frequencies of the tuned system. Consequently, the sensitivity of the system to mistuning can be changed only to the extent that physical changes in the bladed disk geometry affect these frequencies. For example, if the disk were designed to be more flexible, then the frequencies of the tuned system would be spread over a broader range, and this may reduce the system's sensitivity to mistuning.

The FMM ID methods use measurements of the mistuned system as a whole to infer its mistuning. The measurements of the system mode shapes and natural frequencies can be obtained in laboratory test through standard modal analysis procedures. The high sensitivity of system modes to small variations in mistuning causes measurements of those modes themselves to be an accurate basis for mistuning identification. Because FMM ID does not require individual blade measurements, it is particularly suited to integrally bladed rotors. The basic FMM ID method requires the natural frequencies of the tuned system as an input. The method is useful for comparing the change in a components mistuning over time, because each calculation will be based about a consistent set of tuned frequencies. The advanced FMM ID method, on the other hand, does not require any analytical data. The approach is completely experimental and determines both the mistuning and the tuned system frequencies of the rotor.

Effects of centrifugal stiffening on mistuning may be identified on a stationary IBR using FMM ID and FMM, and extrapolated to engine operating conditions to predict the system's forced response at speed. Further, in conventional bladed disks, centrifugal forces may cause changes in the contact conditions at the blade/disk attachment to substantially alter the system's mistuning. This behavior may not be accounted for in the mistuning extrapolation method. In that case, the mode shapes and natural frequencies of a rotating bladed disk may be extracted from measurements of its forced response (e.g., traveling wave excitation) and the results may then be combined with FMM ID to determine the mistuning present at operating conditions.

It is observed that, besides centrifugal loading, other factors may also be present in the engine that can affect its mistuned response. These may include: temperature effects, gas bending stresses, how the disk is constrained in the engine, and how the teeth in the attachment change their contact if the blades are conventionally attached to the disk. Except for the constraints on the disk, these additional effects may be relatively unimportant in integrally bladed compressor stages. The disk constraints can be taken into account by performing the system identification (using, for example, an FMM ID method) on the IBR after the full rotor is assembled. Thus, the FMM ID methodology presented herein may be used to predict the vibratory response of actual compressor stages so as to determine which blades may be instrumented, interpret test data, and relate the vibratory response measured in the CRF to the vibration that will occur in the fleet as a whole.

The traveling wave modal analysis method discussed hereinbefore may detect the presence of a crack in an engine blade by analyzing blade vibrations because a crack will decrease a blade's frequency of vibration. This method, thus, may be used with on-board sensors to measure blade response during engine accelerations. The measurements may be filtered to isolate an engine order response, and then analyzed using the traveling wave system identification method. The identified mistuning may then be compared with previous results to determine if any blade's frequency has changed significantly, thus identifying potential cracks. The FMM and FMM ID methods may be applied to regions of higher modal density using Subset of Nominal Modes (SNM) method.

The foregoing describes development of a reduced order model called the Fundamental Mistuning Model (FMM) to accurately predict vibratory response of a bladed disk system. FMM may describe the normal modes and natural frequencies of a mistuned bladed disk using only its tuned system frequencies and the frequency mistuning of each blade/disk sector (i.e., the sector frequencies). If the modal damping and the order of the engine excitation are known, then FMM can be used to calculate how much the vibratory response of the bladed disk will increase because of mistuning when it is in use. The tuned system frequencies are the frequencies that each blade-disk and blade would have were they manufactured exactly the same as the nominal design specified in the engineering drawings. The sector frequencies distinguish blade-disks with high vibratory response from those with a low response. The FMM identification methods—basic and advanced FMM ID methods—use the normal (i.e., mistuned) modes and natural frequencies of the mistuned bladed disk measured in the laboratory to determine sector frequencies as well as tuned system frequencies. Thus, one use of the FMM methodology is to: identify the mistuning when the bladed disk is at rest, to extrapolate the mistuning to engine operating conditions, and to predict how much the bladed disk will vibrate under the operating (rotating) conditions.

In one embodiment, the normal modes and natural frequencies of the mistuned bladed disk are directly determined from the disk's vibratory response to a traveling wave excitation in the engine. These modes and natural frequency may then be input to the FMM ID methodology to monitor the sector frequencies when the bladed disk is actually rotating in the engine. The frequency of a disk sector may change if the blade's geometry changes because of cracking, erosion, or impact with a foreign object (e.g., a bird). Thus, field calibration and testing of the blades (e.g., to assess damage from vibrations in the engine) may be performed using traveling wave analysis and FMM ID methods together.

It is noted that because the FMM model can be generated completely from experimental data (e.g., using the advanced FMM ID method), the tuned system frequencies from advanced FMM ID may be used to validate the tuned system finite element model used by industry. Further, FMM and FMM ID methods are simple, i.e., no finite element mass or stiffness matrices are required. Consequently, no special interfaces are required for FMM to be compatible with a finite element model.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method, comprising:
    obtaining nominal frequencies of a bladed disk system when tuned;
    measuring at least one mistuned mode and natural frequency of said bladed disk system; and
    calculating mistuning of at least one blade in said bladed disk system from only said nominal frequencies and said at least one mistuned mode and natural frequency.

2. The method of claim 1, wherein said obtaining includes obtaining said nominal frequencies for an isolated family of modes of said bladed disk system when tuned.

3. The method of claim 1, wherein said obtaining includes obtaining said nominal frequencies using a finite element analysis.

4. The method of claim 3, wherein said finite element analysis includes finite element analysis of a tuned, cyclic symmetric model of a single blade-disk sector in said bladed disk system.

5. The method of claim 1, wherein said measuring includes measuring said at least one mistuned mode and natural frequency using a modal analysis.

6. The method of claim 5, wherein said measuring using said modal analysis includes:
measuring a set of frequency response functions of said bladed disk system; and
extracting said at least one mistuned mode and natural frequency from said frequency response functions.

7. The method of claim 6, wherein said extracting includes extracting said at least one mistuned mode and natural frequency using modal curve fitting.

8. The method of claim 1, wherein said blade includes a corresponding blade-disk sector in said bladed disk system.

9. The method of claim 8, wherein said calculating includes solving:

$$\begin{bmatrix} 2\Omega°\Gamma_1 \\ 2\Omega°\Gamma_2 \\ \vdots \\ 2\Omega°\Gamma_m \end{bmatrix} \vec{\omega} = \begin{bmatrix} (\omega_1^2 I - \Omega°^2)\vec{\beta}_1 \\ (\omega_2^2 I - \Omega°^2)\vec{\beta}_2 \\ \vdots \\ (\omega_m^2 I - \Omega°^2)\vec{\beta}_m \end{bmatrix}$$

where
$\Omega°$ is a diagonal matrix of the nominal frequencies of said bladed disk system when tuned;
$\Gamma_j$ is a matrix composed from the elements in the vector $\vec{\gamma}_j$ where $$\vec{\gamma}_j = \Omega° \vec{\beta}_j \quad (26)$$

$\vec{\beta}_j$ is a vector containing weighting factors that describe the $j^{th}$ mistuned mode as a sum of tuned modes;
I is the identity matrix;
$\vec{\omega}$ is a vector of mistuning parameters; and
$\omega_j$ is the natural frequency of the $j^{th}$ mistuned mode.

10. The method of claim 9, further comprising using a least squares fit method to determine the vector $\vec{\omega}$ that best fits all the measured data.

11. The method of claim 9, wherein the vector $\vec{\omega}$ is related to a physical sector mistuning by the equation $$\Delta\omega_\psi^{(s)} = \sum_{p=0}^{N-1} e^{-isp\frac{2\pi}{N}} \overline{\omega}_p$$

where
$\Delta\omega_\psi^{(s)}$ is the sector frequency deviation of the $s^{th}$ blade-disk sector; and
$\overline{\omega}_p$ is a $p^{th}$ mistuning parameter in the vector $\vec{\omega}$.

12. A method, comprising:
measuring a set of mistuned modes and natural frequencies of a bladed disk system; and
calculating mistuning of at least one blade in said bladed disk system and nominal frequencies of said bladed disk system when tuned by using only said set of mistuned modes and natural frequencies.

13. The method of claim 12, further comprising validating a finite element model of said bladed disk system using said nominal frequencies of the tuned bladed disk system.

14. The method of claim 12, wherein calculating said nominal frequencies includes calculating said nominal frequencies using a finite element model of said bladed disk system treating each blade in said bladed disk system as identical and also using said set of mistuned modes and natural frequencies.

15. The method of claim 12, wherein said calculating includes calculating said nominal frequencies for an isolated family of modes of said bladed disk system when tuned.

16. The method of claim 12, wherein said calculating is performed iteratively.

17. The method of claim 12, wherein said blade includes a corresponding blade-disk sector in said bladed disk system.

18. The method of claim 17, wherein a mean value of mistuning of at least one blade-disk sector is zero.

19. The method of claim 18, wherein said calculating includes solving:

$$\begin{bmatrix} \tilde{B} & 2(\tilde{\Omega°\Gamma}) \\ 0 & \vec{c} \end{bmatrix} \begin{bmatrix} \vec{\lambda}° \\ \vec{\omega} \end{bmatrix} = \begin{bmatrix} \vec{\tilde{r}} \\ 0 \end{bmatrix}$$

where
$\tilde{B}$ is a stacked matrix composed from the elements of $\vec{\beta}_j$, which is a vector containing weighting factors that describe the $j^{th}$ mistuned mode as a sum of tuned modes;
$(\tilde{\Omega°\Gamma})$ is a stacked matrix of $\Omega°\Gamma_j$, where $\Omega°$ is a diagonal matrix of the nominal frequencies of said bladed disk system when tuned and $\Gamma_j$ is a matrix composed from the elements in the vector $\vec{\gamma}_j$ where $$\vec{\gamma}_j = \Omega° \vec{\beta}_j$$

$\vec{c}$ is a row vector whose first element is 1 and whose remaining elements are zero;
$\vec{\omega}$ is a vector of mistuning parameters;
$\vec{\lambda}°$ is a vector of the tuned frequencies squared; and
$\vec{\tilde{r}}$ is the vector given by the following $$\begin{bmatrix} \omega_1^2 \vec{\beta}_1 \\ \omega_2^2 \vec{\beta}_2 \\ \vdots \\ \omega_M^2 \vec{\beta}_M \end{bmatrix}$$

where $\omega_j$ is the natural frequency of the $j^{th}$ mistuned mode.

20. The method of claim 19, wherein the vector $\vec{\omega}$ is related to a physical sector mistuning by the equation $$\Delta\omega_\psi^{(s)} = \sum_{p=0}^{N-1} e^{-isp\frac{2\pi}{N}} \overline{\omega}_p$$

where
$\Delta\psi_\psi^{(s)}$ is the sector frequency deviation of the $s^{th}$ blade-disk sector; and
$\overline{\omega}_p$ is a $p^{th}$ mistuning parameter in the vector $\vec{\omega}$.

21. A computer-readable data storage medium containing a program code, which, when executed by a processor, causes said processor to perform the following:
- receive nominal frequencies of a bladed disk system when tuned;
- further receive the mistuned modes and natural frequencies of said bladed disk system; and
- calculate mistuning of a blade in said bladed disk system only from said nominal frequencies and said mistuned modes and natural frequencies.

22. A computer-readable data storage medium containing a program code, which, when executed by a processor, causes said processor to perform the following:
- receive a set of mistuned modes and natural frequencies of a bladed disk system; and
- calculate mistuning of a blade in said bladed disk system by using only said set of mistuned modes and natural frequencies.

23. The data storage medium of claim 22, wherein said program code, upon execution by said processor, causes said processor to further perform the following:
- calculate nominal frequencies of said bladed disk system when tuned by using only said set of mistuned modes and natural frequencies.

* * * * *

UNITED STATES PATENT AND TRADEMARK OFFICE
CERTIFICATE OF CORRECTION

PATENT NO. : 7,082,371 B2 Page 1 of 2
APPLICATION NO. : 10/836422
DATED : July 25, 2006
INVENTOR(S) : Jerry H. Griffin et al.

It is certified that error appears in the above-identified patent and that said Letters Patent is hereby corrected as shown below:

Page 2, Column 1, Line 16, before "a Subset" insert -- Using --.

Page 2, Column 2, Reference 6, delete "ALAA" and substitute therefore -- AL4A --.

Page 2, Column 2, Reference 11, delete "7Ih" and substitute therefore -- 7th --.

Column 6, Line 56, after "noted here that" delete -- the --.

Column 7, Line 54, delete " $(I + \Delta \hat{M})$ " and substitute therefore -- $(I + \Delta \hat{M})^{-1}$ --.

Column 7, Line 66, delete "express" and substitute therefore -- expressed --.

Column 9, Line 20, after "bracketed terms" delete "of".

Column 10, Line 49, delete " $\vec{\Omega}°$ " and substitute therefore -- $\Omega°$ --.

Column 16, Lines 35, 53, and 60, delete " $\vec{\omega}$ " and substitute therefore -- $\bar{\bar{\omega}}$ --.

Column 17, Lines 20 and 49, delete " $\bar{\bar{r}}$ " and substitute therefore -- $\tilde{r}$ --.

Column 17, Line 20, delete " "" " and substitute therefore -- "~" --.

Column 17, Lines 25, 31, and 33, delete " $\vec{\omega}$ " and substitute therefore -- $\bar{\bar{\omega}}$ --.

Column 18, Line 12, delete " $\bar{\bar{r}}$ " and substitute therefore -- $\tilde{r}$ --.

Column 18, Line 52, after "ANSYS" insert -- ® --.

Column 20, Line 21, after "tuned system" insert -- . --.

Column 21, Line 53, delete " $\bar{\bar{r}}\,'$ " and substitute therefore -- $\tilde{r}\,'$ --.

Column 22, Lines 2 and 18, delete " $\vec{\omega}$ " and substitute therefore -- $\bar{\bar{\omega}}$ --.

CERTIFICATE OF CORRECTION (continued)
U.S. Pat. No. 7,082,371 B2

Column 22, Line 66, delete " $\beta_{jn}$ in arranged " and substitute therefore -- $\beta_{jn}$ arranged --.

Column 23, Line 16, delete " $\vec{\omega}$ " and substitute therefore -- $\bar{\bar{\omega}}$ --.

Column 24, Line 8, delete "cuve-fit" and substitute therefore -- curve-fit --.

Column 27, Lines 52 and 54, delete " $\hat{1}$ and $\hat{2}$ " and substitute therefore -- ① and ② --.

Column 31, Line 24, after "ANSYS" insert -- ® --.

Column 32, Line 64, delete " H(ω) " and substitute therefore -- H(ω) --.

Column 33, Lines 17, 18, and 40, delete " H(ω) " and substitute therefore -- H(ω) --.

Column 35, Lines 35 and 39, delete " $\vec{f}$ " and substitute therefore -- $\bar{\bar{f}}$ --.

Column 35, Lines 42 and 44, delete " $\vec{h}(\omega)$ " and substitute therefore -- $\bar{\bar{h}}(\omega)$ --.

Column 43, Lines 38, 43, 45, and 57, delete " $\vec{\omega}$ " and substitute therefore -- $\bar{\bar{\omega}}$ --.

Column 43, Line 57, delete " $\vec{\omega}_p$ " and substitute therefore -- $\bar{\omega}_p$ --.

Column 44, Lines 41, 56, and 67, delete " $\vec{\omega}$ " and substitute therefore -- $\bar{\bar{\omega}}$ --.

Column 44, Line 43, delete " $\bar{\bar{r}}$ " and substitute therefore -- $\bar{\bar{r}}$ --.

Column 44, Line 65, delete " $\Delta\psi_\psi^{(s)}$ " and substitute therefore -- $\Delta\omega_\psi^{(r)}$ --.

Signed and Sealed this

Twelfth Day of January, 2010

David J. Kappos
*Director of the United States Patent and Trademark Office*